United States Patent [19]
Barrett

[11] Patent Number: 5,486,833
[45] Date of Patent: Jan. 23, 1996

[54] ACTIVE SIGNALLING SYSTEMS

[76] Inventor: Terence W. Barrett, 1453 Beulah Rd., Vienna, Va. 22182

[21] Appl. No.: 42,272

[22] Filed: Apr. 2, 1993

[51] Int. Cl.$^6$ .............................. G01S 7/42; G01S 7/32
[52] U.S. Cl. .......................... 342/204; 342/21; 342/22; 342/83
[58] Field of Search ........................... 342/82, 83, 201, 342/204, 22, 21

[56] References Cited

U.S. PATENT DOCUMENTS

| | | | |
|---|---|---|---|
| 3,108,249 | 10/1963 | Clement. | |
| 3,614,719 | 10/1971 | Treacy. | |
| 3,720,884 | 3/1973 | Kelley et al.. | |
| 4,008,469 | 2/1977 | Chapman | 342/22 |
| 4,218,678 | 8/1980 | Fowler et al. | 342/196 |
| 4,995,088 | 2/1991 | Farhat | 382/15 |
| 5,095,312 | 3/1992 | Jehle et al. | 342/21 |
| 5,121,125 | 6/1992 | Guerci et al. | 342/204 |
| 5,146,229 | 9/1992 | Guerci et al. | 342/204 |
| 5,159,343 | 10/1992 | Harmuth | 342/22 |
| 5,175,552 | 12/1992 | Grieve et al. | 342/82 |
| 5,177,486 | 1/1993 | Kim et al. | 342/21 |
| 5,223,838 | 6/1993 | Tang et al. | 342/13 |
| 5,247,302 | 9/1993 | Hughes | 342/22 |

Primary Examiner—Gilberto Barrón, Jr.
Attorney, Agent, or Firm—Jim Zegeer

[57] ABSTRACT

A signalling system in time-frequency space for detecting targets in the presence of clutter and for penetrating media, includes a transmitter antenna system, receiver and processor system. The transmitter antenna system generates and launches into a medium containing the targets an energy pulse (wave packet) having a predetermined duration and frequency characteristic, and which energy pulse matches at least one of the following: 1) the time-frequency reflection characteristics of the target(s) but not the clutter, or 2) the penetration time-frequency dielectric window of the medium, or 3) the time-frequency characteristics of the window of the receiver. Preferably, the time-frequency wave packet is the complex conjugate of the impulse response of the combined medium and target.

The processor solves the wave equation for transmissions through the medium, reflectance from the target(s) and transmission back through the medium and causes a match of the generated wave packet signals to both the medium and target for maximum propagation through the medium and reflectance from the target, the wave packet match to the medium and the target being with respect to both time and frequency response characteristics.

22 Claims, 37 Drawing Sheets

| MIDFREQUENCY OR CARRIER $f_0$ | MIDPERIOD OR IMPULSE $t_0$ | FREQUENCY BANDWIDTH $\Delta f$ | TEMPORAL BANDWIDTH OF WP. $\Delta t$ | $f_{LOWER}$ (HZ) | $f_{UPPER}$ (HZ) |
|---|---|---|---|---|---|
| 1 MHZ (1x10$^6$ HZ) | 5x10$^{-7}$ (500 NSEC) | 250 KHZ (25x10$^4$ HZ) | 20x10$^{-7}$ (2 MSEC) | 0.875x10$^6$ | 1.125x10$^6$ |
| 10 MHZ (1X10$^7$ HZ) | 5x10$^{-8}$ (50 NSEC) | 2.50 MHZ (25x10$^5$ HZ) | 20x10$^{-8}$ (200 NSEC) | 0.875x10$^7$ | 1.125x10$^7$ |
| 100 MHZ (1X10$^8$ HZ) | 5x10$^{-9}$ (5 NSEC) | 25 MHZ (25x10$^6$ HZ) | 20x10$^{-9}$ (20 NSEC) | 0.875x10$^8$ | 1.125x10$^8$ |
| 1 GHZ (1X10$^9$ HZ) | 5x10$^{-10}$ (500 PSEC) | 250 MHZ (25x10$^7$ HZ) | 20x10$^{-10}$ (2 NSEC) | 0.875x10$^9$ | 1.125x10$^9$ |
| 10 GHZ (1X10$^{10}$ HZ) | 5x10$^{-11}$ 50 PSEC | 2.5 GHZ (25x10$^8$ HZ) | 20x10$^{-11}$ (200 PSEC) | 0.875x10$^{10}$ | 1.125x10$^{10}$ |
| 100 GHZ (1X10$^{11}$ HZ) | 5x10$^{-12}$ (5 PSEC) | 25 GHZ (25x10$^9$ HZ) | 20x10$^{-12}$ (20 PSEC) | 0.875x10$^{11}$ | 1.125x10$^{11}$ |
| 1 THZ (1X10$^{12}$ HZ) | 5x10$^{-13}$ (500 FSEC) | 250 GHZ (25x10$^{10}$ HZ) | 20x10$^{-13}$ (2 PSEC) | 0.875x10$^{12}$ | 1.125x10$^{12}$ |
| 10 THZ (1X10$^{13}$ HZ) | 5x10$^{-14}$ (50 FSEC) | 2.5 THZ (25x10$^{11}$ HZ) | 20x10$^{-14}$ (200 FSEC) | 0.875x10$^{13}$ | 1.125x10$^{13}$ |
| 100 THZ (1X10$^{14}$ HZ) VISIBLE | 5x10$^{-15}$ (5 FSEC) | 25 THZ (25x10$^{12}$ HZ) | 20x10$^{-15}$ (20 FSEC) | 0.875x10$^{14}$ | 1.125x10$^{14}$ |
| 1000 THZ (1X10$^{15}$ HZ) | 5x10$^{-16}$ (0.5 FSEC) | 250 THZ (25x10$^{13}$ HZ) | 20x10$^{-16}$ (2 FSEC) | 0.875x10$^{15}$ | 1.125x10$^{15}$ |

Table 1. Elementary Signal, $D_{0=}(f)$. $f_0 \cdot t_0 = 1/2$; $\Delta f \cdot \Delta t = 1/2$; $f_0 = 4\Delta f$; $t_0 = \Delta t/4$.

FIG. 7

ABC RATIOS

A. EARLY TIME (OPTICAL) RESPONSE
*ASPECT DEPENDENT*

B. RESONANCE RESPONSE
*ASPECT INDEPENDENT*

C. LATE TIME RESPONSE
*ASPECT INDEPENDENT*

(a)
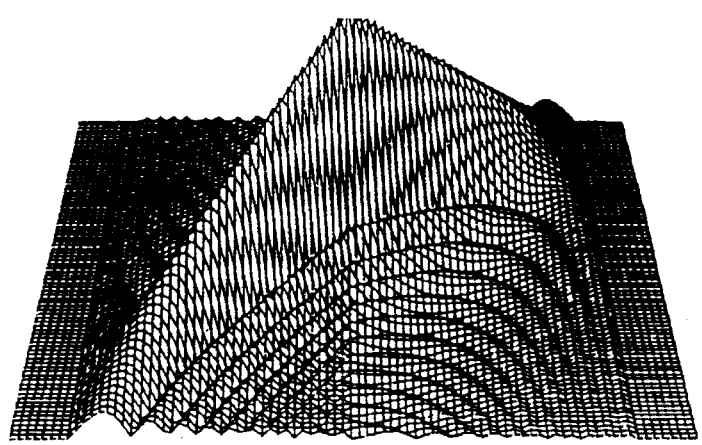
(b)
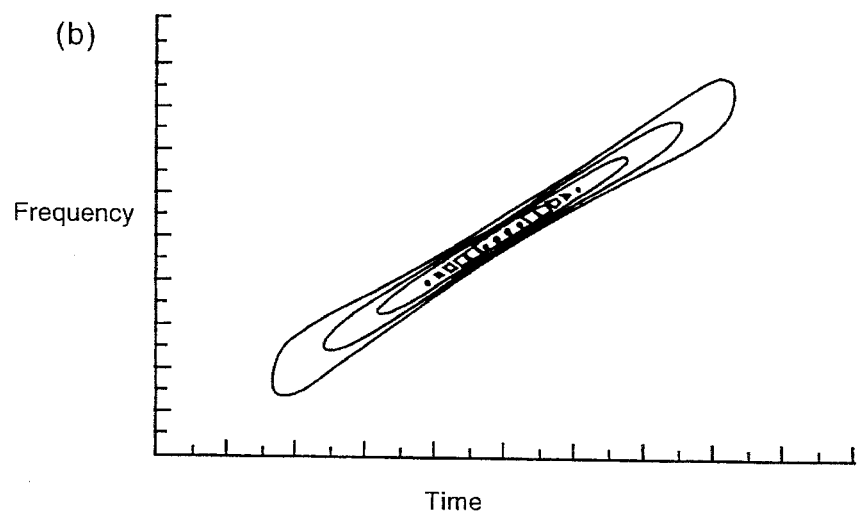
(c)
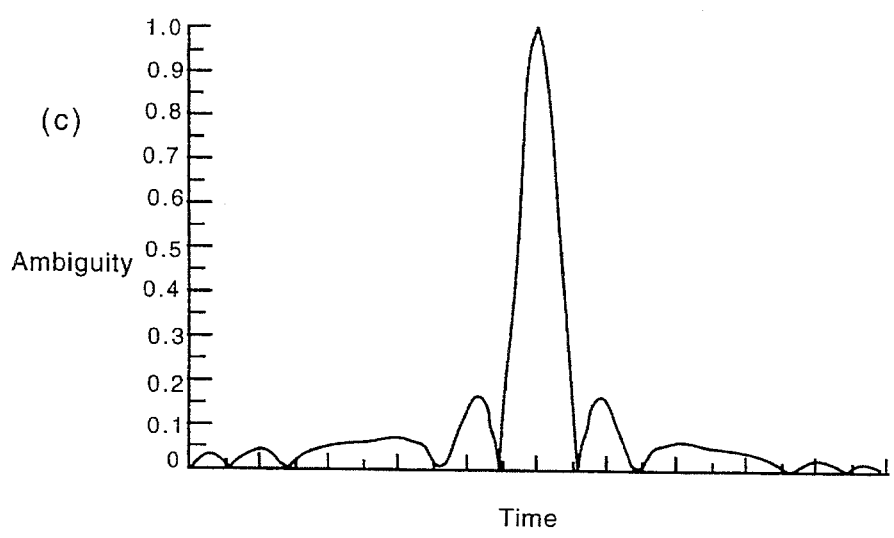
FIG. 12B $\Delta f.\Delta t = \text{foto} = (1/2)(2n+1), n = 0,1,2,3,\ldots$ Ranging and Detection for $K > 1$ and $K/\xi = 1$
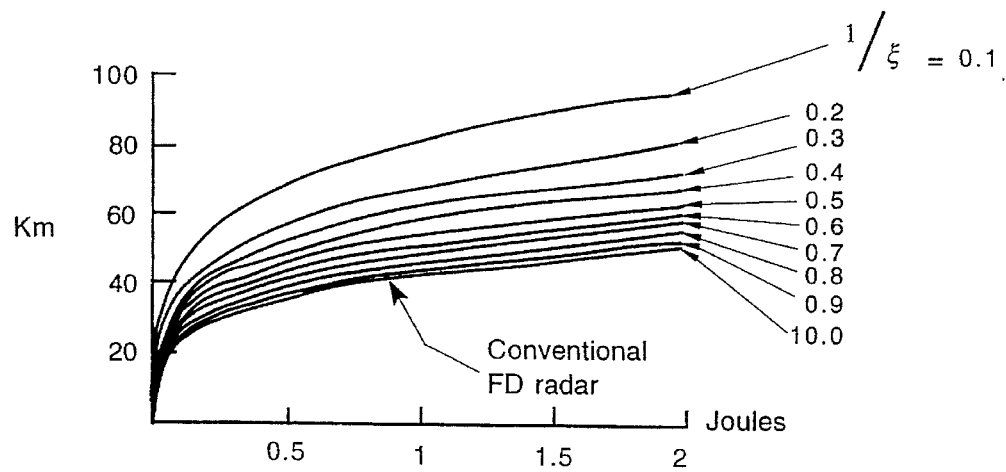
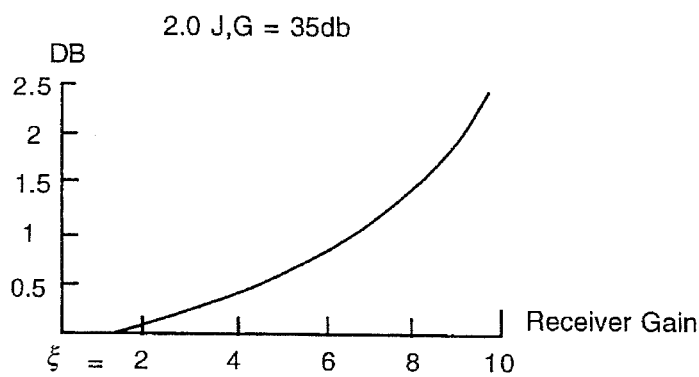
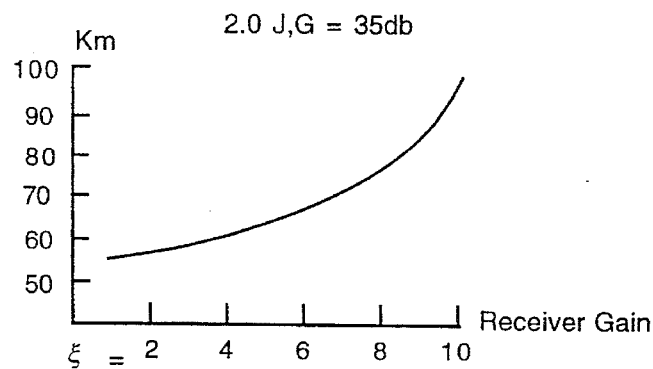
FIG. 30b

| Application areas for which WP systems promise superior performance | WP | Technical Deficiency of FD Systems | Specific Applications |
|---|---|---|---|
| A Counter-Clutter, Counter-Multipath, Counter-Raman/Scattering, Counter-Ionosphere. | Media penetration capability: Low+high frequency penetration; Ultrafast signal defeats relaxation time. | Clutter;multipath; atmospheric scattering; ionospheric Faraday effects & Nonlinearities. | Navy cruise-missle Low Flyer;Aegis-update; Ship-Satellite comm.link; RT. |
| B FOPEN, WEATHERPEN, GROUNDPEN, ICEPEN. | Media penetration capability:low + high frequency penetration; Ultrafast signal defeats relaxation time. | Relaxation time of media defeats continuous wave; Narrow bandwidth. | Tactical battlefield radar; Sortie Vehicle. |
| C Information-rich range resolution, higher order diffractions, elementary scatterers. | Inverse scattering;early (optical) target response; late (resonance) target response; permits imaging & accurate target ID. | FD receivers disperse pulse energy in frequency bins; narrow bandwidth; temporal length precludes excitation of higher diffractions. | Target ID; NCTR; radar early warning; SDI midcourse phase warhead/decoy discrimination. |
| D Long range surveillance. | Range resolution; target I.D.; "Selective Attention" (A priori info) for targets. | Information-poor return; inferior range resolution. | Air-to-air combat; AWACS-update; AEGIS-update;ADI. |
| E Spaced-based surveillance Lunar/Mars Rover. | Range resolution;light weight;modest prime power requirements;small size. | Large size;heavy weight; high power requirements. | All weather surveillance; Information-rich return; high range accuracy. |

FIG. 32

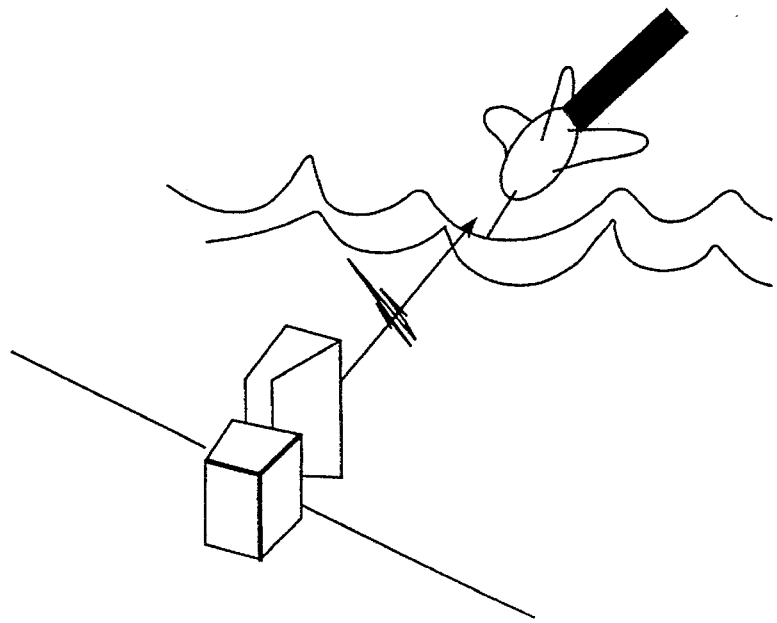
FIG. 32G
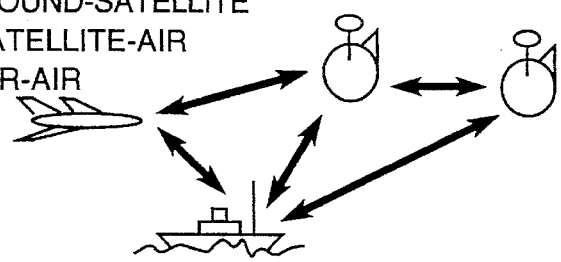
A. SATELLITE-SATELLITE
   SATELLITE-GROUND
   GROUND-SATELLITE
   SATELLITE-AIR
   AIR-AIR
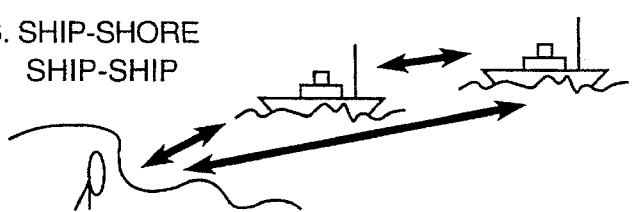
B. SHIP-SHORE
   SHIP-SHIP
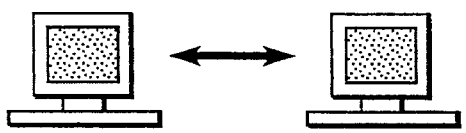
C. DATA TRANSFER LINKS
FIG. 32F (i)
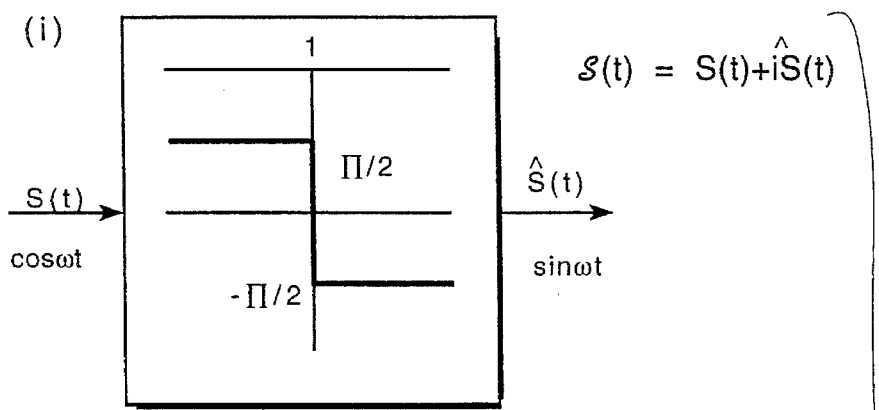
(ii)
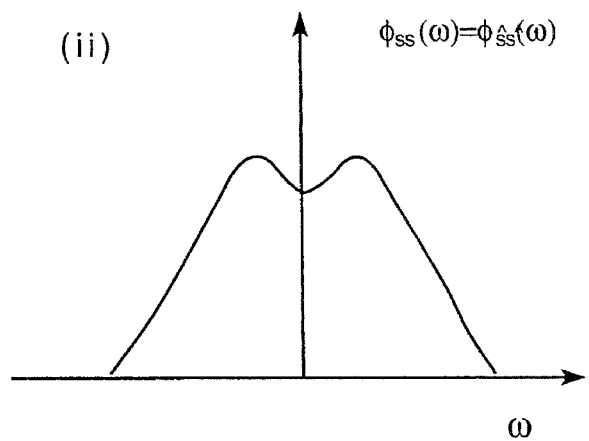
(iii)
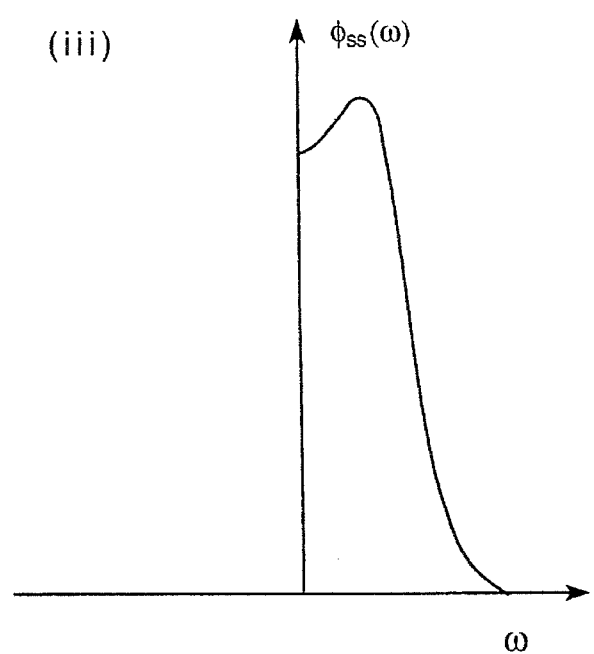
FIG. 36

ACTIVE SIGNALLING SYSTEMS

BACKGROUND OF THE INVENTION

The present invention relates generally to active signalling systems which are able (i) to penetrate media/instrumentation with high efficiency (optimally), and (ii) to sense, detect or image targets with high accuracy; and more particularly to time-frequency signalling systems which transmit wave packets which take the form of (i) mathematical descriptions of the time-reversed transfer characteristics of the medium and target, and (ii) physical solutions to the equations of motion of those signals with the medium.

It is desirable to resolve a target with high accuracy, and increase the range and the signal-to-noise ratio and the target-signal-to-non-target-signal ratio of the returned signal, of signalling systems such as laser or light detection and ranging (ladar or lidar), radio detection and ranging (radar), IR sensor systems and sound detection and ranging (sonar) systems. One of the standard methods for increasing signal detection is low signal-to-noise environments is the used of matched filter systems in the receiver process. Such matched filtering methods have been described often, e.g., in Minkoff (1992). These matched filtering systems of prior art exist in the reception and processing subsystems of the total signalling system. A common problem with the prior art signalling systems is that the signals used in the transmission system to penetrate, sense, detect or image targets/media are not matched to the target/media, and the matched filter is confined to the receiver/processor-side of the total signalling system. Therefore such systems do not achieve maximum range to target for the energy (Joules) input to the devices, nor can such devices resolve targets with accuracy from designated non-targets or "clutter".

Another standard method for resolving targets with high accuracy is the use of ultrashort pulse waveforms, also known as impulse signals, or time-domain signals, and sometimes inaccurately known as ultrawideband signals. Such signalling systems are also not matched to the target/media and when used with a matched filter in the receiver-processor subsystem also do not achieve maximum range for the energy (Joules) input to the devices, not can such devices resolve targets from clutter with accuracy.

OBJECTS OF THE INVENTION

Accordingly, it is an object of the present invention to significantly increase the range of signalling systems, while at the same time obtaining extremely high signal-to-noise ratios of target-to-background.

It is a further object of the present invention to provide a signalling system which decreases the clutter in the signal returning to the system and provides a system with "selective attention" for, or maximum reflectance from, or discrimination of, or resolution of, designated targets.

It is a further object of the present invention to provide a signalling system which optimally penetrates media and resolves, detects, and discriminates targets with high accuracy by using wave packet signals, which are precisely defined in both the time and the frequency domain, rather than primarily in the frequency domain, or primarily in the time domain.

It is a further object of the present invention to provide a signalling system which senses different forms of the reflectance response characteristics of the target, rather than a single response characteristic. The response characteristics of the target sensed by the present invention are also time and frequency characteristics, rather than primarily time characteristics or primarily frequency characteristics. The response characteristics of the target sensed by the present invention are diverse, e.g., the early time (or optical), the resonance, and the late time target responses, rather than one unitary response characteristic detected by prior art.

It is a further object of the present invention to provide a signalling system which senses or detects or resolves the individual scattering parts of a target, rather than detecting targets as single point scatterers. Therefore in the case of the present invention the target provides an "information-rich" signal echo return, rather than a binary presence/absence echo return. The informational "channel" between the signalling system of the present invention and the target is an ergodic (information preserving) channel, whereas the channels between prior art systems and the target are nonergodic and only provide information concerning presence or absence of the target.

Other objects, advantages, and novel features of the present invention will become apparent from the detailed description of the invention, which follows the summary and the accompanying drawings.

SUMMARY OF THE INVENTION

Briefly, the above and other objects of the present invention are achieved in a high accuracy detection system for detecting targets in a given medium comprising means for generating and transmitting in the given medium a time-frequency wave packet (pulse) which is the complex conjugate of the impulse response of the combined medium and target and a solution to the wave equation for transmission through the medium, reflectance from the target, and transmission back through the medium. The wave packet (WP) signals are matched to both the medium and the target for maximum propagation through the medium and maximum reflectance from the target. The wave packet match to the medium and target is with respect to both the time and frequency response characteristics, rather than time response characteristics alone, or frequency response characteristics alone.

Methods are described for characterizing the target and medium in terms of time-frequency transfer characteristics and for designing WPs matched to those characteristics. Means are described for crafting and launching such matched wave packets. Five different methods are described for obtaining sufficient energy interactive with target: (1) high energy individual wave packet signals emitters; (2) arrays of wave packet emitters; (3) wave packet signals emitted as trains of pulses; (4) combinations of (1)–(3); and (5) signal averaging.

Means are provided for receiving echos of the WP reflected from targets in a given medium. Matched filter means are provided in both time and frequency space so that the "instantaneous" time and frequency response characteristics of the return signal echo from the target are preserved, rather than a matched filter of prior art in which only the frequency, or only the time response characteristics are preserved. Finally, processing techniques are provided for two modes of functioning of the present invention: (i) the matched signal mode; and (ii) the imaging mode.

In one embodiment of the present invention, the WP signal is an expansion of time-frequency affine elementary signals of a class known as wavelets and developed by the inventor. In prior art (Gabor, 1946), the elementary signals do not have the affine property. In another embodiment of the present invention, the transmitted WP is a soliton wave packet which is a signal matched to the time and frequency response characteristics of specific and special media with characteristics defined below.

BRIEF DESCRIPTION OF THE DRAWINGS

The above and other objects, advantages and features of the invention will become better understood when considered with the following specification and accompanying drawings wherein:

FIG. 4A is a Graphical representation of emitter-medium-target-medium-receiver interactions; FIG. 4B is a Simplification of FIG. 4A representing media and target in terms of transfer function in time and frequency; FIG. 4C is a Schematic method for he characterization and definition of the time-frequency transfer function of both a linear and nonlinear unknown target and medium; FIG. 4D is a Schematic method for the characterization and definition of the time-frequency transfer function of a linear target and medium; FIG. 4E is a Simplification of methods shown in FIGS. 4C and 4D.

FIG. 7 is a tabulation of the affine elementary signal $D_0(f)=f_0 t_0=\frac{1}{2}$; $\Delta f\Delta t=\frac{1}{2}$; $f_0=4\Delta t$; $t_0=\Delta t/4$ at various frequencies. From Barrett, (1973, 1975, 1977).

FIG. 12B is a graphical representation of a time-frequency representation, the ambiguity function representation, of a linear frequency modulated pulse. (a) a 3-D view; (b) contour-plot in the time-frequency plane; (c) cut at $f_0$ (the autocorrelation).

FIG. 36 (i) Quadrature filter; (ii) Power density spectra of real signal and its Hilbert transform; (iii) Power density spectrum of the analytic signal. Note the absence of negative frequencies. After Papoulis, 1965.

FIG. 37 is a graphical representation of a method for crafting RF wave packets.

DETAILED DESCRIPTION OF PREFERRED EMBODIMENTS

The present invention is based on the transmission of WP signals defined in time-frequency space which are matched to the medium and target by an expansion of the time-frequency characteristics of signals, target and medium in an affine orthogonal function basis set expansion, which captures and preserves the instantaneous frequency, phase and amplitude relations. The expansion set is also physical as well as mathematical, so that a matched signal can be propagated and interact with the target/medium as the complex conjugate of the impulse transfer characteristics of the target/medium. The convolution of the matched signal and the target/medium's impulse response results in a unity, or, alternatively, an optimum transfer of the signal energy to the signalling system's receiver.

Figure 14:
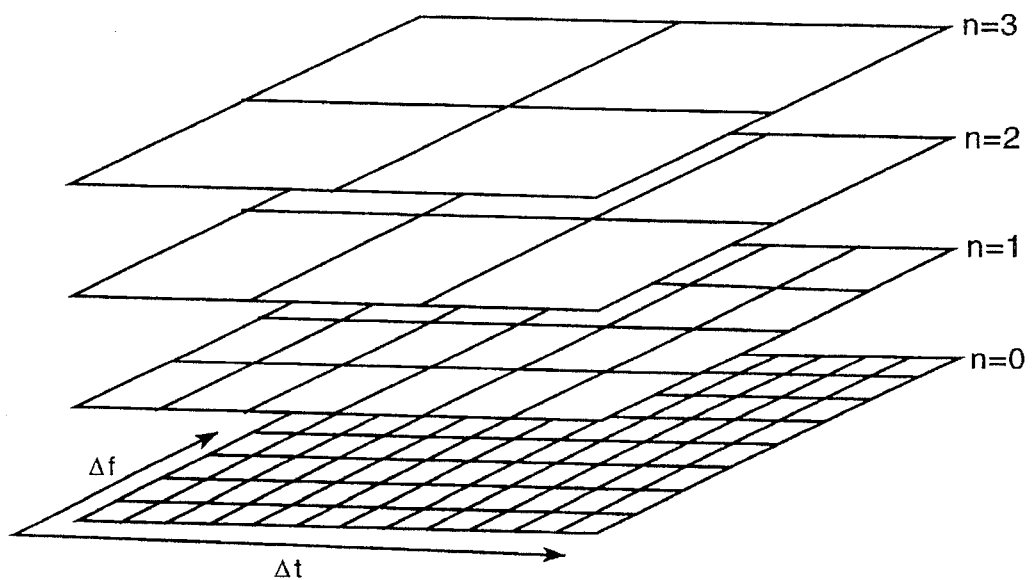
FIG. 14 is a representation of signal representation in $\Delta f\Delta t$ space at increasingly higher levels n'0,1,2,3, . . . n.
Figure 22:
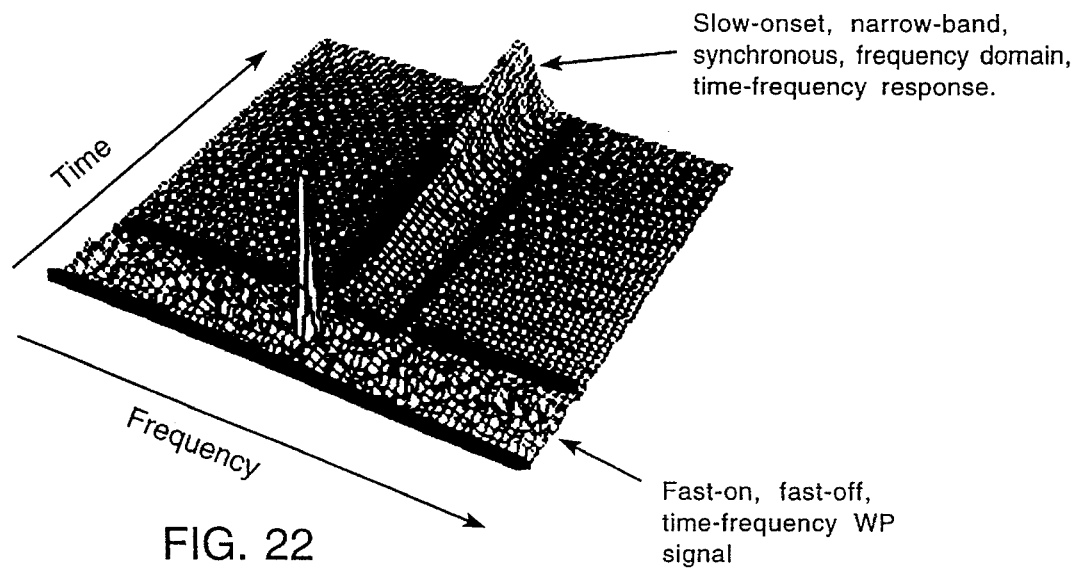
FIG. 22 Time-frequency representations of the response characteristics of a short pulse wave packet, and superheterodyne receiver. The steady state characteristics of both are at the identical frequency but the transient response of the signal is faster than that of the receiver.

Prior art provides signal expansions, e.g., Fourier series, the general Karhunen-Loeve expansion, but these are only mathematical descriptions and not also expansion in terms which are also solutions to a wave equation describing physically propagating WPs. The present invention uses a signal expansion method developed by the inventor in a series of papers (Barrett, 1971–8) and is a Karhunen-Loeve expansion restricted in terms of Weber-Hermite functions which are also solutions to a wave equation. The signal basis set can be viewed as an affine expansion in energy×frequency×time space. Each signal is defined in terms of four signal parameters: the frequency bandwidth, $\Delta f$, the temporal bandwidth, $\Delta t$, the midfrequency, $f_0$, and the midperiod, $t_0$, and a level parameter, n, such that: $f_0 t_0 = \Delta f \Delta t = (½)(2n+1)$, n=0,1,2,3 ... Signals of different levels, n, are orthogonal, with the signal modulating envelopes defined by the Weber-Hermite functions $D_n(x)=N_n H_n(\xi)\exp[-\xi^2]$, where $N_n$ is a constant such that $\int D^*_n(x)D_n(x) = 0$, and $H_n(\xi) = d^2D/dx^2 + (\lambda - t^2)D = 0$. As the signal modulating envelope and modulated signal are related by the mutual relations stated, signals, targets and media can be expanded in terms of these functions referenced by the modulating envelopes, $D_n(f)$, where f is frequency and n is the level or order of the function. That is, the signal, targets and media are defined in terms of a collection of affine time-frequency filters of varying frequency, the time-frequency windowing length of which can also vary according to the size of n (FIG. 14). FIG. 7 shows the relations of the four signal parameters of the basis set for only the n=0 conditions, i.e., for the $D_0(f_1)$ modulated signals, but unlike the Gabor signals, these $D_0(f_1)$ are affine related. In previous art, e.g., the Gabor expansion (Gabor, 1946), the signals were defined only with respect to a two, not four, dimensional mutual relation: $\Delta t \Delta t = ½$, and hence are not affine. Furthermore, the Gabor expansion does not permit a varying time-frequency windowing length, i.e., n=0 for all Gabor elementary signals, this results in a confusion concerning the initial and final conditions of a resonance system, i.e. its transient response. For example, FIG. 22 is a time-frequency representation of the response characteristics of a short pulse wave packet, and a superheterodyne receiver. In this example, the short pulse could be 1 nanosecond in duration with a midfrequency of 1 GigaHertz. The receiver characteristics, in this example, are a steady state frequency of 1 GigaHertz but an onset response of 100 MegaHertz. Thus, the steady state characteristics of both signal and receiver are at an identical frequency but the transient response of the signal is faster than that of the receiver. Therefore, the expansion of both the signal and the receiver in Weber-Hermite function, $\Sigma_n D_n(f)$, form are in terms of the some of the same frequencies, f, but are of different order, n. The level parameter, n, is determined by the signal/system transient response as opposed to the steady state response. The constant n=0 condition of prior art thus indicates an implicit assumption that all systems, signals, targets and media are of identical transient response, i.e., have identical onset and offset response times. This assumption is not true in most cases.

Figure 5:
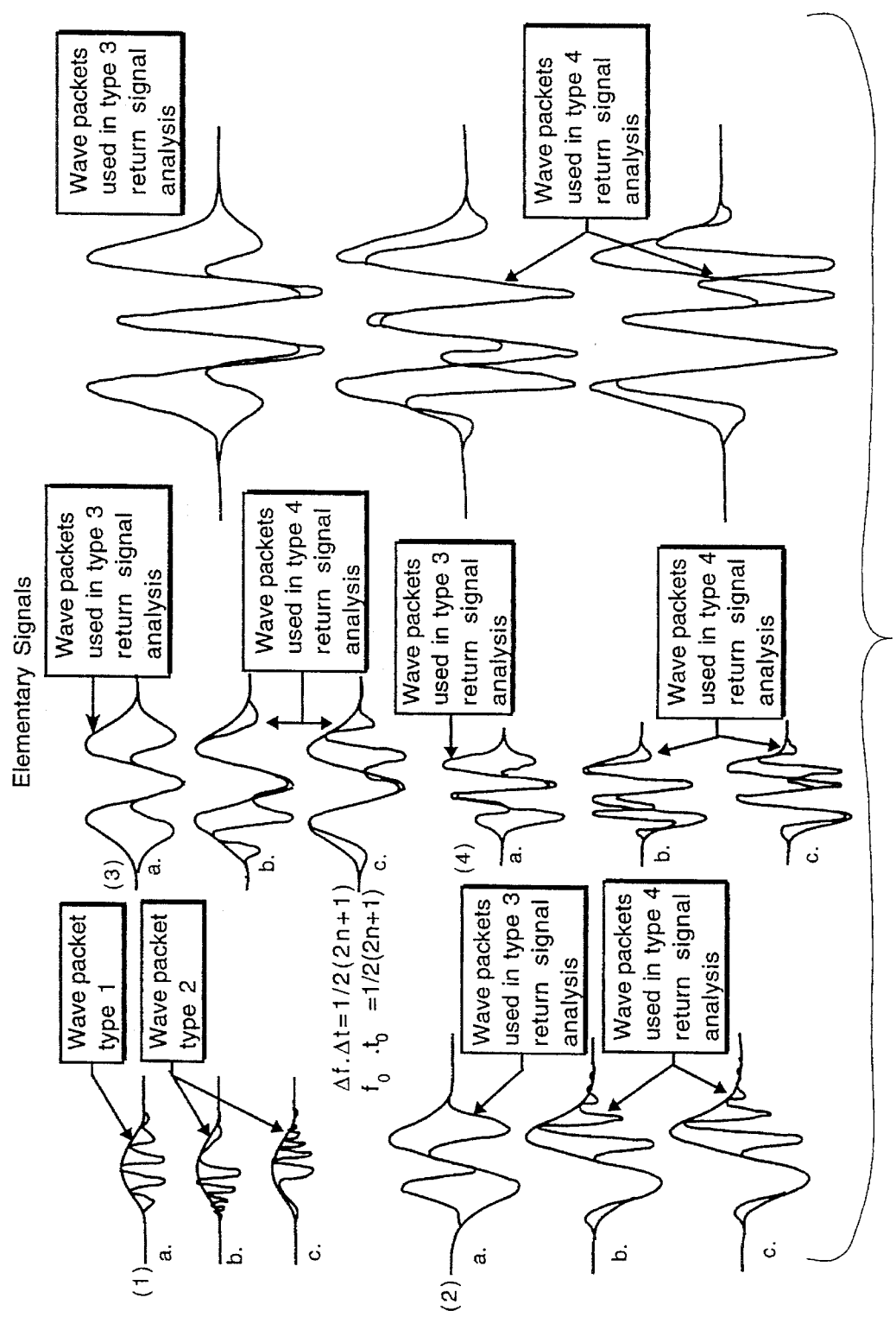
FIG. 5 is an affine elementary signals or signal basis set with amplitude modulations (1) $D_0(x)$; (2) $D_1(x)$; (3) $D_2(x)$; (4) $D_3(x)$; and (5) $D_4(x)$, where $D_n(x)=N_nH_n(\xi)\exp[-\xi^2]$ are Weber-Hermite functions, where $N_n$ is a constant such that $\int D^*_n(x)D_n(x)=0$, and $H_n(\xi)= d^2D/dx^2+(\lambda-t^2)D=0$. (a) of each set obeys the uncertainty products $\Delta f.\Delta t=f_0 t_0= (\frac{1}{2})(2n+1)$; (b) an (c) obey $\Delta f.f_0=(\frac{1}{2})(2n+1)$, where $\Delta f$ is the frequency modulation bandwidth. From Barrett, (1973, 1975, 1977).

Apart from the concise mathematical description in time-frequency form of the varying steady state and transient response of signals, targets and media, the signal descriptions and expansions, or affine elementary signals, used in the present invention (FIG. 5) are solutions of a wave equation. The functions, $D_n(f)$, which are the modulating envelopes of the functions $f_0.t_0=\Delta f \Delta t=(½)(2n+1)$, n=0,1,2,3, ..., are solutions to Weber's equation, or the wave equation for a confined oscillator. Weber's equation is only an approximation to the wave equation expected in real media. Therefore the signal description given here is idealized and it is expected that there will be modifications to, and deviations from, the idealized, $D_n(f)$-based description, depending on the media through which the signals must propagate. In fact, a drastic modification is described below when soliton propagation through special media is described.

Given that there are alternatives to the idealized Weber-Hermite function expansion basis set of description embodiment, the major unvarying requirements of the proposed invention remain that (1) the expansion basis must be an orthogonal series; (2) the basis elements must be solutions to a wave equation to ensure physicality, so that they can be emitted or launched; (3) the basis elements must be both well-defined in the time-frequency domain for steady state response description, and also an ordered set to describe the transient response description; and (4) solutions must be matched to medium for optimum propagation, and matched to target for optimum reflection. Prior art does not address (1)–(4).

Figure 1:
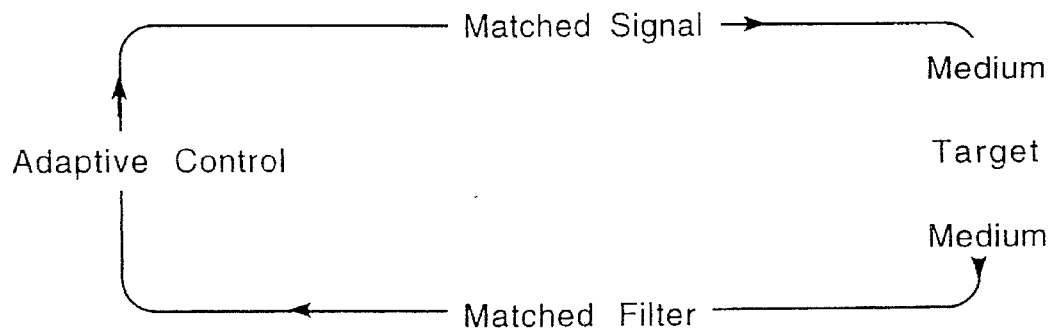
FIG. 1 is a schematic diagram of one embodiment of the present invention.
Figure 2A:
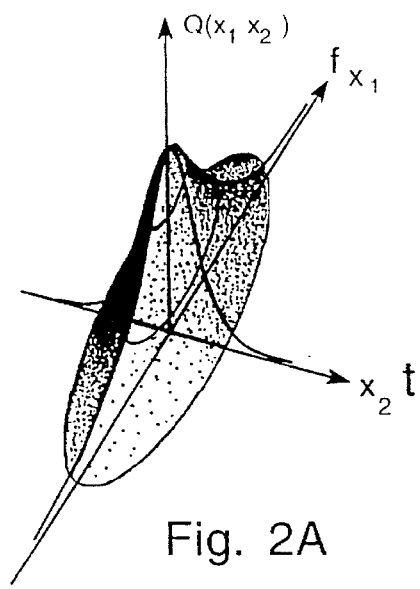
FIG. 2A is a representation of the Gaussian envelope of a representative signal in time-frequency space FIG. 2B are time-frequency representations of a signal considered as a random variable and as the result of a mapping (a) f=x(t) with the domain of t restricted, and the range of f broad; (b) t=x(f) with the domain of f restricted, and the range of t broad.
Figure 2B:
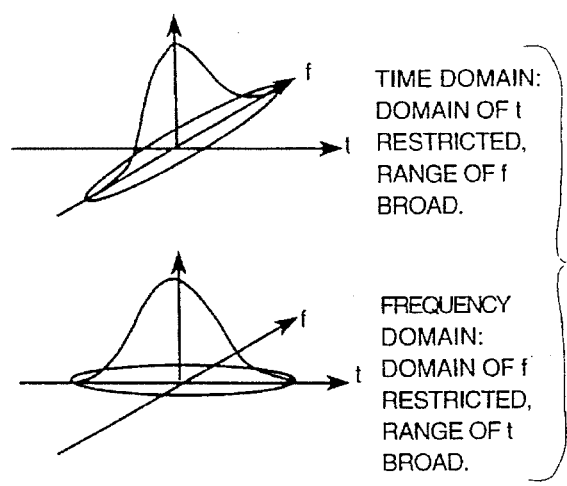

In general terms, the present invention is a system described in FIG. 1, in which there is adaptive control between the matched filter of the receiver-processor and the matched signal, which is physically launched to address the medium and target. Prior art provides neither the adaptive control nor the matched signal, but a signal which is unmatched, or matched by chance to target. The signal of the present invention is defined in both the time and frequency domains and its spread along the time and frequency axes will vary depending on the characteristics of the designated target (FIG. 2A). Ladar-lidar, IR, RF and sonar signals used n surveillance are random variables. Conventionally, signals have been considered of the frequency domain form, in which the domain of f is restricted, and the domain of f is broad, or of the time domain form, in which the domain of t is restricted, and the domain of f is broad (FIG. 2B). The signal referenced in the present invention are defined over both the time and the frequency domain (FIG. 2A).

FIG. 2A is a representation of the Gaussian envelope of a representative signal in time-frequency space. the frequency domain components of the signal are represented along the $x_1$ axis; the time domain components of the signal are represented along the $x_2$ axis; and the amplitude is represented in the z or $Z(x_1, x_2)$ direction. The envelope is not symmetrical but "squeezed" so that the frequency bandwidth is wider than the time bandwidth. This representative signal envelope could be that of a short duration pulse called conventionally a time domain or impulse signal. If the envelope were "squeezed" in the orthogonal direction it would be of narrow frequency bandwidth and wide time bandwidth. For such a case a signal would be called a frequency domain signal.

FIG. 2B are time-frequency representations of a signal considered as random variable and as the result of a mapping (a) f=x(t) with the domain of t restricted, and the range of f broad; (b) t=x(f) with the domain of f restricted, and the range of t broad. If, and only if, there is no phase modulation, then both mappings (a) and (b) are restricted (related) by the uncertainty relation: $\Delta f \Delta t = c$. If the radiation-target interactions are stationary (that is, the statistics of the radiation-matter interactions are not affected by a shift in the time origin), then these three dimensional plots could be reduced to two-dimensions, e.g., a single frequency-amplitude representation. However, as initial conditions (of radiation-matter interactions) are, in fact, important and significant in radiation-target interactions, and therefore those statistics are nonstationary, Cauchy-Rieman conditions apply and the signal representations cannot be reduced to two dimensions without loss of information.

Approaches to implementation of the present invention: the a posteriori and the a priori methods.

There are two approaches to the implementation of the preset invention which will be referred to as the a posteriori and the a priori methods. The a posteriori method permits the use of the a priori method.

The a posteriori method.

This method must be used if there are no known designated targets. Referring to a specific example, FIG. 3, the target, in this case, nonmoving, is irradiated by a short duration or impulse signal of wide bandwidth. The returning echo signals from the target are received at different positions around the target from various locations on the target, a, b and c. The signal received at a, is time reversed and then used as the emit signal, instead of the short duration impulse signal. That signal a, will be maximally reflected from one part of the target. Similarly, the signal b, received at another location and time reversed and used as an emit signal will be maximally reflected from another target location, and the signal c, etc., will be maximally reflected from yet another target location. This example demonstrates (1) that a target can be decomposed into individual scattering components, or elementary scatters, by an emitted signal which is shorter in temporal/physical length than the physical length of the target, and (2) that the elementary scatterers can be individually addressed by using a wave packet signal which is the complex conjugate of the impulse response of that individual scatterer, i.e., the impulse response of the individual scatterer convolved with the signal which is the complex conjugate of the impulse response results in a near unity response or optimum response scattering from that individual scatterer.

Figure 3A:
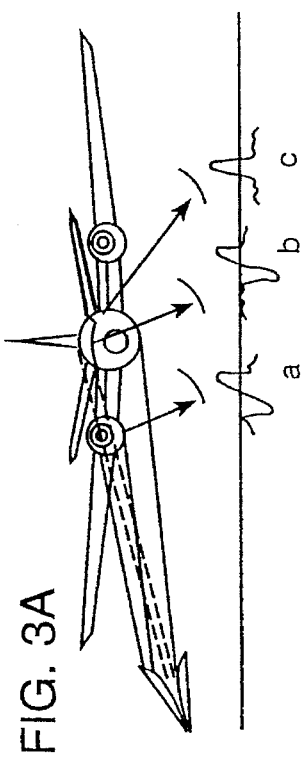
FIGS. 3A and 3B are a schematic representation of (i) the decomposition of a complex target into individual elementary scattering components; and (ii) the selective addressing of individual elementary scattering components by matched signals.
Figures 1, 3B:
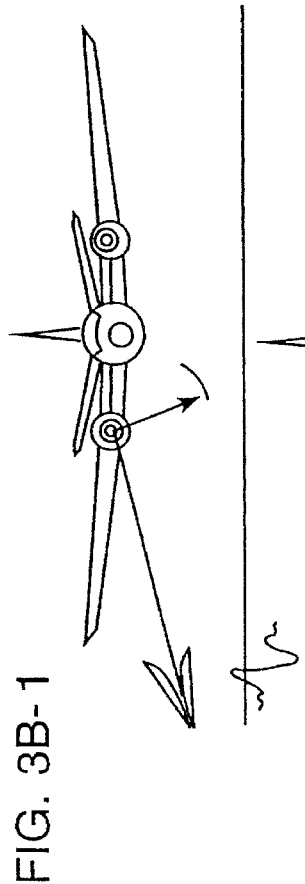
Figures 2, 3B:
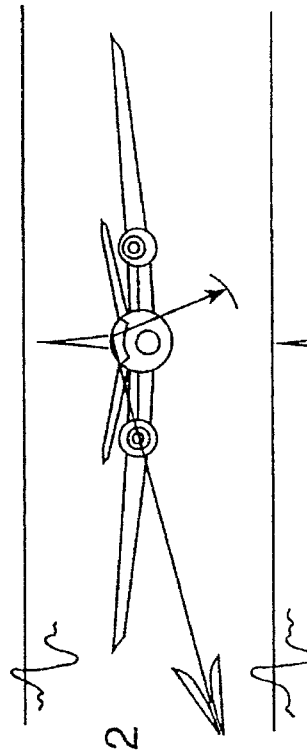
Figures 3, 3B:
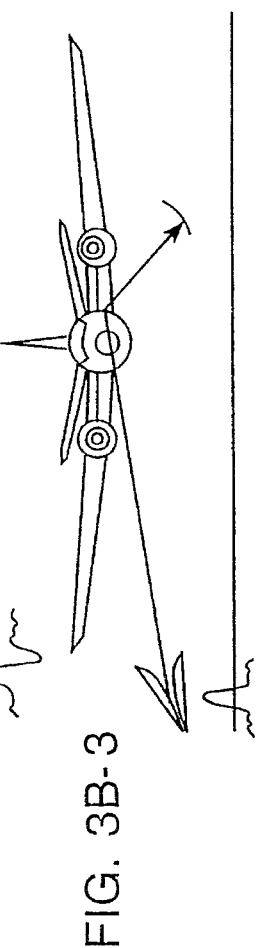
Figure 4A:
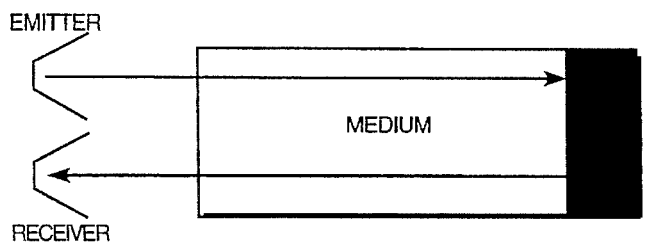
FIGS. 4A, 4B, 4C, 4D and 4E are schematic representations of a signalling system.
Figure 4B:
Figure 4C:
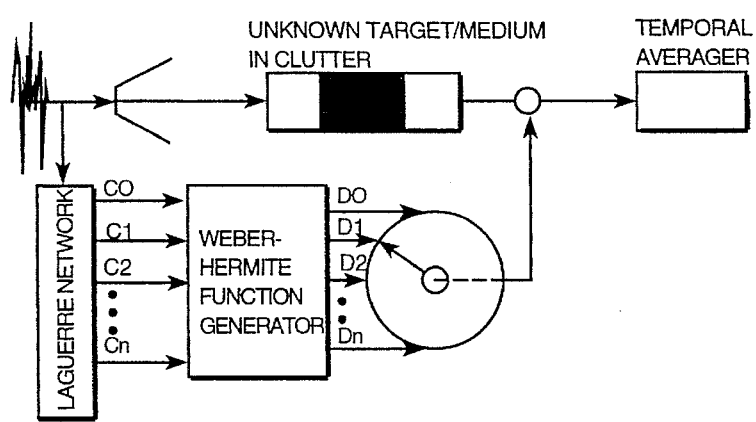
Figure 4D:
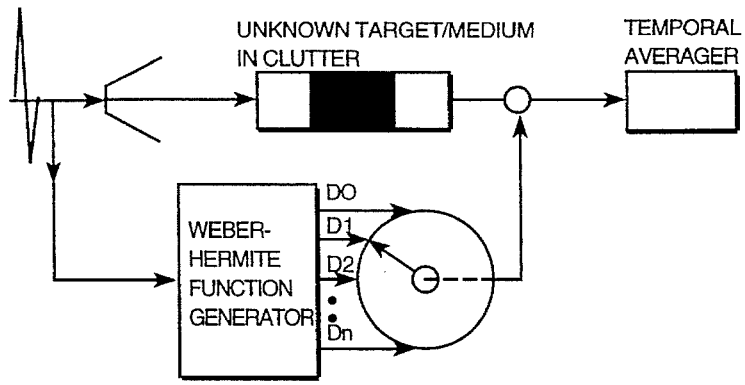
Figure 4E:
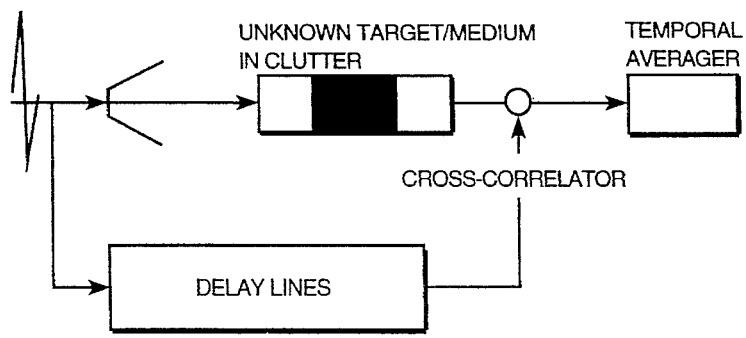
Figure 6A:
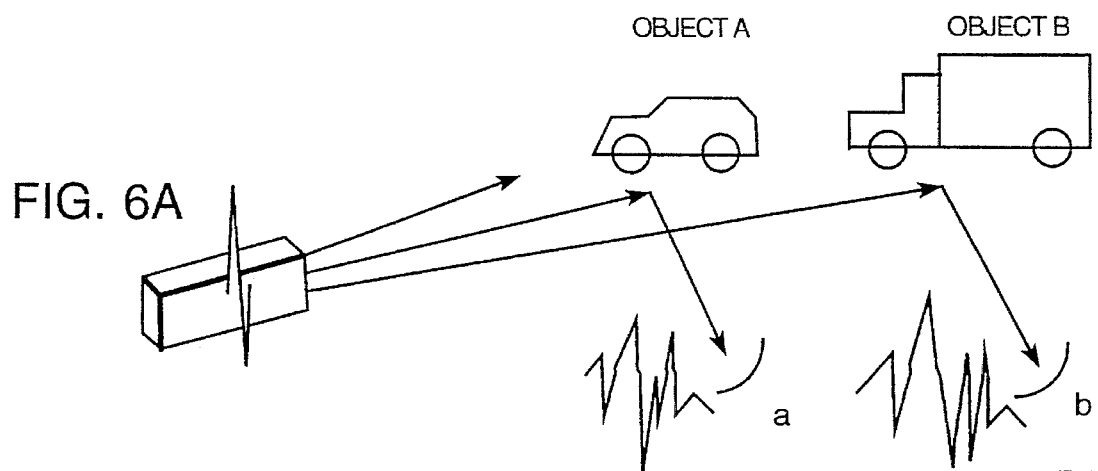
FIGS. 6A, 6B and 6C are schematic representations of the selective addressing of two targets by matched signals. In 1. two different targets are irradiated by a short pulsed time-frequency signal which provides a wideband signal of short duration. The signal echo returns are shown at a and b. In 2. the two targets are irradiated with a signal which is the complex conjugate (time reversed) of the response of target A to the short pulsed signal used in 1. In 3. the two targets are irradiated with a signal which is the complex conjugate (time reversed) of the responses of target B to the short pulsed signal used in 1.
Figure 6B:
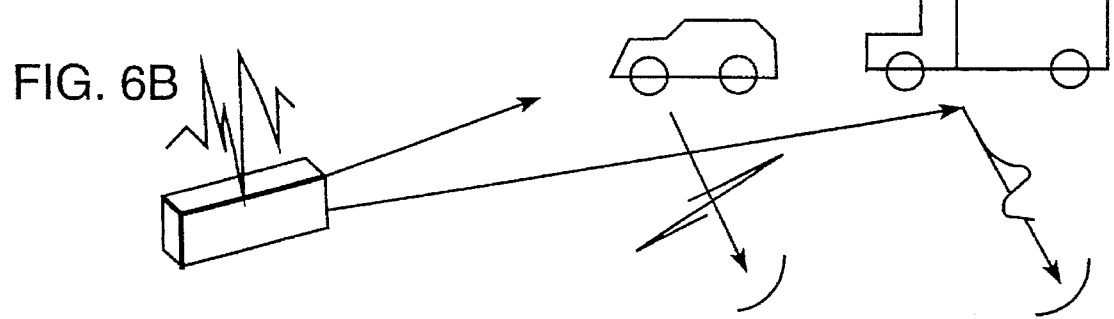
Figure 6C:
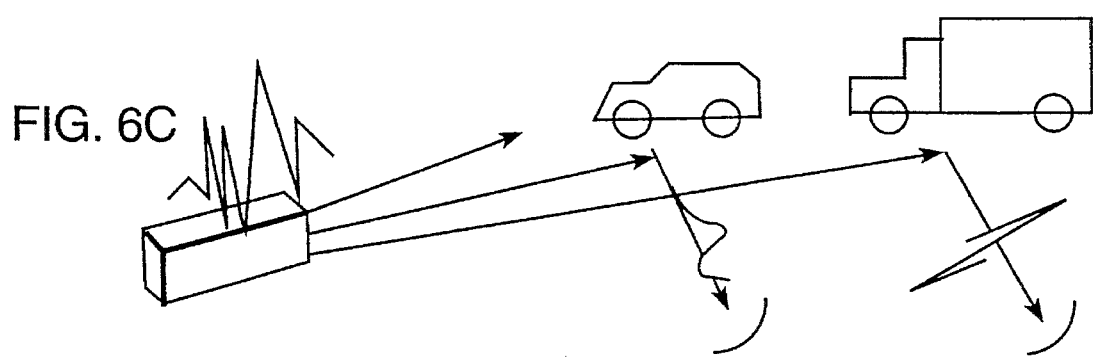
Figure 16:
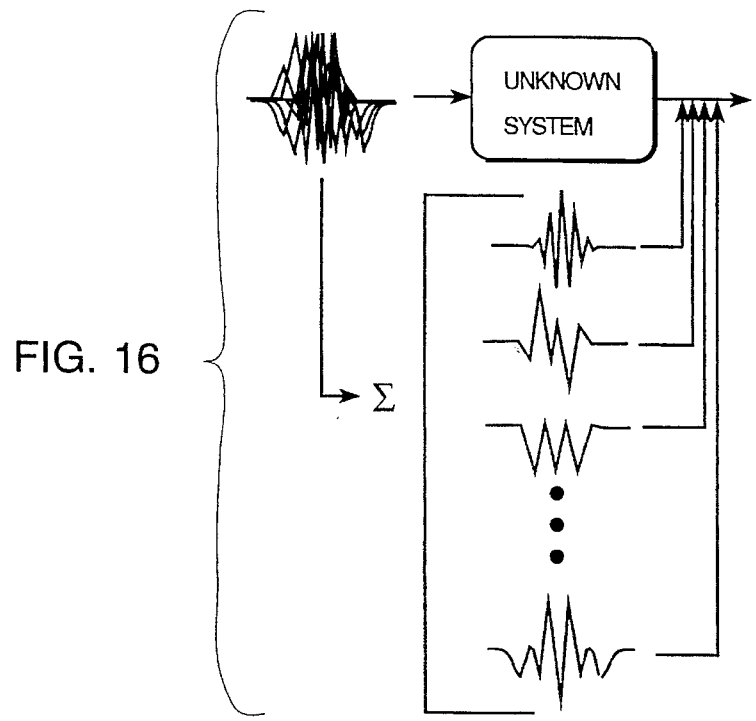
FIG. 16 is a schematic description of the method characterizing the time-frequency characteristics of a linear system in terms of a Weber-Hermite function basis set.

In system engineering terms, and referring to FIG. 4, the a posteriori procedure described in FIG. 3 may be characterized as follows. A signalling system emits a signal which propagates through media, interacts with and is reflected from a target, and then propagates back through media (FIG. 4A). However, such a series of interactions may be characterized as in FIG. 4B, in which those interactions are shown as transfer functions and characteristics. Furthermore, it is well-known that if the target transfer characteristics is unknown then those characteristics can be determined by understood procedures (cf. Wiener, 1958, Barrett, 1978, Schetzen, 1989). The procedure for determining the transfer characteristics of a linear and a nonlinear target/medium is to apply a comprehensive signal set of "all" frequencies, and "all" phase relations between those frequencies, which is white noise, decompose the same white noise, at the same time that it is being applied to the unknown target/medium into an expansion which is ordered by temporal delays, e.g., a Laguerre series, and then decompose the elements of that series into an orthogonal series, e.g., the Weber-Hermite series (FIG. 4C). The return from the target/medium is then convolved with the components of the expanded input white noise. The procedure for determining the transfer characteristics of an unknown multilinear target/medium is simpler, only a short wave packet pulse of broad bandwidth need be used and only the Weber-Hermite orthogonal set is needed (FIG. 4D). Furthermore, it is known that the difficult expansions into Laguerre and Weber-Hermite polynomial expansions need not be attempted, because the well-known cross-correlation of emitted signal and returned signal accomplishes the same description (FIG. 4E). However, the analysis of FIG. 4 provides insight in that it, referring to FIG. 4D, in the case of a particular unknown target-medium the returned echo signal maximally convolves with a certain collection of Weber-Hermite functions, $\Sigma_n D_n(f)$, then the complex conjugate of those functions can be used as the modulating envelope for a wave packet signal which will interact with the target/medium resulting in a near unity, or at least an optimum, signal return. FIG. 16 is a more explicit version of FIG. 4D. The procedure described in system engineering terms in FIG. 4 is thus the procedure followed practically and described in FIG. 3. A simplified version of FIG. 3 is shown in FIG. 7, in which different targets are addressed by different signals, indicating (i) that a signalling system can have "selective attention" to specified targets with maximum interaction; and (ii) that there can be minimum interaction with clutter, i.e., targets of no interest. FIG. 6(1), described a procedure in which two targets are irradiated with a short duration, wideband pulse or wave packet, and the return signal of each is received. FIG. 6(2) and (3), describe a followup procedure in which either the complex conjugate of one of the returned signals, a, from target A, is emitted, or the complex conjugate of the other returned signal, b, from target B, is emitted. In both cases maximum echo return is obtained from the designated target ("selective attention") and there is minimum returning echo from the other target.

The a priori method.

Figure 8:
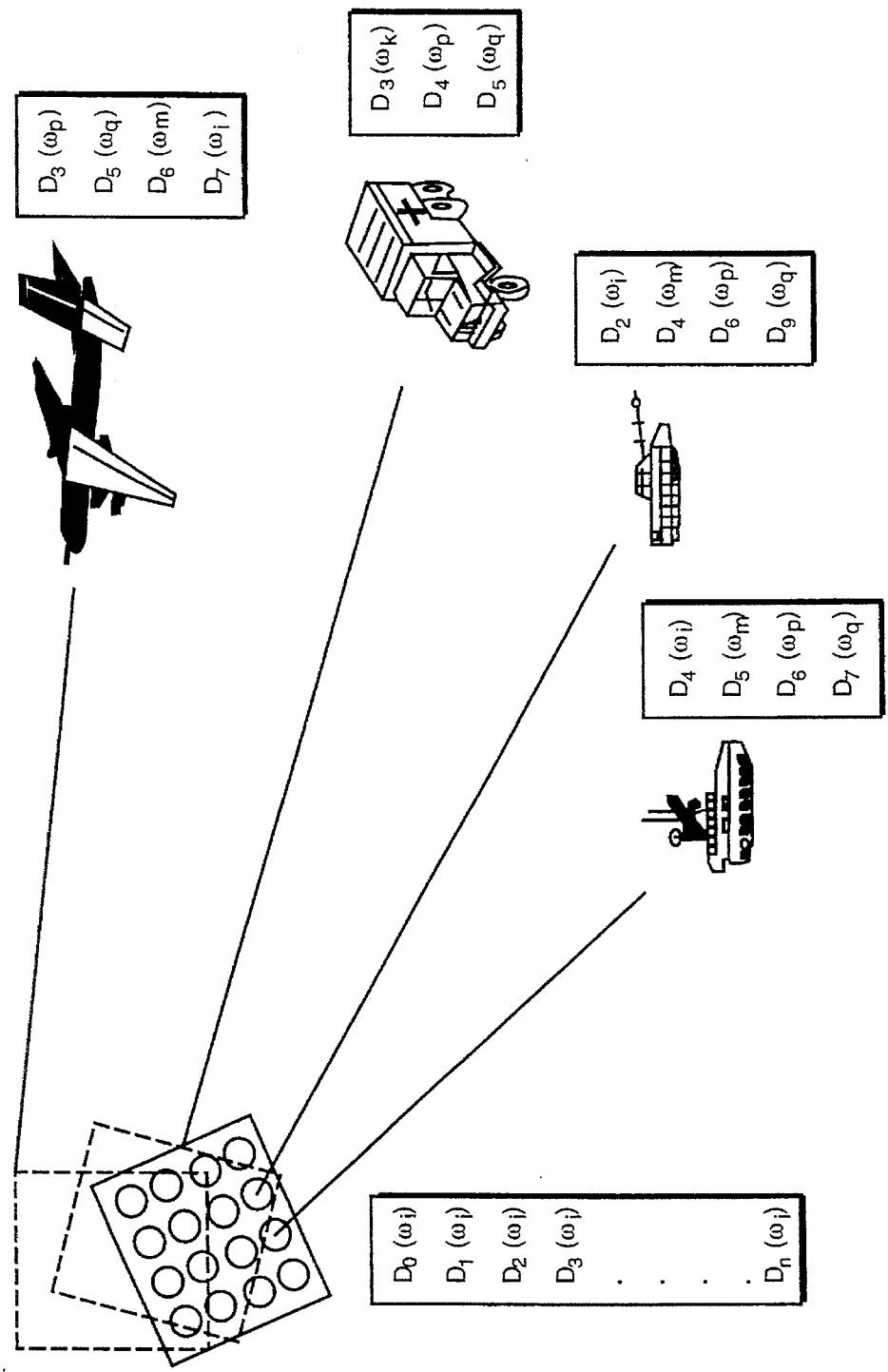
FIG. 8 is a schematic operation of signalling system in the a posteriori mode using an adaptive reconfigurable array. Array emits a short pulse defined in terms of elementary signal expansion. The targets are defined in terms of the elementary signal expansion of each targets transfer function.

It is anticipated that in most cases, the a posteriori method will not be used, because the general class of targets sought will be known. Therefore, the signal emitted will, in advance, be matched loosely to the designated class. A mode of functioning intermediate between no a priori knowledge of targets and complete knowledge is also envisaged. In FIG. 8, a moderately short pulse of moderate bandwidth is emitted and signal returns are obtained from four man-made targets. After reception and processing, a target can be designated and the emitted signal further crafted to approximate the complex conjugate of that designated target.

Time-Frequency or wavelet analysis and relationship to present invention.

The present invention is an application of time-frequency or wavelet approaches (cf Mallat (1988, 1989), Daubechies (1988, 1992)) but to both waveform design and wavepacket signal propagation, as well as signal analysis. Prior art applies the time-frequency analysis only to signal analysis. The Gabor elementary signals (Gabor, 1946) do not possess affine properties, so they are not wavelets, but are a related time-frequency method of processing. The well-known ambiguity function can be placed in wavelet and group theory form (Auslander & Tolimieri, 1985); and the Wigner-Ville distribution can be given a wavelet smoothing (Flandrin & Rioul, 1990). Wavelets can be used for spread spectrum with considerable advantages over other techniques such as Fourier analysis. From a mother wavelet one can construct families of daughter wavelets which are self-similar (Strang, 1989) and there is the capability of "zeroing in" on very fast transients—a capability not permitted by Fourier analysis.

Fourier transforms are acceptable disciplines for some applications, but not appropriate for others. For example, there are cancellations of sines and cosines at "dead spots" and the timing of a particular frequency's predominant contribution is not apparent. Reconstruction of the original signal is very much dependent upon phase. As Cohen has stated in his review (Cohen, 1989): ". . . the power of standard Fourier analysis is that it allows the decomposition of a signal into individual frequency components and establishes the relative intensity of each component. The energy spectrum does not, however, tell us when those frequencies occurred." The prime example of signals whose frequency content is changing rapidly is human speech and music. In fact, the musical score with its notes positioned according to frequency and duration is very similar to a wavelet representation. Each wavelet can be thought of as a musical not with respect to frequency, duration and location. In essence, wavelets permit the extraction of instantaneous frequency, instantaneous phase and, by use of the modulus squared: the instantaneous energy.

Wavelets, or time-frequency distributions in general, specifically address transients and track the time evolution of "frequency". They have a self-similarity which can describe fractals (Arneodo et al, 1988). They can also be used to distinguish targets in a dense target scenario (Naparst, 1991), 1/f type processes (Wornell, 1990) and nonstationary processes in general. (A stationary stochastic process is one in which there is no change in the statistics over time. A nonstationary stochastic process is one in which the statistics changes over time.) Generally speaking: wavelets are good for boundary detection, e.g., transitions in speech and edges in images (Combes et al, 1990; Meyer, 1992; Ruskai et al, 1992; and Chui, 1992a, b).

The Receiver Processor Design.

There are many ways to receive a wave packet signal, e.g., a fast sample-and-hold oscilloscope (for example, a Tektronix 602). The following describes a preferred embodiment. In the case of frequency domain (FD) detection of prior art, the detection of targets is based on simple threshold amplitude detection, i.e., threshold detection is a local time event. In the case of detection procedure of the present invention, the detection of targets is in the time domain (TD). In the present invention the autocorrelator produces a complex event amplitude, and it is on the basis of a global time event ($t_{global}$=c/a, where a is the maximum target length and c is the speed of light) that such a representation is based. From the point of view of detecting FD signals in noise of prior art, preserving the shape of the signal is of no importance. From the point of view of detecting TD signals in noise, on the other hand, preserving the shape of the signal is very important.

Threshold detection of prior art is a local time event because a signal exceeding threshold levels occurs regardless of events before or after the threshold level being exceeded. On the other hand, autocorrelation is based on a local time event being multiplied (compared) with events occuring in prior intervals in time. Thus autocorrelation places a local time event in a global time context. Whereas a local time threshold detection does not preserve the signal fine structure, a global time autocorrelation preserves and characterizes the signal fine structure.

Figure 21:
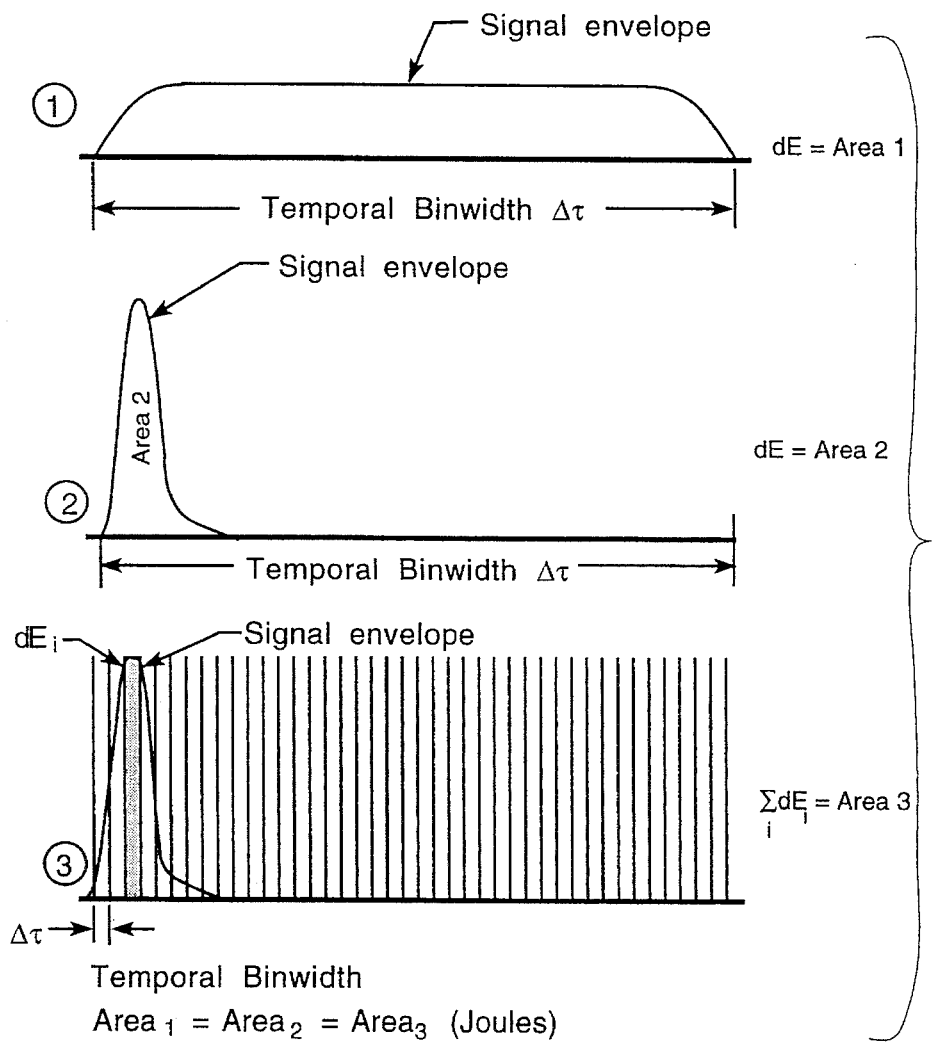
FIG. 21 Representations of the signal envelope of three signals of identical energy (area). Signal 1 contrasts with signals 2 and 3 in being of longer duration; signal 3 contrasts with signals 1 and 2 in being sampled with a small sampling window. Suppose that the energy in all three signals i 5 Joules; that the temporal length of the sampling bin ($t_n$) for signals 1 and 2 is 20 nanosec. and for signal 3, 1 nanosec.; and that the threshold for detection for all three signals is 3 nanosec./nanosec. Therefore, signals 1 and 2 will not be detected, as the signal length/bin length ratio is 5/20<3/1. However, signal 3 is detected, as the signal length/bin length ratio is 5/1>3/1. Signal 3 is also detected despite the fact that it was of the same energy as signals 1 and 2. The integrating time, $t_{int}$ is different in the case of signals 1 and 3, but the duration and energy of the two signals, $\Delta t$, is the same. As signal 3 is detected, but signal 1 is not, $1/t_{int} \neq 1/\Delta t$.

In the case of FD receiver design of prior art (FIG. 21) the bandwidth and the pulse duration are grouped since the product is usually of the order of unity in most FD pulse-radar applications. The operation of a detector in the mixing mode results in a much lower conversion loss and is the reason for the excellent sensitivity of the superheterodyne receiver. IF amplification is also more stable and has a wider bandwidth than microwave amplification. Finally, for coherent processing, the outputs of the IF amplifier may be processed by a pair of synchronous or phase-sensitive detectors to produce in-phase (I) and quadrature (Q) baseband Doppler signals that can be processed to extract moving targets and reduce the effects of stationary clutter. In this case, a coherent IF oscillator (COHO) is obtained from a coherent transmitted signal. While coherent phase detection is not precluded from the TD processing of the present invention, the local oscillator method of achieving it across a broad bandwidth will be in most embodiments.

There is a fundamental difference between detection and characterization of a target and that difference bears directly on the receiver-processor design of the present invention. The ability of TD systems of the present invention to characterize a target far exceeds that of FD systems of prior art—but only if the correct receiver-processor design philosophy is adopted. In the case of TD systems of the present invention, the probability that the signal will be detected is the same as the probability that the amplitude of the power density spectral line will deviate from a noise or clutter distribution by a predetermined amount. Thus in TD analysis the power density spectrum is paramount. TD system receivers of the present invention also achieve more than detection— they also achieve target characterization. In characterizing the target the power density spectral representation of the return signal requires further processing for categorization and recognition.

Whereas in the case of TD receiver systems of prior art the probability of false alarm is related to threshold detection levels in the case of TD receiver systems of the present invention the probability of false alarm is related to (i) the characterization of the returned signal in a power spectral density representation; and (ii) the classification of that representation by, e.g., associative processor (neural net) methods. In the present invention, characterization is a function of the receiver sampling speed; and classification is a function of (a) the processor's capability of distinguishing classes of inputs; and (b) the difference between the transfer function of target and noise (i.e., their orthogonality).

The degree of orthogonality refers to how different the functions are which describe the transfer function of the signal and noise. Complete orthogonality means that those functions are perpendicular to each other in a Hilbert space signal representation. This means that in processing, arithmetic operations can be used which result in zero outcome when orthogonal signals are multiplied together, thus enhancing signal-to-noise ratios between those signals. Usually, the signal and noise are somewhat less than completely orthogonal. Thus for TD receiver systems of the present invention the concept of detection versus false alarm is taken out of the context of simple threshold detection and placed in a context involving the receiver and processor capabilities, as well as the nature of the noise (clutter).

This is not to say that signal modifications to enhance detection cannot be employed in the time domain reception of the present invention. For example, the detection of rapid changes in energy versus time could be used in parallel with, or triggering a processing path which preserves the signal fine structure. Rather, it is to emphasize that in the present invention the processing path which preserves the signal fine structure is paramount to time domain reception, regardless of ancillary methods used for detection.

Figure 17:
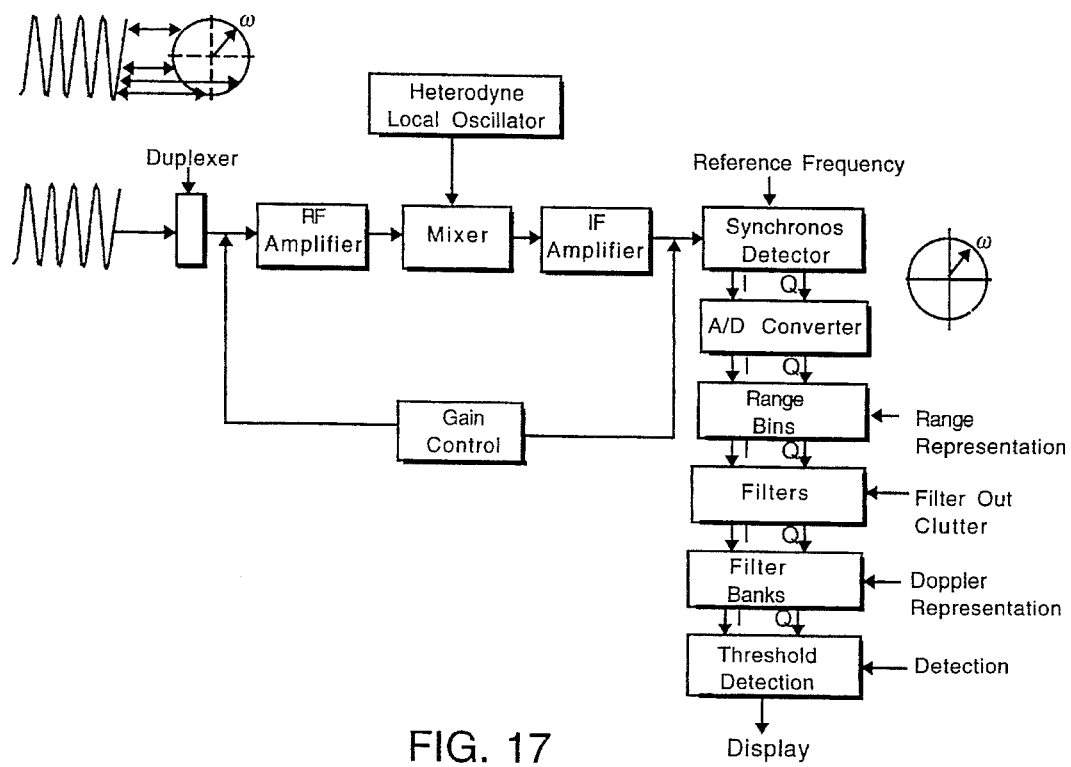
FIG. 17 is a schematic diagram of the canonical form of a frequency domain receiver processor or superheterodyne receiver. The method of signal acquisition uses a local oscillator and mixer. This is a simplified model receiver processor used for discussion and comparison with a time domain receiver shown in FIG. 18.
Figure 18:
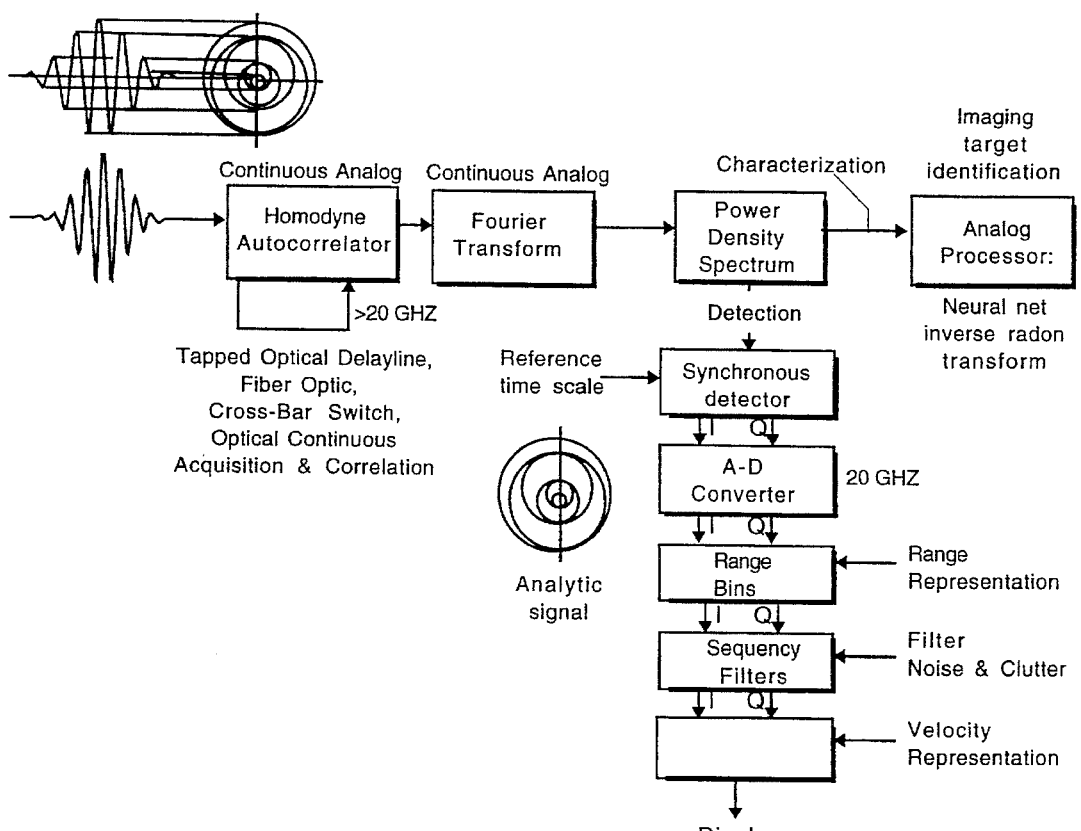
FIG. 18 is a schematic diagram of the canonical form of the time domain receiver processor or homodyne receiver. The method of signal acquisition uses coherency or auto-correlation. This is the receiver processor model used for discussion in performance prediction.

In the case of FD surveillance of prior art, the important parameters affecting range are the total transmitted energy, the transmitter gain, the effective receiving aperture and the receiver minimum signal to noise ratio (FIG. 17). The same parameters are important in TD surveillance (FIG. 18), but due to the need to process the fine structure of the return signal, the additional parameter of receiver gain (i.e., the increase in signal-to-noise detection level due to fast, non-distorting sampling of the signal fine structure) assumes central importance. The receiver gain also affects the maximum range achievable by TD systems.

The power density spectrum presumes autocorrelation of the target return. Autocorrelation is applicable to periodic and aperiodic signals, but whereas autocorrelation is unnecessary in the determination of the power spectrum and the energy density spectrum, it is the only means by which the power density spectrum of random functions is calculated (Lee, 1960). Autocorrelation is applicable to TD of prior art and TD random signals of the present invention, but whereas FD signals can be detected by envelope detection threshold methods, in a preferred embodiment TD signals must be detected by power density spectral threshold methods, if information concerning target characterization is to be preserved.

It should be noted that a TD signal of the present invention can be detected without autocorrelation, but the full potential of TD surveillance would not be utilised and this is a less preferred embodiment. Moreover, a target can be detected using a TD signal without obtaining the power density spectrum for the returned signal, but the complete ambiguity function or wavelet description would not be used, information would be discarded, and therefore this would be a less preferred embodiment. There are thus two ranges for TD surveillance of the present invention—target detection range, and target identification range.

There are clear advantages of crosscorrelation over autocorrelation, e.g., crosscorrelation preserves signal phase information, but autocorrelation does not. There is thus always the remote possibility that two return signals will be confused of identical frequency content, but different phase relations. Nonetheless, the crosscorrelation procedure assumes that the reflecting target placed no information on the transmitted signal, that an information-rich return with distinguishing contributions from the individual target scatterers will not occur, and that the signal-target interaction will not lengthen and "distort" the transmitted signal. Therefore, using crosscorrelation methods is desirable in embodiments of the present invention, but the equally desired signal-target interactive process, which provides an information-rich return, can preclude crosscorrelation of the transmitted and the altered return signal without information being lost due to an increased temporal length of a returned signal. If TD surveillance is used in the detection mode only (without target characterization), then crosscorrelation could be used to advantage and the target described in cross spectral density terms which preserve phase, rather than power density spectral terms which do not.

Cross-correlation can also be used in embodiments of the present invention for correlating coded trains of emitted and received signals/pulses. Whether autocorrelation or crosscorrelation methods are used, TD surveillance exceeds the capabilities of FD surveillance of prior art in that after target detection, the target can be characterized or classified, e.g., by neural net or other methods.

If a periodic or aperiodic function of time is completely determined for every value of the independent variable, time, the description of the function is given for the whole set of values of the independent variable. These functions can be described in the time domain and by means of harmonic analysis or Fourier's theory, the same functions can be described in the frequency domain. However, surveillance signals are not deterministic, i.e., not periodic or aperiodic, but random. If a function is probabilistic or random, then different problems arise with different solutions. In surveillance, from the receiver's perspective the signal returning from a target is a probabilistic or a random event.

In the case of point detection radars of prior art, the limited objective is to detect a target's presence and range, not detailed information concerning the target. In the case of ladars/lidars/radars/sonars incorporating the present invention, there is an additional objective besides detection of presence and range: that of the detecting the informational structure in the return signal. Without a priori knowledge concerning the informational structure, the return signal is a random variable or event. To detect or characterize that random event, sampling theory constraints will necessarily limit receiver operation. Such random variables have a phase space representation, where "phase" is used synonymously with "state" and defined for systems with 2N coordinates, i.e., a 2N-dimensional space. Because such signals have random initial conditions, the signals, as ensemble averages, have a certain well-defined power density spectral distribution.

Whereas in frequency domain receivers of prior art the random signal, as a single local time event, i.e., an "instantaneous" threshold detection, is compared against a probability distribution of noise random variables; in time domain receivers the signal random variables are compared as a distribution or global time event, i.e., a summation of temporally displaced comparative measurements (autocorrelation), against the same probability distribution of noise random variables. In the case of a receiver of prior art the return signal will be detected as a threshold event. In the case of a time domain receiver of the present invention, the return signal will be represented or characterized as a distribution. The analog representation of the analog returned signal as a distribution, instead of the detection of the analog returned signal as threshold event and then digital representation, dictates that the TD returned signal of the present invention must be sampled with temporal windows less than the signal duration. These differences in the nature of FD of prior art and TD signals of the present invention indicate the duality of the paradigms or system-concepts of FD and TD receiver-processors.

The relation, as well as the differences between the two types of processors, can be shown in the ambiguity function description in which the energy of the signal is represented along both a time axis (the autocorrelation) and a frequency axis (the power spectral density) (FIG. 2B). Random variables are defined as an abstract set of experimental outcomes and not as points of a real line in order to avoid infinitely dimensional spaces (Papoulis, 1962). The difference between the time and frequency domain representations is due to the differences in their mappings: f=f(t) in the case of the time domain, with the domain of t restricted and the range of f broad; and t=f(f) in the case of the frequency domain, with the domain of f restricted and the range of t broad. The relation of the two mappings is due to both being restricted by the relation: $\Delta f \Delta t$=constant.

For example, in the case of the FD receiver of prior art, the integrated signal energy (target return) increases in direct proportion to the integration time. By increasing the integration time, therefore, the signal to noise ratio can be increased significantly.

On the other hand, in the case of TD systems of the present invention integrating does help the process of detection, but for target characterization and detection the signal to noise increases in direct proportion to the sampling speed (i.e., to the decrease in sampling interval). By decreasing the sampling time (window), therefore, the signal-to-noise ratio can be increased significantly. For TD processing, decreased sampling time and increased sampling speeds results in additional processing gain and therefore range is obtained by detection of rate of change of energy. Processing gain through detecting the rate of change of energy, rather than absolute energy, can provide more sensitive detection and increased range for a given transmitted energy.

In FD systems of prior art the mixer is by far the preferred front-end component. In general, mixers are used to convert a low-power signal from one frequency to another by combining it with a higher-power local oscillator (LO) signal in a nonlinear device. Usually, the difference frequency between the RF and LO signals is the desired output frequency at the intermediate frequency (IF) at subsequent IF amplification. Mixing with local oscillators down converts to intermediate frequencies and in the IF section narrowband filtering is most easily and conveniently accomplished. Subsequent amplification and detection is based on the intermediate frequency signal.

The operation of a detector in the mixing mode results in a much lower conversion loss and is the reason for the excellent sensitivity of the superheterodyne receiver of prior art. However, that sensitivity comes at a price: loss of information in those radiation-target interactions in which the Gaussian approximation of the noise statistics do not apply. The mixing action is due to a nonlinear transfer function:

$$I=f(V)=a_0+a_1 VG+a_2 V^2+a_3 V^3, \ldots a_n V^n \quad (1)$$

where I and V are the device current and voltage. If $V_{RF}\sin w_{RF}t$ is the RF signal and $V_{LO}\sin w_{LO}t$ is the LO signal, then the mixing products are:

$$I=a_0+a_1(F_{RF}\sin\omega_{RF}t+V_{LO}\sin\omega_{LO}t)+a_2(V_{RF}\sin\omega_{RF}t+V_{LO}\sin\omega_{LO}t)^2+ \\ a_3(V_{RF}\sin\omega_{RF}t+V_{LO}\sin\omega_{LO}t)^3, \ldots a_n(V_{RF}\sin\omega_{RF}t+ \\ V_{LO}\sin\omega_{LO}t)^n \quad (2)$$

The mixing action of receivers of prior art produces primary mixing products which come from the second-order term. However, many other mixing products—the intermodulation products—may be present within the IF passband. Mixing produces not only a new signal but also its image, i.e., $w_{LO}\pm w_{RF}$. However, for broadband applications, especially for octave bandwidths, filtering cannot be used for image rejection.

For example, the second-order term for a narrow band FD echo is:

$$a_2(V_{RF}\sin\omega_{RF}t+V_{LO}\sin\omega_{LO}t)^2 \quad (3)$$

but for a broad-band TD echo it is:

$$a_2(V_{RF1}\sin\omega_{1RF}t+V_{RF2}\sin\omega_{2RF}t+V_{RF3}\sin\omega_{3F}t+ \ldots V_{LO}\sin\omega_{LO}t)^2 \quad (4)$$

The output is then:

$$\Sigma_{ij} V_{LOi}\sin\omega_{LOi}t V_{RFj}\sin\omega_{jRF} \quad (5)$$

which possesses too many innermodulation products for use as an IF input.

Due to the broadband nature of the WP signal of the present invention, the superheterodye receiver is the less preferred embodiment of TD signal receivers of the present invention due to the number of mixing products produced. Another reason for the superheterodyne design is less preferred is that information about the target is lost. It has been conventional wisdom that the supeheterodyne design and the homodyne design provide the same information about the target—but this is only true for the assumption of a Gaussian approximation of noise in radiation-target interactions. For pulses short with respect to target dimensions, the Gaussian approximation is invalid. Therefore there are also physical reasons for using homodyne receivers as a preferred embodiment in the present invention.

Figure 35:
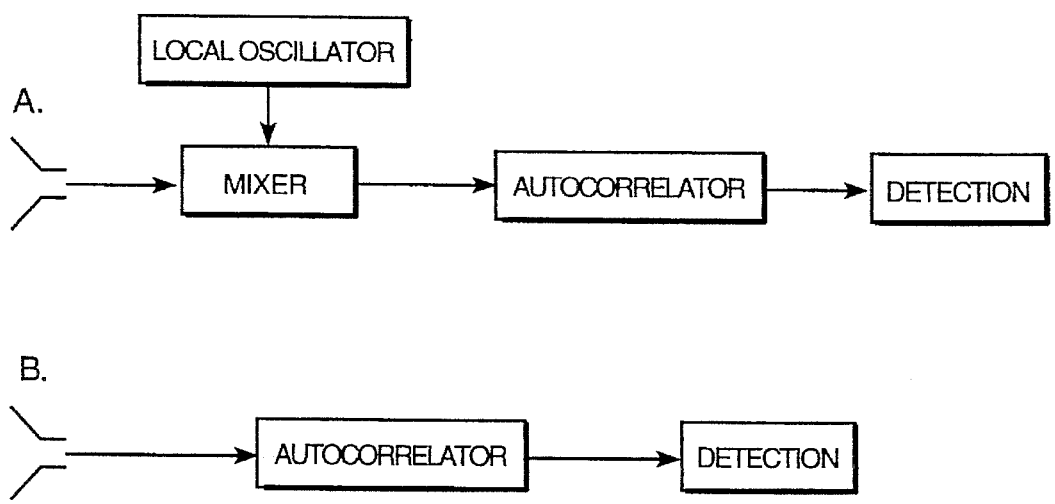
FIG. 35 A Schematic heterodyne receiver; B. Schematic homodyne receiver. All amplification amplification methods have been omitted in both cases.

A schematic representation of the two types of receivers—the FD receiver of prior art and the TD receiver of the present invention—unburdened by amplification methods, is shown in FIG. 35. The following definitions are taken from optical physics (cf. Born and Wolf, 1970; Dummins and Pike, 1974), not from radar engineering. Essentially, the heterodyne method requires a local oscillator to be mixed with the scattered radiation; and the homodyne method is a "self-beat" or autocorrelation method. The homodyne method is inherently a coherent method (cf. Born and Wolf, 1970, page 256). The heterodyne method of prior art can use autocorrelation—after the mixing operation—but the signal acquisition and information loss has already occured. The heterodyne method can even use a "coherent" local oscillator, but only with a priori information and expectancies concerning target scattering. The distinguishing feature between the two methods is that the homodyne method of the present invention is a coherent (correlative) signal acquisition method with no knowledge of the target (no a priori information) and the heterodyne method of prior art is not.

[The various definitions of the heterodyne and homodyne methods are not consistent. For example, the *IEEE Standard Dictionary of Electronic Terms* (Jay, 1988) defines "homodyne reception" as "zero-eat reception or a system of reception by the aid of a locally generated voltage of carrier frequency"; and the *McGraw-Hill Dictionary of Science and Technology* (Parker, 1989) defines "homodyne reception" as "a system of radio reception for suppressed-carrier systems of radio telephony, in which the receiver generates a voltage having the original carrier frequency and combines it with the incoming signal. Also known as zero-beat reception."

Essentially, these definitions refer to the generalized use of homodyning in a receiver with more than one mixing stage. "Synchronous" detection is achieved by a method called "homodyning", which involves mixing with a signal for the same frequency as that being detected either by external or internal (i.e., with a phase loop) methods. Thus, recently the term "homodyne" has come to mean a method for the detection of narrowband signals and for restoring a suppressed carrier signal to a modulated signal.

Clearly the waters have been muddied concerning the definitions of the heterodyne and homodyne methods. However, the original optical physics definitions are specific in equating heterodyning as a method of signal acquisition using a local oscillator, and homodyning as a method of signal acquisition using a coherent method such as autocorrelation. WP/TD signal acquisition requires the homodyne method because it is a coherent method and information preserving. It would not be right to coin new terms, because the present terms live on relatively unambiguously in optical physics from whence they came. Therefore, we shall use the terms in the optical physics sense of those terms, but recognizing the danger of triggering the wrong associations.]

The Target-Receiver "Channel of Information"

If one views the target as a source of information about its characteristics and a ladar/lidarradar/sonar receiver-processor as a receiver of that information, then, in a sense, an informational channel exists between the target and receiver-processor. The concept of an information-preserving transformation is an ergodic transformation. From the point of view of preserving information in this channel, i.e., from an ergodic transformation point of view, it makes a great deal of difference whether a signal is wideband, but of short duration, or wideband, but of long duration. That is, two signals, of identical bandwidth, will convey different information depending on differences in their duration. This difference is due to the diffracting properties of the target being signal duration dependent, as well as signal frequency bandwidth dependent.

Figure 9B:
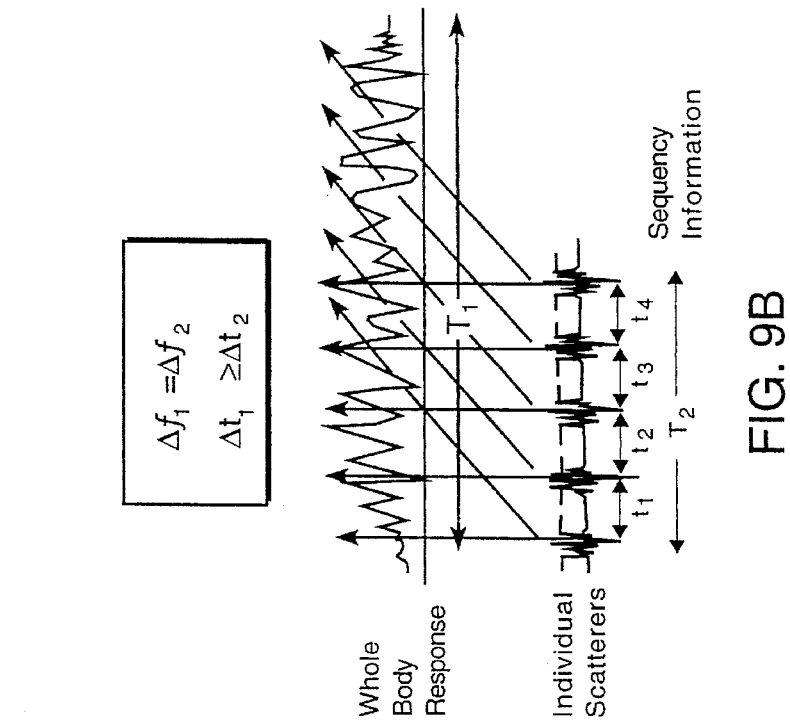
FIG. 9B is a comparison of the return echo signals obtained in the situation described in FIG. 9A. (The information from individual scatterers is projected on the whole body response, but doe to sampling restrictions and lacking the sequency information contained in the interpulse arrivals $t_1, t_2, t_3, t_4, t_5$, its extraction is not possible).
Figure 9A:
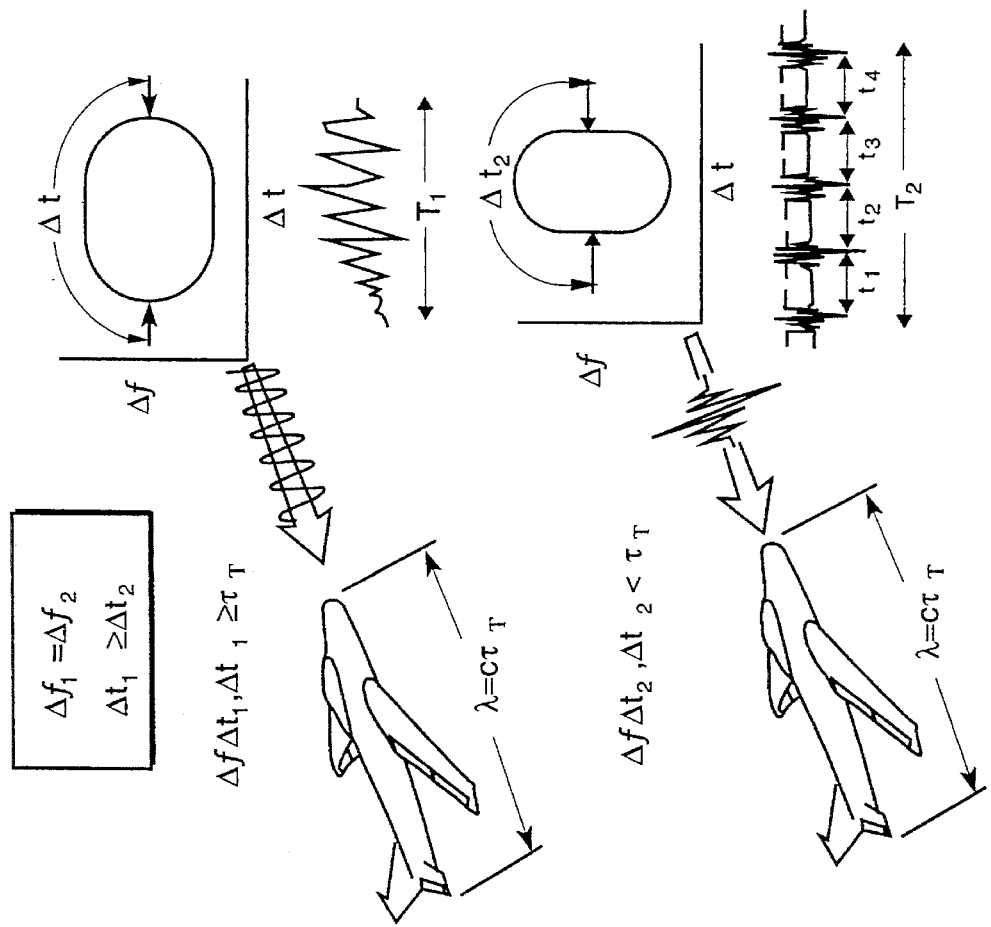
FIG. 9A is a comparison of the return echo signals elicited by two signals of identical bandwidth but different temporal duration. The top shows a signal of duration long with respect to the target; the bottom shows a signal short with respect to the target.

Therefore, the information returned along the target-receiver channel is different in the case of two signals $\Delta f_1 \Delta t_1$ and $\Delta f_2 \Delta t_2$, even if $\Delta f_1 = \Delta f_2$ but $\Delta t_1 \neq \Delta t_2$. There are a number of reasons why use of the signal of shorter duration but equivalent bandwidth should result in more transmitted information. (We are not referring here to the well-known time-bandwidth product relations in conventional radar, but to the physical differences which occur in target diffraction and scattering when pulses short with respect to target dimensions are used.) The most important one is that the use of a short duration signal results in no interference between the resolved target elementary scatterers, as the backscattering from each of the scatters arrives at the receive antenna separated by definite intervals of time, whereas the use of a longer duration signal results in the arrival of the backscattering from all the elementary scatterers but without separation in time (cf. FIGS. 9A & 9B). The use of a longer duration signal thus results in sampling and aliasing problems.

The more information about the target that is transmitted to the receiver, the more signal-to-noise gain— if that information can be accessed and displayed in the power density spectrum. There are two ways of achieving that access, i.e., receiver-processor gain:

(1) Time scale conversion (Papoulis, 1965) is the process in which, by storing samples of correlated signals and uncorrelated noise from repetitive probing of the target, an increase in sampling rate an be achieved by repetitive sampling of the stored returned signal. If $F_S$ and $F_G$ are the repetition frequencies of the signal and gate (sampling) voltage for repetitive and sequential non-real-time multiple sampling of the stored signal then a time scale conversion factor, q, is defined:

$$q = F_G/[F_S - F_G] = F_G/\Delta F \quad (6)$$

Another way of defining $F_S$ and $F_G$ is: if $\Delta t$ is the signal duration and $\Delta t$ is the duration of the sampling window, with repetitive and sequential non-realtime multiple sampling of the stored signal, then $F_S = 1/\Delta t$ and $F_G = 1/\Delta t$.

The minimum value of q, $q_{MIN}$, is:

$$q_{MIN} = f_0(2 + \Delta f \cdot \Delta t)/F_G = 2Q[(2/\Delta f \cdot \Delta t) + 1] \quad (7)$$

where $f_0$ is the signal average frequency; $\Delta f \cdot \Delta t$ is the signal bandwidth-duration product; and $$Q = T_n/\Delta t \quad (8)$$

where $T_n$ is the interpulse interval in a repetitive train.

Reduction of the $[F_S - F_G]$ difference and multiple sampling achieves an equivalent reduction in the sampling interval, $\Delta t_c$. That is, by sampling over $\epsilon T_S$ intervals, where $T_S = 1/F_S$ and $\xi T_S = (\Delta t_c/\Delta t)T_S$, the receiver gain is then:

$$\xi = q/q_{MIN} = \Delta t_c/\Delta t = (S_o/N_o)_{OUT}/(S_o/N_o)_{IN} \quad (9)$$

Figure 19:
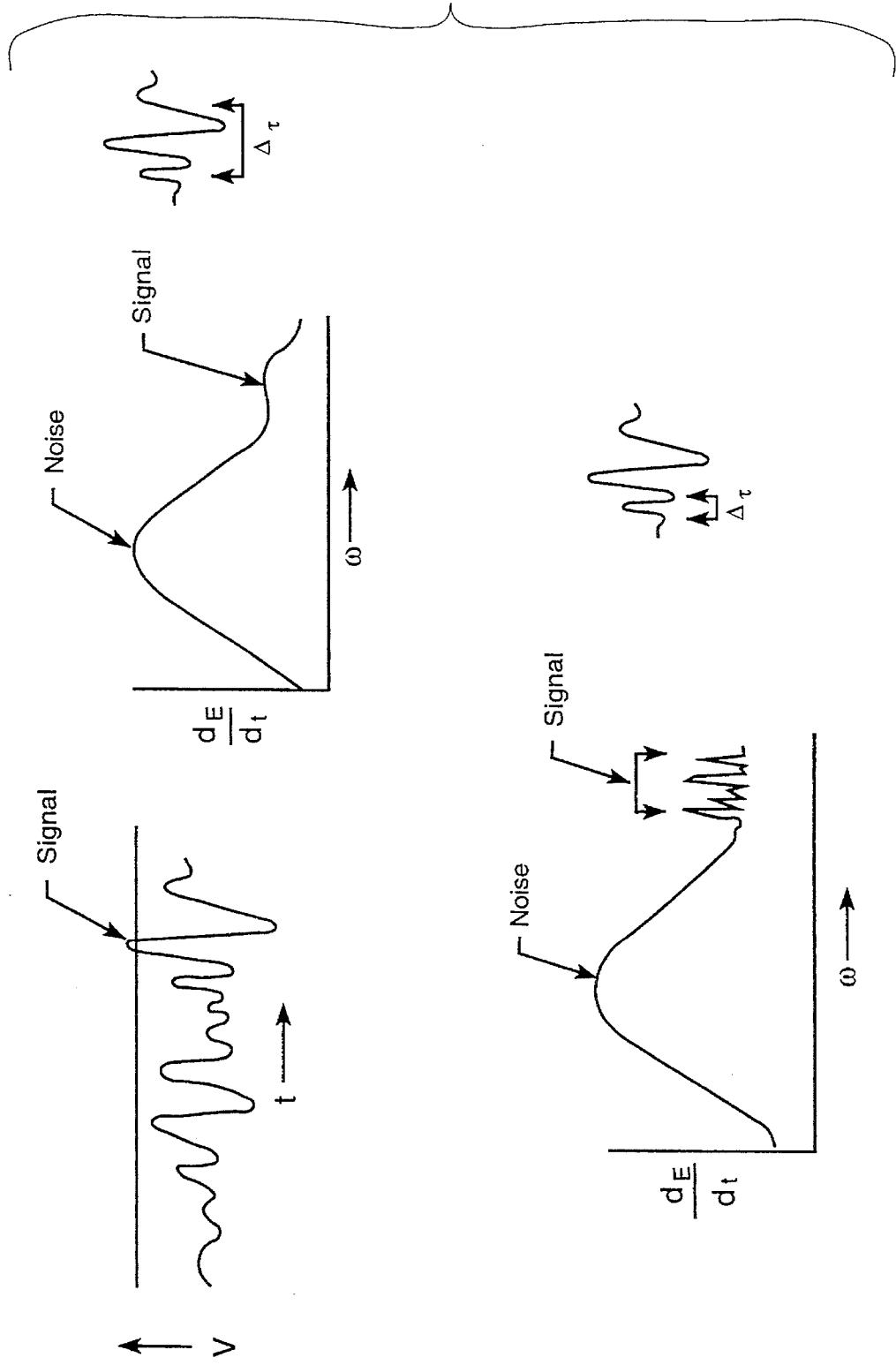
FIG. 19 is a schematic representing in (1) the prior art of video signal detection used in frequency domain processing using level-detection to resole signal; in (2) time domain processing after autocorrelation and Fourier transformation to power density spectral representation providing analysis characterizing signal; in (3) with increase in sampling speed over that in (2) (providing receiver gain), signal further resolution. An increase in signal resolution or signal-to-noise characterization increases "detection" (characterization) range. This form of receiver gain (increase in signal-to-noise by faster sampling) shown in (2) and (3) is not available to the prior art frequency domain threshold detection method (1).

(2) Increase receiver-processor initial sampling rate, $\Delta t_C$, so that q is initially large. This solution directly looks for increases in receiver-processor real-time sampling speed without (non-real-time) time scale conversion. FIG. 19 compares FD and TD signal processing concepts of prior art and of the present invention.

Both methods (1) and (2) provide increased receiver-processor gain, $\xi$, which accesses more information in a power density spectral representation. Furthermore, the more detailed that representation, the greater the signal-to-noise ratio, and the greater range to a maximum.

Ergodicity.

The word "ergodicity" is derived from the Greek words for "work" and "path". The original ergodic hypothesis concerning the sampling of a many phased system, was stated by J. C. Maxwell as ". . . the system, if left to itself in its actual state of motion, will sooner or later, pass through every phase which is consistent with the equation of energy."

It turned out, however, that a system cannot pass through every point of space—therefore the quasi-ergodic hypothesis was adopted. This version states that in a stationary ensemble of random functions produced by sources of identical nature, and having a continuous range of values, the amplitudes of the aggregate of elements of an ensemble member come infinitely close to every point of the continuous range of possible values sooner or later, if the ensemble member is allowed to take its natural course of fluctuation.

The ergodic hypothesis is relevant to characterizing the present invention in two regards. Firstly, the quasi-ergodic hypothesis is sufficient justification for the equivalence of time and ensemble averages. The autocorrelation function for a time-domain, energy-differentiating receiver-processor is an ensemble and time average of time domain events. The autocorrelation function for a frequency domain, energy integrating receiver-processor is an ensemble and time average of frequency domain events. A joint time-frequency autocorrelation would be an ensemble and time average for both time and frequency events.

Secondly, a frequency domain surveillance surveillance system of prior art detects but does not characterize the target. If the target is considered n informational source (of its target characteristics) then a channel exists between that source and the receiver. In the case of ideal frequency domain surveillance, there is no rate of informational flow along that channel, because the frequency domain approach is designed predominantly for detection and ranging, but not characterization. If an ergodic transformation is an information-preserving transformation, then the transformation from target to receiver effected by an ideal frequency domain system is nonergodic. On the other hand, i the case of time domain surveillance, the detailed characterization of the target by mean of the information-rich time domain signal echo, indicates that the transformation from target to receiver effected by an ideal time domain system is information-preserving, and therefore is an ergodic transformation.

That is not to say that using multiple frequency FD signals of prior art provides some target information. Rather, it is to say that the signals of the present invention provide more information and that information is more readily accessible (i.e., there is a difference in degree and accessibility).

Antennas

The pulse response of a linear aperture or antenna is angle of incidence dependent When the pulse is of short enough duration, i.e., less than the "fill-time" of the antenna, the response consists of two delta functions of opposite signal. The delta function responses are due to two local centers at the end of the antenna. When such centers are isolated on an antenna due to the shortness of the pulse duration, the familiar FD lobe pattern of the angular dependence of the radiated field no longer exists.

The dependence on angle of incidence produces difficulty in matching emit and receive antennas. The pulsed antenna must also possess a well-defined phase center if dispersion is not to occur. If the antenna differentiates on transmit and receive, the baseband signal will undergo two differentiations on the round trip from transmitting systems to target and back. Using sinusoidal signals the double differentiation will only show as a phase shift, but using pulse signals, the envelope will be severely distorted. When using pulse signals, the response of radiators in the radiating and receiving modes are not identical as they are assumed to be when using FD signals of prior art. Due to the difference in coupling: conductor to field for a transmit antenna, field-at-an-angle-of-incidence to conductor for a receive antenna, the transmit and receive antennas only obey the reciprocity principle when phased matched. The transmit antenna performs the negative of a Hilbert transform on the input baseband signal, and the receive antenna performs a positive Hilbert transform, i.e., under both operations the signs of the signal is reversed. This amounts to the antenna acting as a quadrature filter for which the only realistic, or causal, signals are analytic signals (FIG. 36).

Another way to look at this is to consider the phase center of the antenna to locate an imaginary time, $t=0$. Thus the analytic signal amounts to a transmittance with positive, but no negative, phase lag. Then if the antennas are not "matched", an antenna that does not distort when radiating, will integrate when receiving. Conversely, an antenna that does not distort when receiving, will differentiate when radiating.

Preferred embodiments of the present invention include the use of nondispersive TEM horn antennas or nonresonant antennas (Tseng and Cheng, 1964).

Target Reflecting Characteristics: Primary, Secondary and Tertiary Diffraction

In conventional FD radar of prior art, a target is considered to be a point scatterer. That is, the target as a scattering object is viewed as if satisfying boundary conditions simultaneously and globally. This treatment contrasts with that offered by WP radar of the present invention, for which the target can be viewed as a collection of local elementary scatterers. The WP scattered field at an arbitrary point depends on the pulse excitation only within a space-time volume called a light cone. Thus the characteristics of targets are decomposed into local elementary scattering responses which can be described by superposing components of Green's functions that correspond to the local scattering centers on those targets.

Three distinct components can be discerned in the frequency response of targets (FIG. 11): the high frequency or optical component, the resonance component and the Raleigh or low frequency component. The first, the optical component, corresponds to a reflected field; the second and third, correspond to diffraction fields. Whereas the diffraction component penetrates into the shadow region of a target, the optical component does not.

The distinctive behavior of these field components can be studied on a model edge diffracting problem. The situation studied is the diffraction of the incident field on the edge of a conducting screen or wedge viewed as a linear filter formed by the edge of the screen in two-dimensional space (the Sommerfeld problem or the problem of boundary waves in diffraction theory). In the case of a WP signal, i.e., a signal with a fast rise time, there is a dependence of the diffraction component of the scattered field on the time after the leading edge of the diffracted wave passes. This temporal dependence is exhibited for both the light and shadow region of the conducting wedge. In contrast, the temporal dependence is not exhibited by long duration, low frequency FD signals of prior art.

Minimum Received Energy for: Detection; Processing and Target Characteristic Extraction In the case of FD processing of prior art, the detection process is based on the assumption of discontinuities which rigger an intensity threshold. Therefore FD processing is based on the detection of local temporal properties of a function defining the signal echo. In the case of the TD processing of the present invention, on the other hand, the informationally-rich return echo is in the form of an analytic signal, with characteristic envelope, phase and frequency. An analytic function does not possess discontinuities and is therefore not deterministic or causal. Rather than detecting a discontinuity, WP systems register, monitor or model a continuous process. That continuous process is a power density spectrum.

The continuous power density spectrum registers a model of the target up to a maximum set by the sampling speed or receiver gain and limited by the target dimensions. Thus the minimum signal-to-noise ratio for WP systems is set in two, not one, ways: pulse energy and receiver gain.

In order to extract target characteristic information, the pulse duration is of consequence. Therefore the energy required for setting the signal-to-noise ratio must be delivered within a set time, i.e., high average power is required. However, the statement that high pulse average power is required is ambiguous, because high power can be obtained either by increasing energy (J) at constant pulse duration, or by decreasing the pulse duration with energy held constant. The pulse duration will be determined by the dimensions of the target whose characteristics are to be probed. Therefore due to the ambiguity in power units (J/s) aforementioned, the goal is to obtain sounding pulses of maximum energy and duration commensurate with target dimensions.

The processing of data from a spectral representation of the target for recognition purposes is bounded by the following considerations. Firstly, the transformation of such data is an ill-posed problem (Tikhonov and Goncharsky, 1987). An ill-posed problem is one in which the solution is unstable with respect to small changes in initial conditions, or a unique solution to the problem does not exist, or no solution to the problem exists. Such problems are handled computationally by associative processors, e.g., neural nets.

Secondly, whereas processing of the early time or optical response must account for its target aspect-dependence, processing of the late time response must account for its aspect-independence with respect to form. Singularity expansion methods for processing the input into pole-sink complex resonance form are of assistance with the latter. Both response components require highly parallel processing architectures to handle the processing rate required.

Thirdly, inverse scattering transformations are involved with the processing for target imaging and these methods will require highly parallel processing architectures.

Comparison of frequency domain signals of prior art and wave packet signals of the present invention There are major conceptual differences between the treatment of FD and WP signals. In the case of FD signals of prior art, local time methods relate the signal envelope to its spectrum. In the case of WP signals of the present, global or real time methods relate the signal's fine structure to its spectrum. The concept of noise is also interpreted differently. If a decreasing sampling temporal window causes a large noise bandwidth in the frequency domain, that increase in noise in the frequency domain is of no consequence if the receiver processing is conducted in the time domain.

In the case of FD narrow band sinusoidal signals of long duration, $\Delta t$, any point of discontinuity, $\delta t$, e.g., at the beginning and end of the signal, is small compared with the duration $\Delta t$. For such signals, local time methods, relate the global nature of the signal, i.e., its envelope, to its spectrum. This procedure is followed in Fourier analysis, as well as in Taylor series and other expansions.

In contrast, in the case of WP pulse signals, any point of discontinuity, dt, is large or of the same order compared with the signal duration $\Delta t$. Therefore WP signals must be treated differently using real time methods to preserve the local nature, or fine structure, of the signal. Periodic, or aperiodic (transient), i.e., FD approaches to WP signal processing, cannot be used due to the fact that for SP signals: $\delta t \approx \Delta t$. The implication of this is that WP signals and their derivatives do not possess discontinuities, indicating their analytical signal properties. Analytic signals are not deterministic or causal but are continuous and require local, or real time methods for characterization. Whereas the FD signal is characterized by its harmonic frequency, the WP signal is characterized by its instantaneous frequency.

The required signal referent for a WP/TD receiver is not the frequency (phasor) referent of FD receivers of prior art. With w as the radian frequency of a wave and s the phasor, or neper, frequency defining the envelope shape, a complex signal is:

$$s_0 = \sigma The\ 0 + i\omega_0 \qquad (10)$$

and an analytic signal (also known as the preenvelope function) is (Papoulis, 1965):

$$\mathcal{S}(t) = S(t) + i\hat{S}(t) = \exp[s_0 = A(t)\exp[i\omega_0 t + \phi t] = \exp[i\omega_0]\exp[\sigma_0] \qquad (11)$$

with real part $$S(t) = \exp[\sigma_0]\cos\omega_0 t \qquad (12)$$

and imaginary part:

$$\hat{S}(t) = \exp[\sigma_0]\sin\omega_0 t \qquad (13)$$

$\hat{S}(t)$ is the Hilbert transform of $S(t)$:

$$\hat{S}(t) = (1/\pi) \int_{-\infty}^{\infty} S(\tau)/(t-\tau)d\tau.$$

$$S(t) = -(1/\pi) \int_{-\infty}^{\infty} \hat{S}(t)(t-\tau)d\tau.$$

Therefore, $\hat{S}(t)$ can be considered the output of a quadrature filter with input $S(t)$. The quadrature filter has an impulse response:

$$h(t) = 1/(\pi t)$$

and system function:

$$H(i\omega) = -i,\ \omega > 0;\ i,\ \omega < 0$$

The envelope of a wave packet (also known as the absolute-value of the preenvelope) is defined as:

$$\text{env}S(t) = \exp[\sigma_n] = \sqrt{[S(t)^2 + \hat{S}(t)^2]} \qquad (14)$$

and the carrier, average or midfrequency is defined as:

$$\exp[i\omega_n] = [S(t) + i\hat{S}(t)]/[\sqrt{[S(t)^2 + \hat{S}(t)^2]}] \qquad (15)$$

For example, suppose $$S(t) = A(t)\cos\omega_0 t,$$

then using the Hilbert transform the analytic signal is:

$$\mathcal{S}(t) = A(t)\cos\omega_0 t + iA(t)\sin\omega_0 t \qquad (16)$$

and the envelope of $S(t)$ is:

$$\text{env}S(t) = \exp[\sigma_n] = \sqrt{[(A(t)\cos\omega_0 t)^2 + (A(t)\sin\omega_0 t)^2]} = A(t) \qquad (17)$$

Now the power spectra are defined:

$$\Phi_{SS\wedge}(\omega) = \Phi_{SS}(\omega)H(i\omega) = -i\Phi_{SS}(\omega),\ \omega > 0;\ = i\Phi_{SS}(\omega),\ \omega < 0 \qquad (18)$$

Therefore:

$$\Phi_{\mathcal{SS}}(\omega) = 2[\Phi_{SS}(\omega) + i\Phi_{SS\wedge}(\omega)] = 2\Phi_{SS}(\omega),\ \omega > 0;\ = 0\ \omega < 0 \qquad (19)$$

The relation expressed by Eq. (19) is the ultimate reason for using analytic signals rather than complex signals in the time domain. The issue of causality for random continuous signals dictate that the power density spectrum be zero for negative frequencies. The analytic signals—together with the Hilbert transform—permits this condition to be met. The use of the complex signal (i.e., with real and imaginary part) or prior art does not, and therefore is not suitable for use in the time domain. Causality conditions require that inverse transforms must be zero for negative t and have to be met in order to preserve the information i the signal (cf. Papoulis, 1962, p. 213). If the real and imaginary parts of a Fourier integral of a function $\mathcal{S}(t)$ satisfy the Hilbert transform relations, ther $\mathcal{S}(t)$ is causal.

Figure 20:
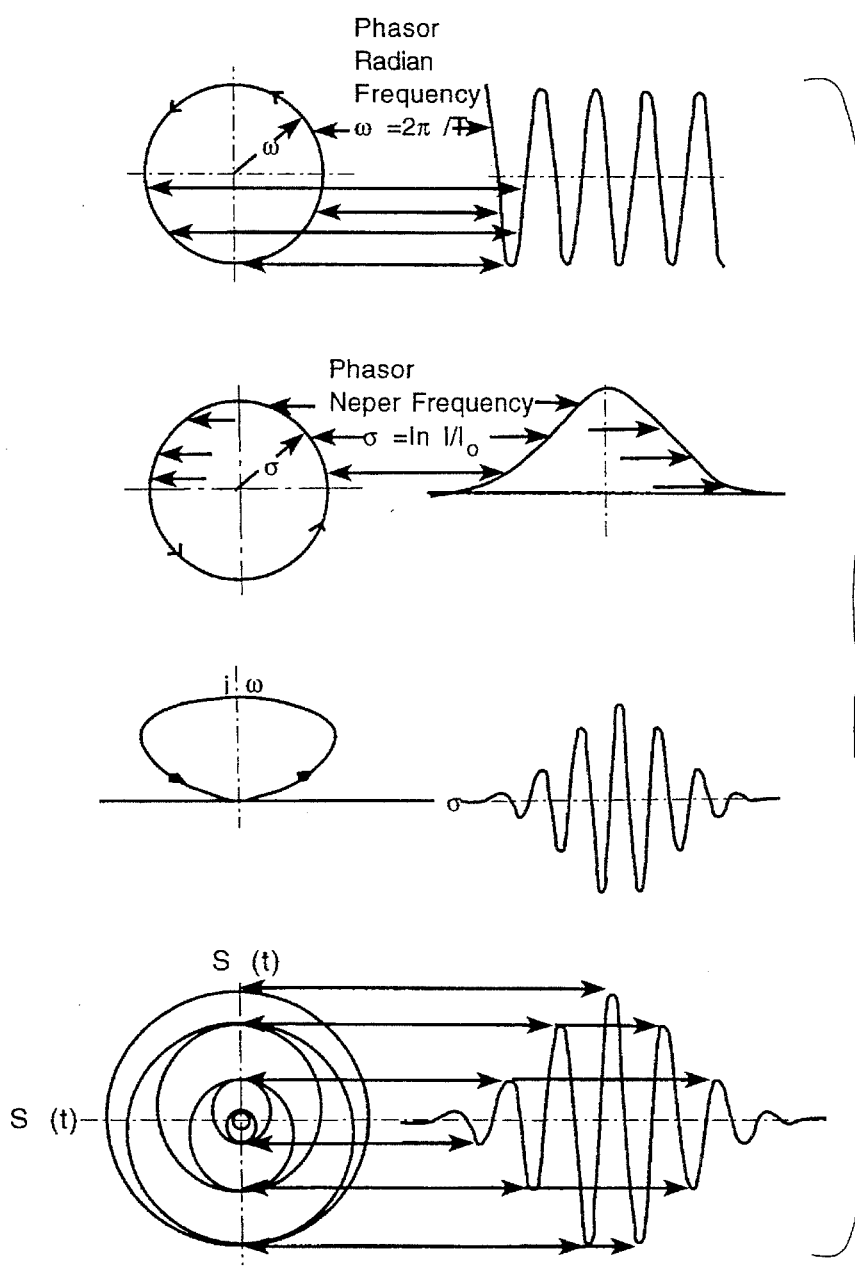
FIG. 20 shows representations of: A. a radial frequency phasor; B. a Neper frequency phasor; C. a complex plane signal representation; and D. an analytic representation of signals. Whereas in the prior art a frequency domain receiver is designed to receive phase-type signals whose signals duration can be undefined, the time domain receiver is designed to receive analytic signals which are causal, i.e., their initial conditions are defined and there is not signal before t=0.

FIG. 20 shows representations of a continuous wave (FIG. 20(A)), a wavepacket envelope function (FIG. 20(B)), and two wave packets (FIG. 20(C) & 20(D)). A radian frequency phasor representation is sufficient to describe a continuous wave (FIG. 20(A)), and a neper frequency phasor is sufficient to describe the envelope of a wave packet (FIG. 20(B)). However, a complex plane representation of the complete wave packet (FIG. 20(C)), and a complex analytic signal representation (FIG. 20(D)), are both nonstationary, whereas the representation would be stationary (pointlike) for a continuous wave.

System Noise

There is a dual relation between noise in the time domain and noise in the frequency domain, when an ideal time domain processor is used. Correct analysis of time domain noise bears on the receiver gain. Considering the conventional FD treatment of noise, the noise figure, $F_n$, is defined:

$$F_n = \frac{\text{noise output of actual receiver}}{\text{noise output of ideal receiver}} \quad (20)$$

where $F_n$ is independent of receiver gain. The only noise in the output of an ideal receiver would be that received from external sources. This is represented by thermal agitation in a resistor and the thermal noise is spread over the the entire frequency spectrum. Therefore the amount of noise appearing in the output of an ideal receiver is proportional to the absolute temperature of the resistor connected across its input terminals times the width of the band of frequencies passed by the receiver—the receiver bandwidth.

The mean noise power of an ideal FD receiver of prior art is:

$$P_{IR} = kT_0 B_R \quad (21)$$

where k is Boltzmann's constant ($1.38 \times 10^{-23}$ Watt-sec/°K.); $T_0$ is °K., usually taken to be 290° K. so $k_{T0}$ becomes $4 \times 10^{-21}$ Watt-sec/°K.; and $B_R$ is the width of the band of frequencies passed by the receiver (Hz).

Thus the noise mean power of a FD receiver of prior art is:

$$P_{AR} = F_n k T_0 B_R \quad (22)$$

This equation includes both an estimate of external noise and internally generated noise. Although internal noise predominates, it can be reduced somewhat by adding a low noise preamplifier ahead of the receiver's mixer stage and using a low noise mixer.

The total system noise is equipment noise+transmission line noise+antenna noise. Combining these, the mean noise power for all sources is:

$$P_{AS} = kT_S B_R \quad (23)$$

where $T_S$ is the equivalent noise temperature.

To distinguish signal from noise one may either express these in terms of energy ratios or power ratios, but if one uses power ratios, then the signal duration must be given. Conventionally, the mean noise energy is given by:

$$E_{AS} = kT_S B_R t_n \quad (24)$$

where $t_n$ is the duration of the period in which a return may be received from any one resolvable increment of range, i.e., it is the temporal sampling bin.

Conventionally, i.e., in the frequency domain, the noise can be reduced by minimizing the receiver bandwidth, $B_R$. The optimum bandwidth is:

$$B_R \approx 1/\Delta t \quad (25)$$

where $\Delta t$ is the pulse width. However, in the case of a time domain receiver of the present invention, Equ. (24) permits another way of reducing the noise: by reducing $t_n$. For noise reduction:

In frequency frequency domain processing of prior art the temporal sampling bin remains constant and the frequency bandwidth is reduced.

In the time domain processing of the present invention, on the other hand, the frequency bandwidth remains constant but the temporal sampling bin is reduced.

Substituting (25) into (24) gives:

$$E_{AS} = kT_S t_n / \Delta t \quad (26)$$

Now B is conventionally defined as: the width of the band of frequencies passed by the receiver. Therefore $B_R$ defines the band of frequencies which are passed or acquired by the receiver. $B_R$ is not the sampling bandwidth, which we shall label $B_S$. From time domain point of view, Equ. (24) can be defined as:

$$E_{AS} = kT_S B_R / B_S \quad (27)$$

Returning to the FD analysis of prior art: the passband of, e.g., a Doppler filter, is approximately equal to $1/t_{int}$, where $t_{int}$ is the integrating time of the radar return, and, or course, the noise. According to the conventional FD analysis, $t_{int}$ can be substituted for $t_n$, and $1/t_{int}$ for $1/\Delta t$. Using these substituents in Eq. (26) and canceling gives:

$$E_{AS} = kT_S, \text{ (Doppler radar)} \quad (28)$$

However, from the WP/TD perspective of the present invention, and with respect to a time domain receiver, these substitutions and Eq. (28) are incorrect. The duration of the pulse is not the duration of the temporal sampling bin. Referring to the FIG. 21, Eq. (28) is valid for the first two cases, but for the third case, which is the genuine time domain case, these substitutions are incorrect.

Signal to Noise Ratios

In the case of frequency domain signalling of prior art and using a frequency domain receiver of prior art, it is well known that narrowing the frequency bandwidth around the signal decreases the noise. Alternatively, increasing the frequency bandwidth increases the noise. However, this rule of thumb cannot be extrapolated to the WP/TD domain. In the case of an ideal time domain receiver, although decreasing the temporal sampling window increases the frequency bandwidth window, noise in the time domain is not increased thereby (on the contrary, it is decreased). Increasing the noise in the frequency domain is immaterial to ideal time domain processing. (The converse observation is: narrowing the bandwidth in the frequency domain, when using a frequency domain receiver, increases noise in the time domain. But this is of no consequence if the processing is carried out in the frequency domain). Thus, in the case of ideal time domain processing, narrowing the temporal sampling window decreases time domain noise.

These observations on the duality of frequency domain and time domain nose are precisely mirrored in the phenomenon of "squeezed states" in optical physics. Precision in the momentum, q, results in imprecision in the position, p, and vice-versa, due to the p.q uncertainty product. Similarly, the signal of conventional radar has gained precision by narrowing $\Delta f$ and by broadening, or placing the noise, in $\Delta t$, due to the $\Delta f.\Delta t$ uncertainty product. The signal of time domain radar, on the other hand, gains precision by narrowing $\Delta t$, and by broadening, or placing the noise, in $\Delta f$, again, due to the $\Delta f.\Delta t$ uncertainty product. This analysis applies to both ideal frequency and ideal time domain receivers. It would not apply to a hybrid receiver which straddles both frequency and time domains and which would accept noise from both modalities. Such a hybrid receiver would not be optimized in either domain and its functioning level would be determined by tradeoff in performance in those domains.

WP/TD Radar Performance Equation

Assume the transmitter and antenna radiates $P_t$ watts of power and the energy is radiated isotropically (omnidirectionally). This means that the source of transmitter and antenna is a point source. The power density per unit area at a distance R from the target is found by dividing the total power, $P_t$, on the surface of an imaginary sphere, centered at the point source, by the total surface area, $4\pi R^2$.

Therefore, at a range, R, from the target, the power density is:

$$\text{Power density} = P_t/4\pi R^2 \text{ W/m}^2 \quad (29)$$

With replacement of the omnidirectional antenna with a directional antenna with a power gain, $G_t$, a directional beam of energy is produced. The power density within the beam at range R is then:

$$\text{Power density with antenna gain} = P_t G_t/4\pi R^2 \text{ W/m}^2 \quad (30)$$

Now, if a target is located within the directed beam at a range R from the source, some of the energy will be reflected (backscattered) in the direction of the source. The amount of energy reflected back is determined by both the power density at the target and the target's backscatter radar cross section, s, defined as $4\pi$ times the ratio of the power per unit solid angle reflected by the target in the direction of the source to the power per unit area of the incident wave at the target, or:

$$\sigma = 4\pi[\{P_b/4\pi\}/\{P_t/4\pi R^2\}] = 4\pi R^2[P_b/P_t] \text{ m}^2 \quad (31)$$

where $[1/4\pi]P_b$ is the power per unit solid angle reflected in the direction of the illuminating source. Therefore, the power per unit solid angle reradiated in the direction of the source is:

$$\text{Power reradiated toward source} \times P_t G_t \sigma/[4']^2 R^2 \text{ W/steradian} \quad (32)$$

The power density of the backscattered wave arriving back at the source will then be:

$$\text{Power density of reflected wave arriving before source} = P_t G_t \sigma/[4\pi]^2 R^4 \text{ W/m}^2$$

The effective capture area and gain of a receiving antenna is:

$$G_r = \pi A_e/\lambda^2 \quad (34)$$

Therefore the power received back at the source for processing, $P_r$, is:

$$\text{Power received: } P_r = P_t G_t G_r \lambda^2 \sigma/[4\pi]^3 R^4 \text{ W} \quad (35)$$

The system loss factor at 290° K. is:

$$F_n = N_o/N_i]/[S_o/S_i] = (SNR)_i/(SNR)_o \quad (36)$$

where SNR is signal-to-noise ratio.

The thermal noise at the receiver is:

$$N_i = kTB \quad (37)$$

where B is the receiver bandwidth. If L represents all signal losses, both external and internal to the radar, and if A represents the receiver signal power gain, then:

$$S_o = AP_r/L; \; N_o = AF_n kTB; \; (S_o/N_o) = P_r/LF_n kTB \quad (38)$$

Expanding the last expression, we obtain:

$$(S_o/N_o) = P_t G_t G_r \lambda^2 \sigma/[4\pi]^3 R^4 LF_n kTB \text{ W/W} \quad (39)$$

The maximum detection range is then:

$$R_{max} = [P_t G_t G_r \lambda^2 \sigma/[4\pi]^3 LF_n kTB(S_o/N_o)_{min}]^{1/4} \text{ m} \quad (40)$$

Substituting for the receive aperture gain, gives:

$$R_{mawx} = [P_t G_t A_e \sigma/[4\pi]^2 LF_n kTB(S_o/N_o)_{min}]^{1/4} \text{ m} \quad (41)$$

Defining this maximum range in terms of energy-on-target requires insertion of the signal duration, $\tau$, explicitly in the numerator (to give $P_t\tau$ (W×time=E)), and implicitly in the $S_o/N_o$ term of the denominator (to give {W×time}/{W×time} or dimensionless number):

$$R_{max} = [P_t G_t A_e \sigma\tau/[4\pi]^2 FL_n kTB(S_o/N_o)_{min}]^{1/4} \text{ m} \quad (42)$$

If coherent integration occurs over time, $t_0$, the total transmitted energy, $P_t t_0$, replaces $P_t t$ in the above expression.

In the case of WP/TD systems this equation is modified to account for the receiver gain possible with higher sampling speeds. In FD analysis, the important parameters affecting range are the total transmitted energy, the transmitter gain, the effective receiving aperture and the receiver noise figure, but not receiver gain. If q is the signal-to-noise ratio of the summed signal (and the signal is coherently summed and the noise incoherently):

$$q = P_{SIGNAL}/P_{NOISE} \quad (43)$$

then $q_{MIN}$ is the signal-to-noise ratio of the sampling window:

$$q_{MIN} = (P_{SIGNAL}/P_{NOISE})_{MIN} \quad (44)$$

The ratio (Eq. 32, above):

$$\xi = q/q_{MIN} \quad (45)$$

gives a receiver gain (at set wave packet duration) due to an increase in power spectral density characterization of the target. With total transmitted energy, $E_t = P_t t$, the radar equation for WP/TD systems is then:

$$R_{max} = [E_t G_{t\sigma} A_e \xi/[4\pi]^2 (S_o/N_o)_{min} F_n LkTB]^{1/4} \text{ m} \quad (46)$$

and this equation is identical to the radar range equation for FD systems when the ratio $\xi = 1$. However, despite this formal similarity, the interpretations of the WP/TD and FD equations are quite different.

For example, there is a reciprocal relation between pulse duration and processing speed, given the characteristic geometric dimensions of the target, a, addressed. For example, a ratio, K:

$$K = a_{MAX}/a_{MIN} \quad (47)$$

where $a_{MAX}$ is target maximum length and $a_{MIN}$ is target minimum length, defines the target fine structure. Suppose the spatial extent of the TD wave packet addressing the target is the length of the target. If K=1, then no increase in $\xi$ (the receiver gain commensurate with K) will achieve greater resolution because the target cannot be resolved into elementary scattering components. If K=2, however, then greater target resolution and greater range can be achieved either by a decrease in the sampling by a half or by decreasing the duration of the signal by a half. Thus for maximum target characterization and maximum range:

$$K/\xi = 1 \quad (48)$$

must be achieved, and, as stated, this can be accomplished in two ways: either by decreasing the duration of the signal, or by a decrease in the duration of the sampling window.

In the range plots, below, processing gain is assumed possible, i.e., K>1, and this optimum condition is assumed achieved. It should also be noted that the pulse duration (t) does not appear in the WP/TD range equation above. This is due to the target-sampling speed information rate reciprocity relation aforementioned. As stated, for a set K>1, greater range can be obtained at set energy either by decreasing the packet duration or by deceasing the sampling window (increasing sample speed). Thus the variable ξ is a function of both:

$$\xi = \tau/\tau_s, \tau_s \leq \tau \quad (49)$$

where t is the pulse duration and $t_s$ is the sampling window duration. Combining the above equations, maximum processing gain can be obtained to a maximum given by:

$$K/\xi = [a_{MAX}/a_{MIN}] \cdot [\tau_s/\tau] = 1, \tau_s \leq \tau \quad (50)$$

In terms of ranging and detection, this definition of ξ is satisfactory. In terms of target characterization and imaging, however, this definition does not do justice to the two situations of (for K>1): (1) decreasing the pulse duration at set sampling window duration, and (2) decreasing the sampling window at set pulse duration. In the case (1), the higher order diffraction components of the target will be separated in the reflected signals from the target, but the receiver will not be able to distinguish between them. In the case of (2), the receiver can distinguish signals of the temporal order of the higher order diffraction components, but those components will not exist in the single signal reflected from the target due to the signal-target size ratio.

Figure 30A:
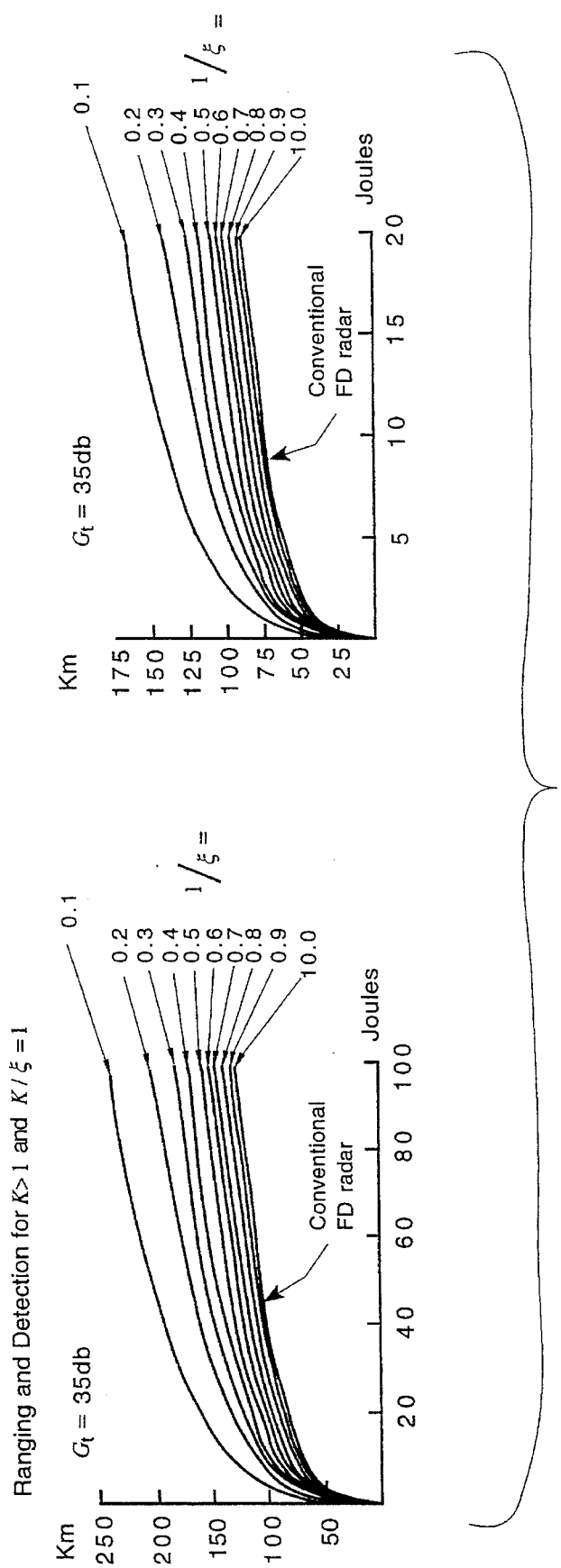
FIG. 30A and B are representations of range for K>1, $G_f=35$ db and $K/\xi=1$. A. Range versus Source Energy—100 J maximum; B. 20 J. maximum; and C. 2 J maximum.

The maximum ranges obtained at increasing packet energy at various values of ξ, are shown in FIG. 30A. The following representative values were used: $G_t=47$ db; $A_e=1$ m²; σ=0.1 m²; kT=4× $10^{-21}$; $F_n=3$ db; L=4 db; $(S_o/N_o)_{min}=$ 13 db. The effective aperture, $A_e$, used here does not behave in a manner similar to that of an aperture for frequency domain signals.

The conventional FD radar performance baseline is shown as ξ=1. Thus the only difference between FD and TD systems is in the value of ξ, which is set to unity for an ideal FD system. Given any amount of receiver gain (ξ>1), a WP/TD system will perform better than an FD system for equivalent transmitted pulse energy. Given no amount of receiver gain (ξ=1), a WP/TD system will do as well as an FD system in terms of ranging for equivalent transmitted pulse energy.

If the transmitted pulse is limited in total average energy to 2 H (over the pulse duration Δt) and return signal averaging and a timed array are not used, then a receiver gain of ξ=10, still results in almost a doubling of the range (FIG. 30B).

Detection and imaging in signalling systems of the present invention

Signalling systems of the present invention encompass two modes of functioning: the detection (D) mode or (emission and reception) matched filter mode and the imaging (I) mode. The D mode is equivalent to the a priori procedure previously described and the I mode is equivalent to the a posteriori procedure. The D and I labels accent the two functions offered signalling systems of the present invention, rather than the procedures.

Figure 26:
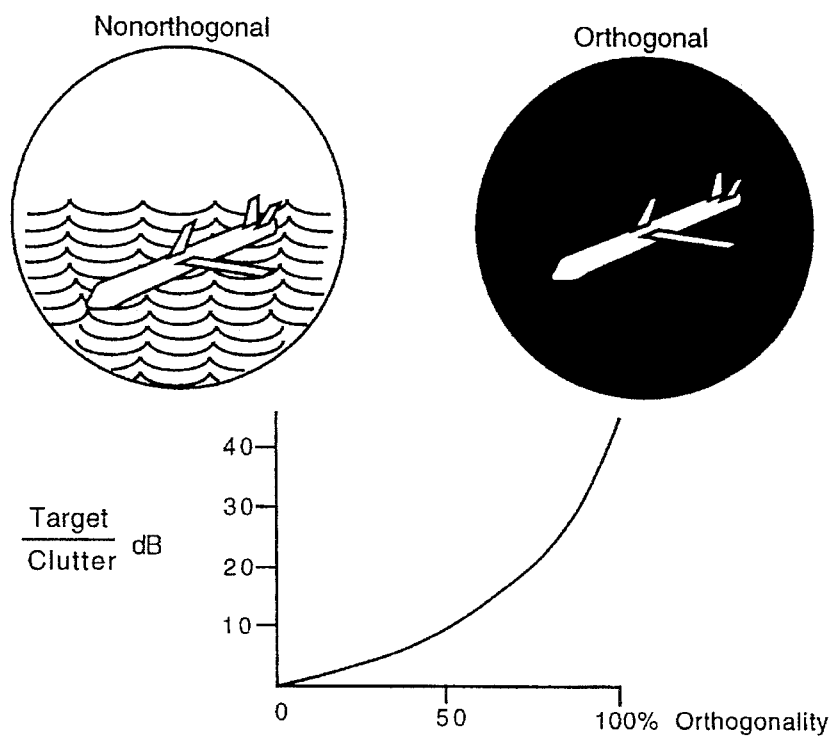
FIG. 26 is a representation of signal-to-noise gain expected when matched signals are used and the orthogonal function expansion of the transfer function description of the target is orthonal to the clutter.

In the case of the D mode, the WP pulse emitted is matched to the target. If the target's transfer function is ideally orthogonal, or, more generally, relatively orthogonal to the transfer function of the designated non-target, i.e., clutter, then the signal returning from the target, or echo, contains more target components than clutter, or noise, components. Therefore the signal-to-clutter or signal-to-noise increases by using the D mode (FIG. 26).

The amount of signal-to-noise increase will depend on the relative orthogonality of target and clutter. The example of FIG. 26 exhibits a "man-made" object as target and natural objects as clutter. The signal-to-noise enhancement by systems of the present invention is expected to be high. In other situations, e.g., between different man-made objects, the signal-to-nose enhancement is expected to be less.

The polarization properties (characterized by the phase, φ, of the radiation), and the polarization property changes over time, dφ/dt, of the target versus clutter are also an important distinguishing feature which is addressed in the D mode of functioning.

Figure 10:
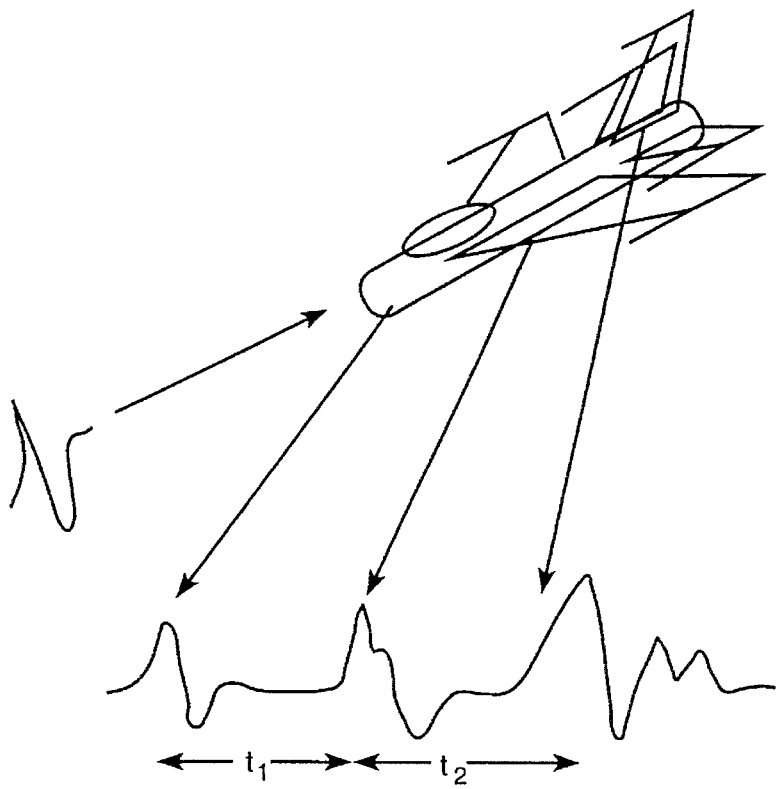
FIG. 10 is a graphical representation of a short pulse (impulse) signal interacting with a target, providing multiple reflections from parts of the target separated by absolute time differences, as opposed to modulo time differences (phase).

In the I mode of functioning, the signal echo return is not a unity (moncycle) or near unity response, but rather contains the complete response of both target and clutter to an interrogating WP pulse which is broadly defined in both time and frequency domains. The primary, secondary and tertiary diffraction components of the target are not simultaneously received, but are received sequentially in time (FIG. 10). Therefore in the I mode of functioning there is a departure from Kirchhoff's diffraction law as normally conceived.

If the returning echos from the target are received by a collection of antennas which preserve the spatial as well as the timing separation of those echoes, it is possible to form an image of the target using only one interrogating WP pulse emission. Prior art systems require more than one emission, i.e., bistatic operation. If a frequency swept signal of prior art is used the duration of that signal is still longer than the target length. Therefore the returning echo is characterized by frequency and phase components. The phase components are modulo measures (modulo 360 degrees), and therefore ambiguous. Whereas frequency sweeping signals of prior art characterize the target in terms of frequency, polarization and the modulo measure: phase, signals of systems of the present invention characterize the target in terms of the absolute timing of the separation of the returns from the target's individual scatterers, as well as instantaneous phase, instantaneous frequency, instantaneous amplitude and instantaneous polarization. Therefore an additional dimension of information: absolute time of return from target individual scattering components is available to systems of the present invention and which is unavailable to systems of prior art. It is critical to the operation of signalling systems of the present invention that the WP pulse length be less than that of the target to be imaged.

Figure 11:
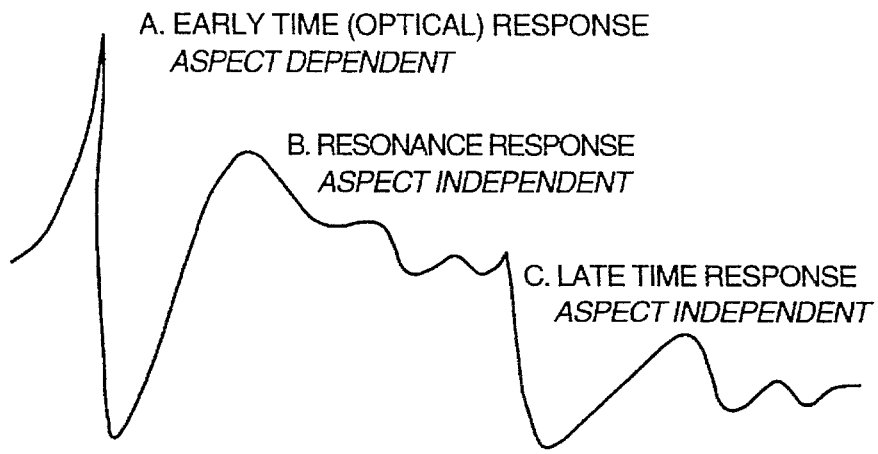
FIG. 11 is a graphical representation of three kinds of target echo responses: (A. the early time or optical response; B. the resonance response; and C. the late time response.)

In the I mode of functioning, the signalling system functions to decompose the target response into individual scattering elements, and there will be the three kinds of target responses shown in FIG. 11 for each individual target scatterers.

Figure 27:
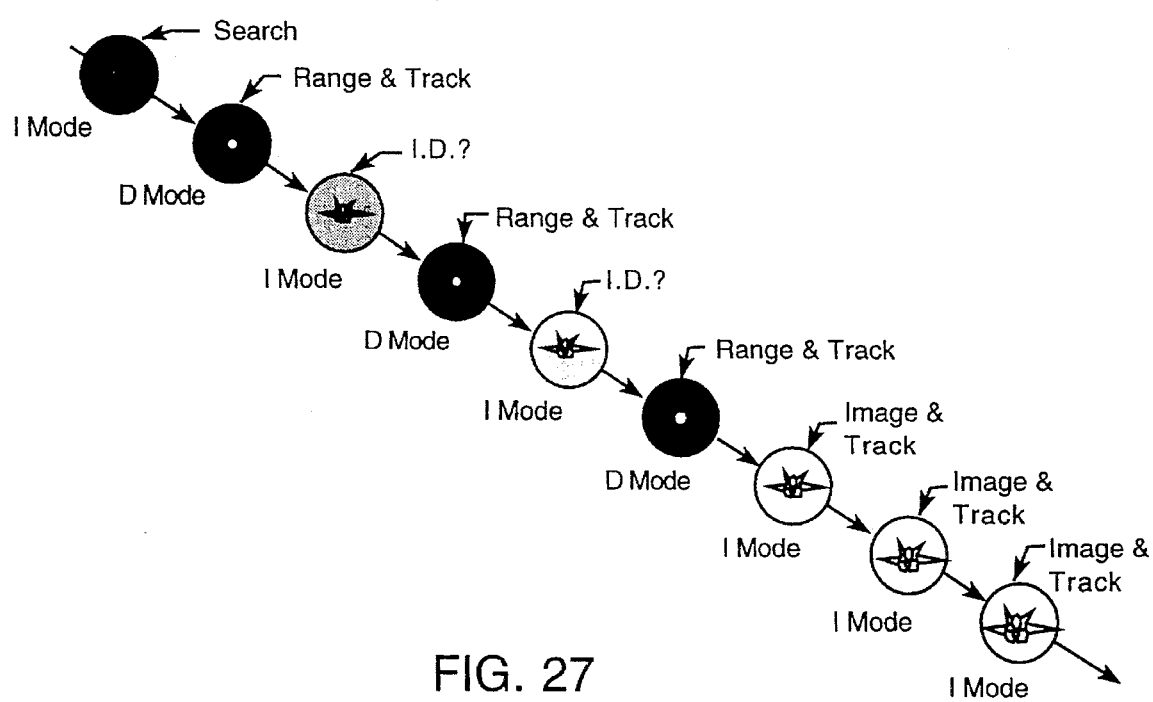
FIG. 27 is a representation of the operation of the present invention using the two modes of functioning. In this representation an aircraft is approaching the surveillance and tracking system.

The D mode provides range and "selective attention" for targets by an increase in signal-to-noise or target-to-clutter. However, the D mode function does not provide target identification, characterization and imaging. Therefore characterization or verification of the target's identity class needs to be performed in any continuous system target identification. In FIG. 27 is shown a representative interaction of a signalling system of the present invention with a target in which the target is approaching the system. Alternative switching between D and I modes provides target identification and characterization, as well as detection and tracking.

In the case of the D mode of functioning, a signalling system of the present invention need not be matched to a single target, but to a class of targets, i.e., a WP is used which addresses the features of a class of targets. In another embodiment of the present invention, a series of WPs can be used which address a series of target classes.

Figure 37A:
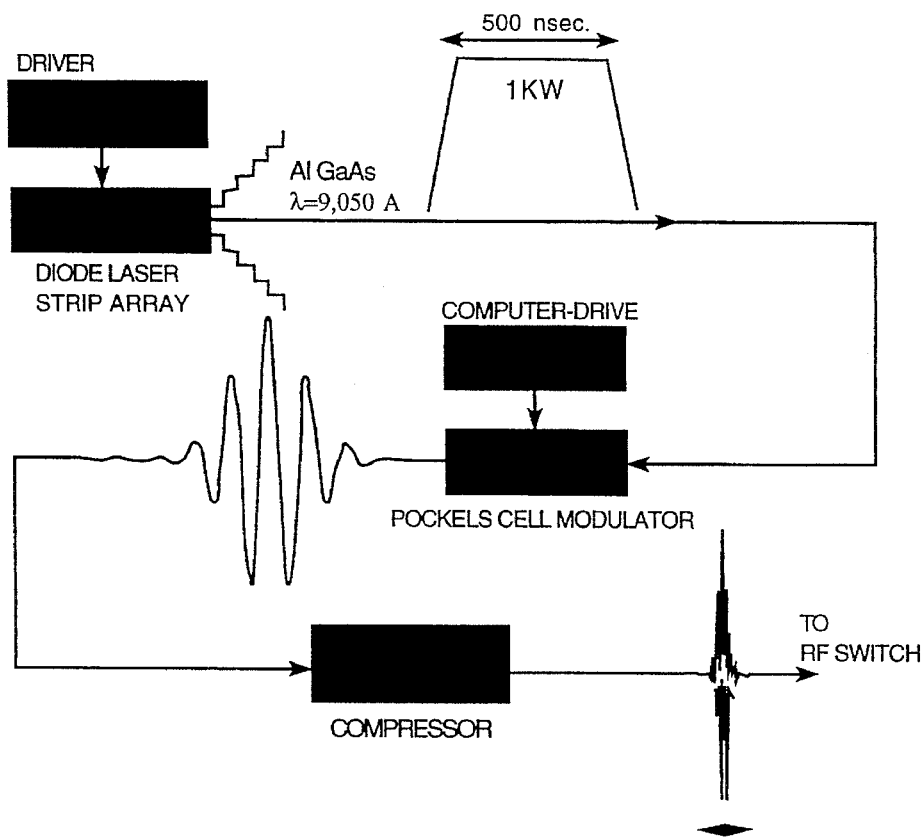
FIG. 37A In this embodiment a diode laser provides a light pulse, the pulse is lengthened and passes through a Pockels cell modulator which can be computer controlled. The modulator conditions the pulse into the desired modulated wave packet form; this wave packet is amplified and then passed through a compresses the optical wave packet to the desired temporal length.

Hardware representation of WP crafting in signalling systems of the present invention at RF In a preferred embodiment at RF, and in the D mode of functioning of signalling systems of the present invention, the WP signal matched-to-target is obtained in the following way. Referring to FIG. 37A, a laser pulse is emitted from, e.g., a diode laser strip array, or from a laser. The light pulse is passed through a Pockel's cell which may be computer controlled to condition or craft the light pulse into WP form and matched-to-target in fine structure, but not in duration. The WP, which has the required fine structure, is then passed through a compressor, e.g., a grid formation, an optical fiber, which compresses the optical pulse to the desired temporal length (e.g., picoseconds in length and above). This optical WP is then handed-off (FIG. 37B) to a light-activated switch (Loubriel and Zutavern, 1992).

Figure 37B:
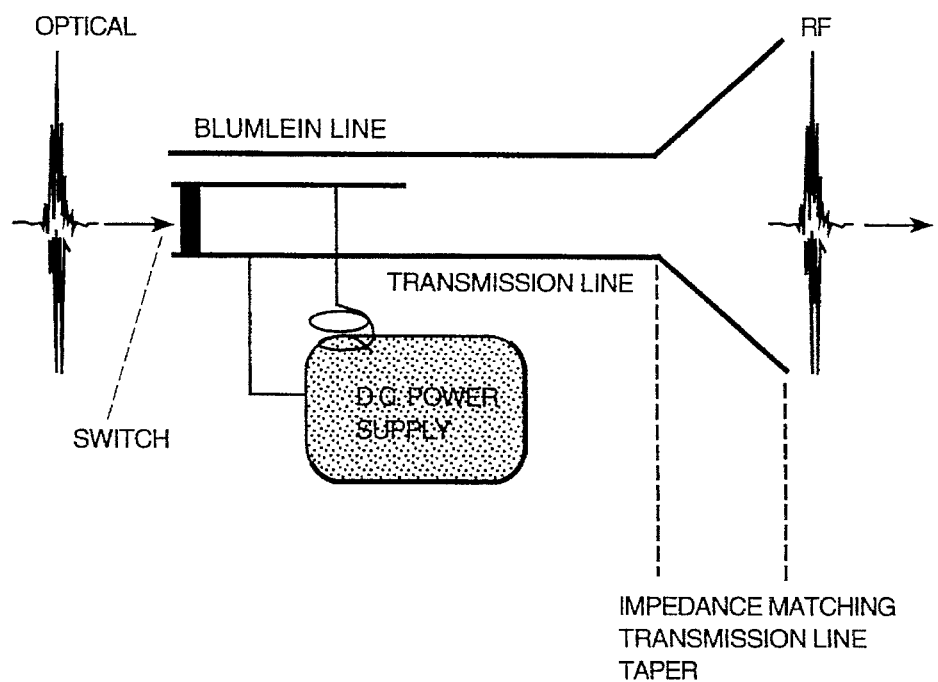
FIG. 37B The optical wave packet is then handed-off to a linear light-activated RF switch and RF wave packet is generated with the desired time and frequency characteristics which is then launched from an antenna.

In one embodiment of the present invention, the optical WP, which is matched-to-target in terms of fine structure and temporal length but for RF wavelengths, is then passed to a linear light-activated-switch which serves as a trigger to an RF launch system. One embodiment of such a system is shown in FIG. 37B. The linear switch, composed, e.g., of oxygen-treated silicon, diamond or any other semiconductor material, has a high quantum efficiency and a recombination time such that the RF WP output from the device follows faithfully the fine structure and duration of the WP triggering signal. Therefore the RF WP pulse will possess the fine structure and temporal duration of the triggering optical WP pulse.

Figure 15:
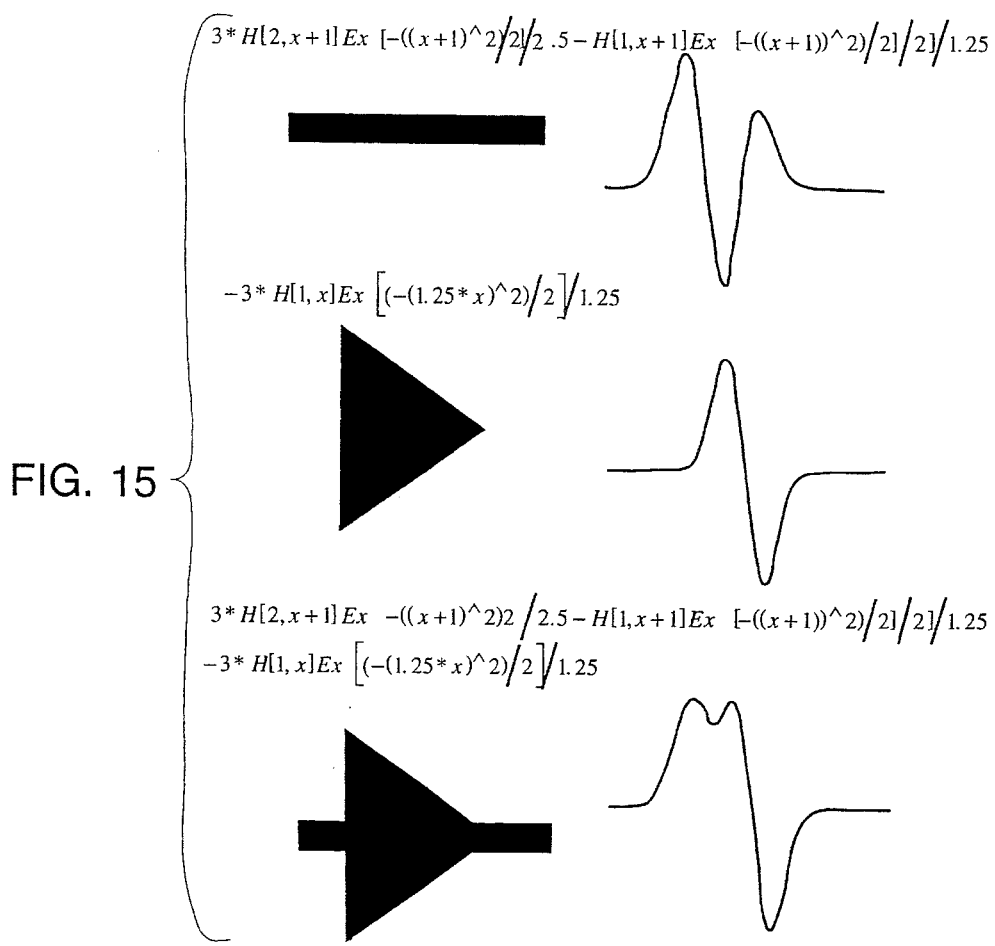
FIG. 15 is a schematic description of a representative fuselage shape (upper), a representative wing shape (middle) and a representative aircraft shape with wings and fuselage (lower in terms of a Weber-Hermite function expansion.

This suggested embodiment of the present invention is different from methods for obtaining signal crafting of prior art. One method of prior art is called frozen Hertzian wave (FHWG) generation (Cronson, 1975; Proud and Norman, 1978; Mathur, et al, 1982; Chang et al, 1984), which is an attempt to craft the fine structure of a pulse but in the RF, rather than in the optical with hand-off to RF following. The FHWG is dependent on the simultaneous triggering of multiple switches all of which avalanche switch and without optical trigger following. A representative description in Weber-Hermite form of the fine structure required to match a target is exhibited in FIG. 15.

Other methods of crafting WPs matched-to-target which would express the methods of the present invention are: arrays of emitters individually addressed; modulation programmed free-electron laser wigglers/undulators; and controlled and modulated spark-gap RF generators. The same principles of the present invention apply whether the signalling system is an RF/lidar/ladar of a sonar sensor.

Wavelets and coding in signalling systems of the present invention

The WP signals of the present invention are defined in time-frequency space. Due to this time-frequency representation and their affine properties, the WPs of the present invention are also wavelets. The WP signals of the present invention also provide the capability of sampling the target at a heirarchy of levels (FIG. 14), e.g., for levels n=0, 1, 2, 3, . . . These WP signals are also physical solutions to a wave equation describing energy propagation in a medium or media.

Figure 12A:
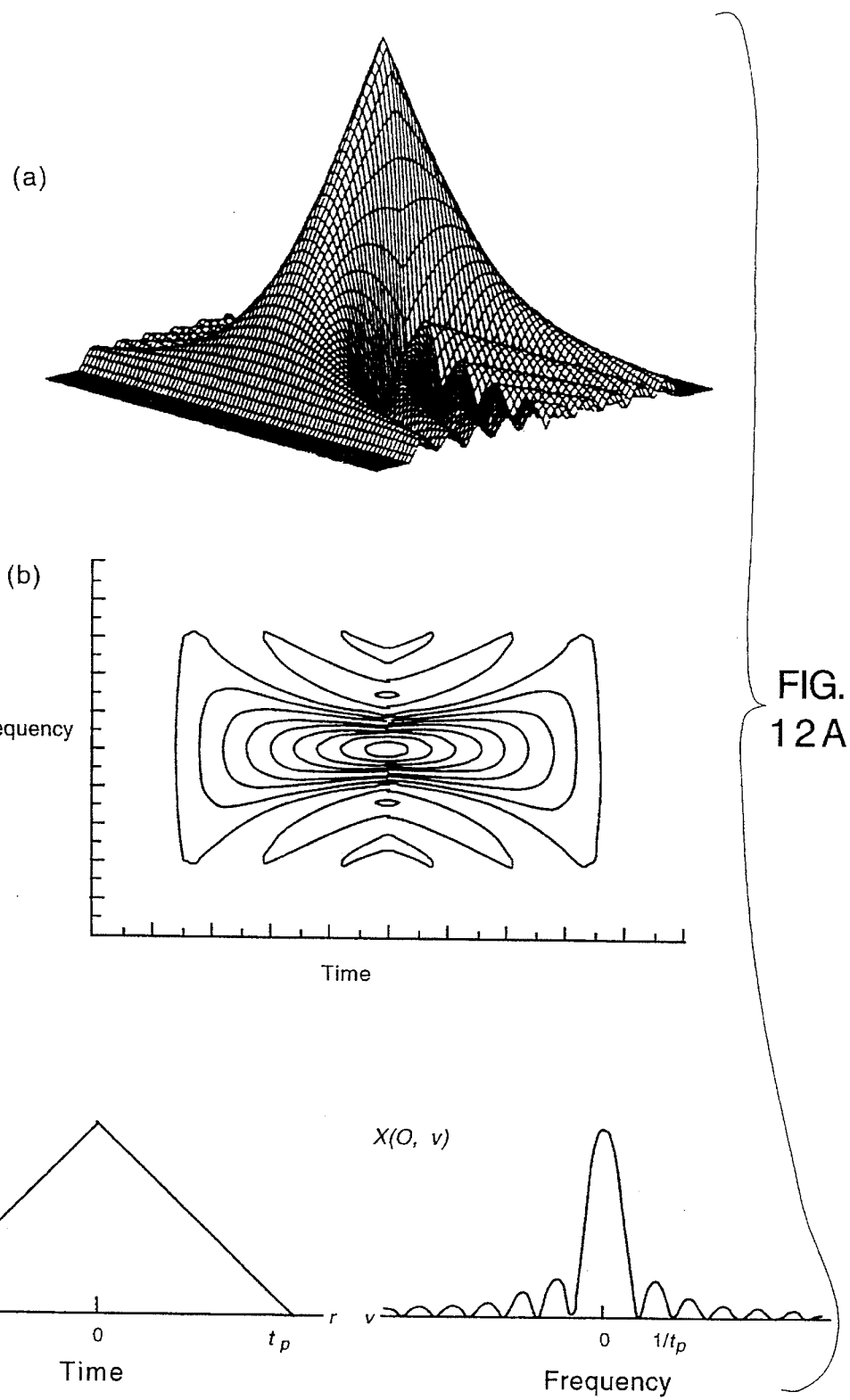
FIG. 12A is a graphical representation of a time-frequency representation, the ambiguity function representation, of a single frequency pulse. (a) 3-D view; (b) contour-plot in the time-frequency plane; (c) left: cut at $f_0$ (the autocorrelation); right: cut at zero delay (the poser density spectrum).
Figure 12C:
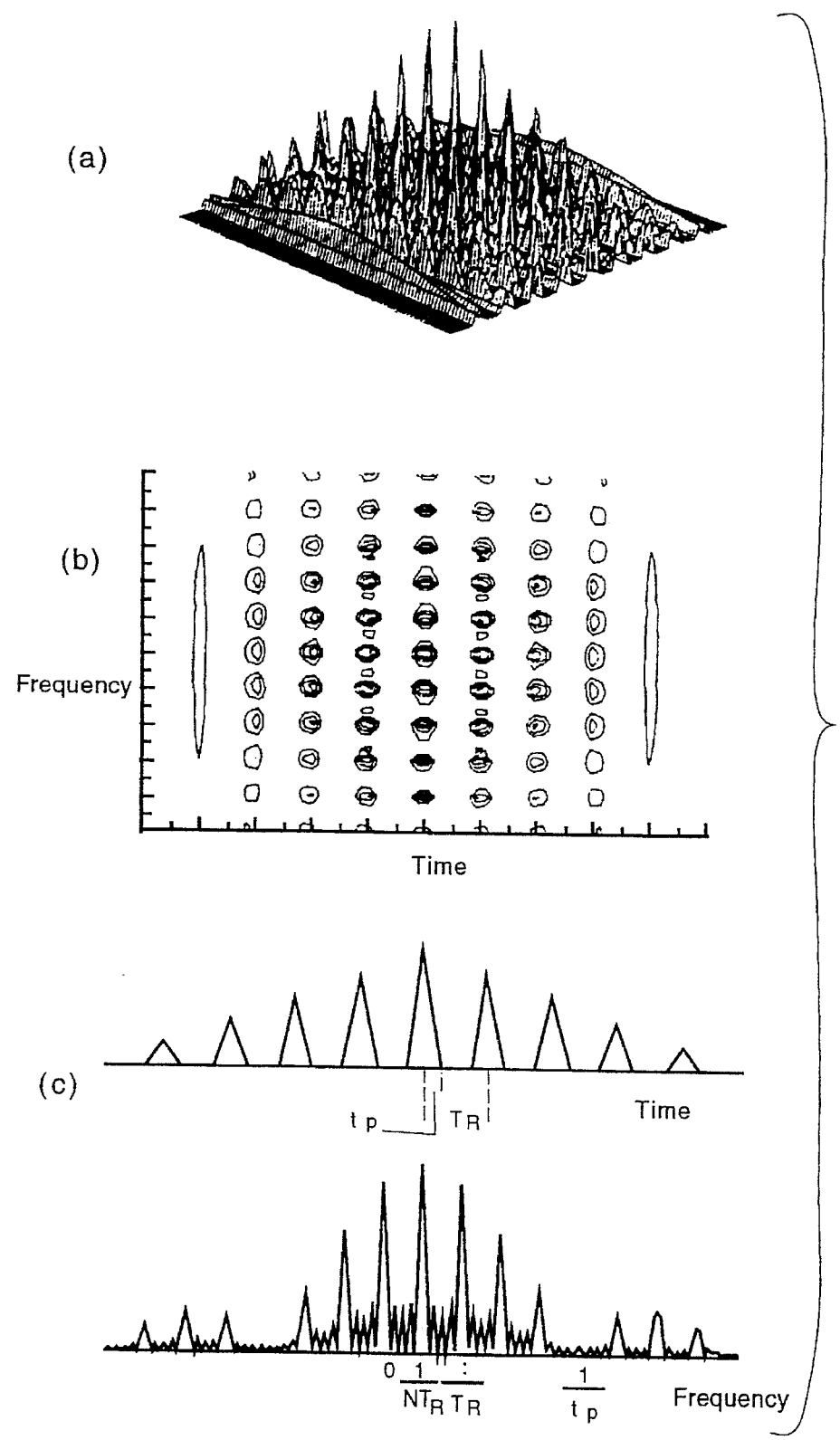
FIG. 12C is a graphical representation of a time-frequency representation, the ambiguity function representation, of five coherent single-frequency constant amplitude pulses. (a) 3-D view; (b) contour-plot in the time-frequency plane; (c) upper: cut at $f_0$ (the autocorrelation); lower: cut at zero delay (the power density spectrum).
Figure 12D:
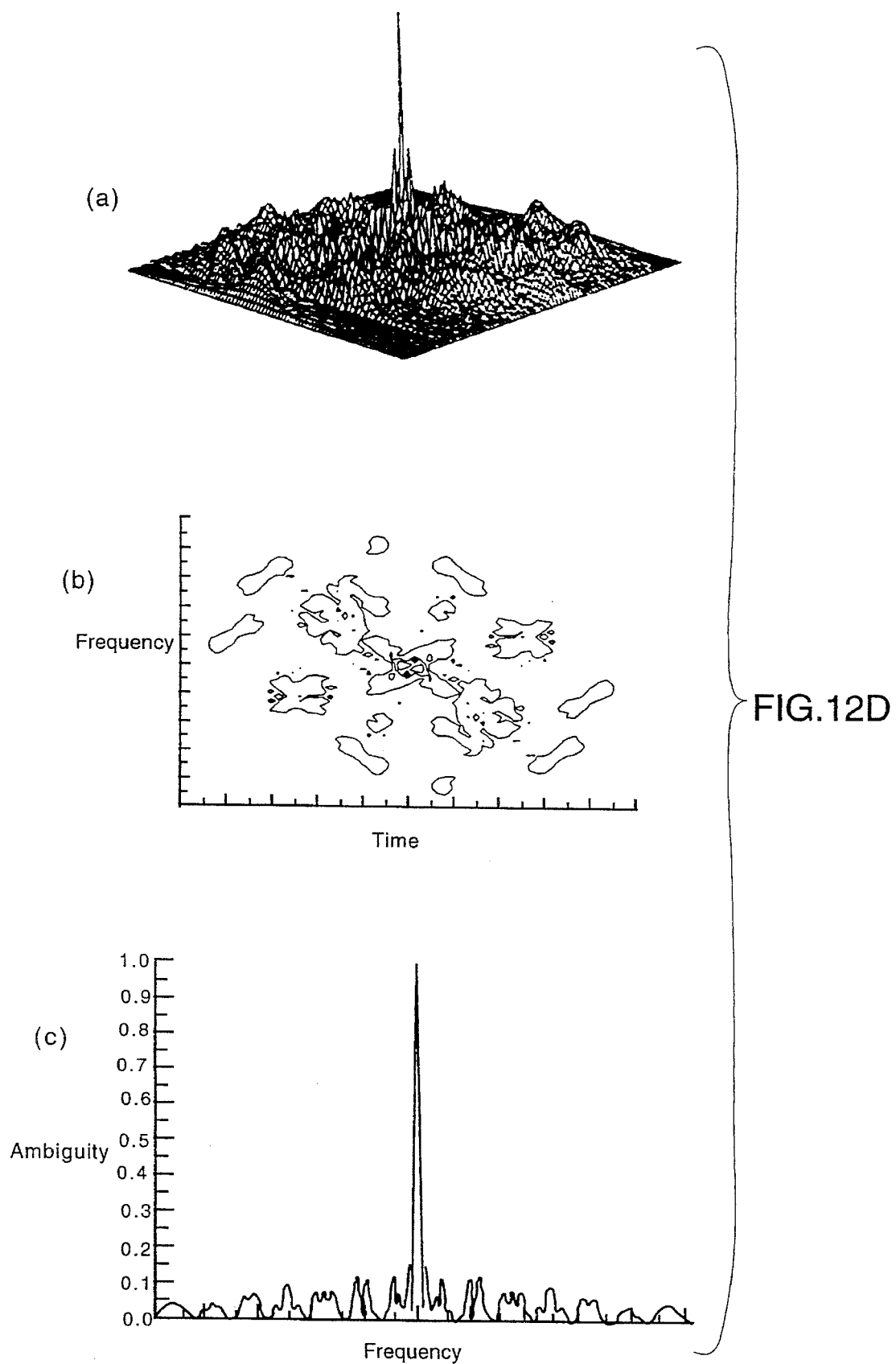
FIG. 12D is a graphical representation of a time-frequency representation, the ambiguity function representation, of a length-7 Costas coded signal. (a) 3-D view; (b) contour-plot in the time-frequency plane; (c) cut at zero delay (the power density spectrum).
Figure 13:
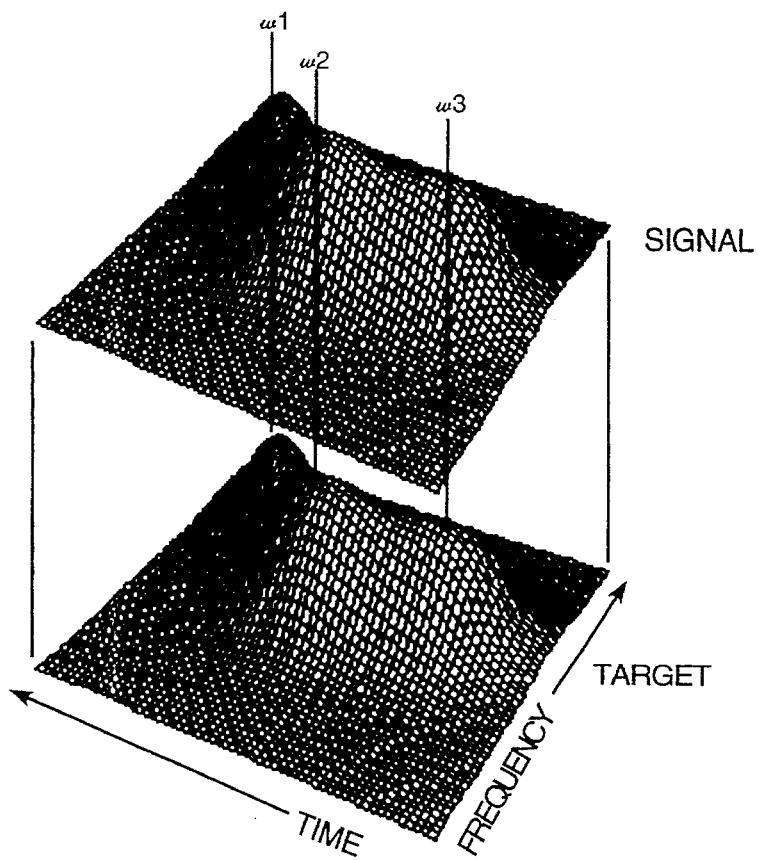
FIG. 13 is a graphical representation of target transfer characteristics in time-frequency space and the matching of signal characteristics to the target in the same space.
Figure 34:
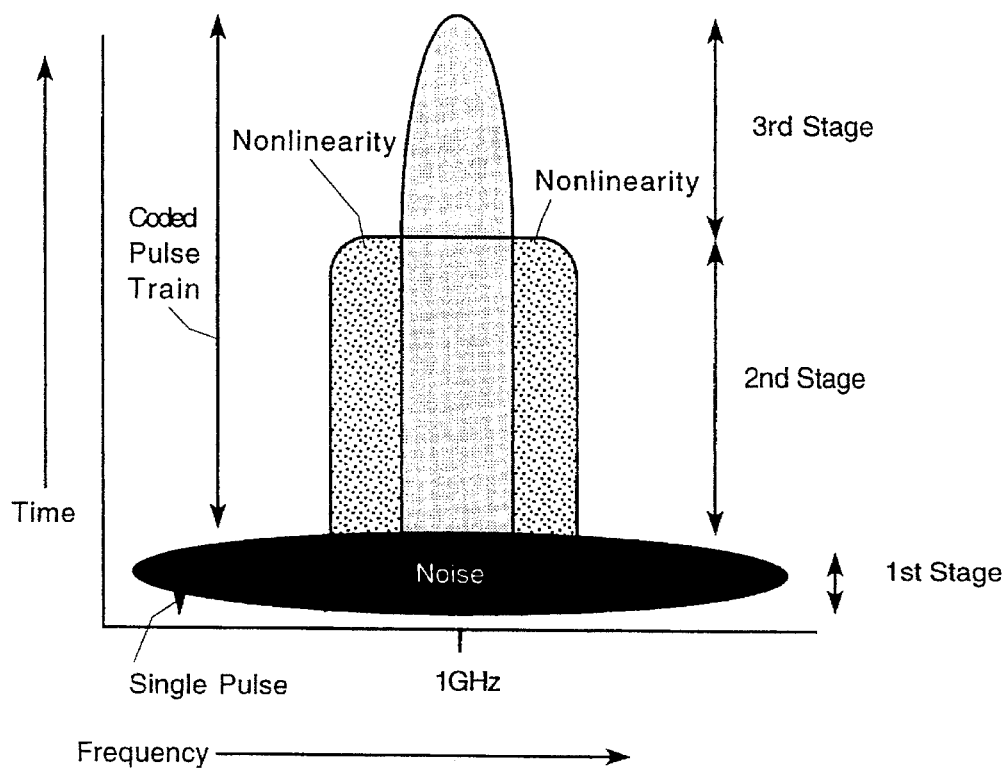
FIG. 34 Time-frequency characteristics of a representative 3-stage receiver.

The same form of the WP representation can be given to signals, target and receivers, i.e., any part of the total signalling system as represented schematically in FIG. 1. and, e.g., as exhibited for a target receiver in FIG. 34. A sample wavelet (an ambiguity function) representation of a single frequency pulse is shown in FIG. 12A, of a linear FM pulse in FIG. 12B, of five coherent single frequency constant amplitude pulses in FIG. 12C, of a length-7 Costas-coded signal in FIG. 12D. Each of these figures can also be considered to represent some target transfer characteristics. An object of signalling system of the present invention (in the D mode of functioning) is to craft a pulse which exactly matches the transfer characteristics of the target (FIG. 13).

Figure 23:
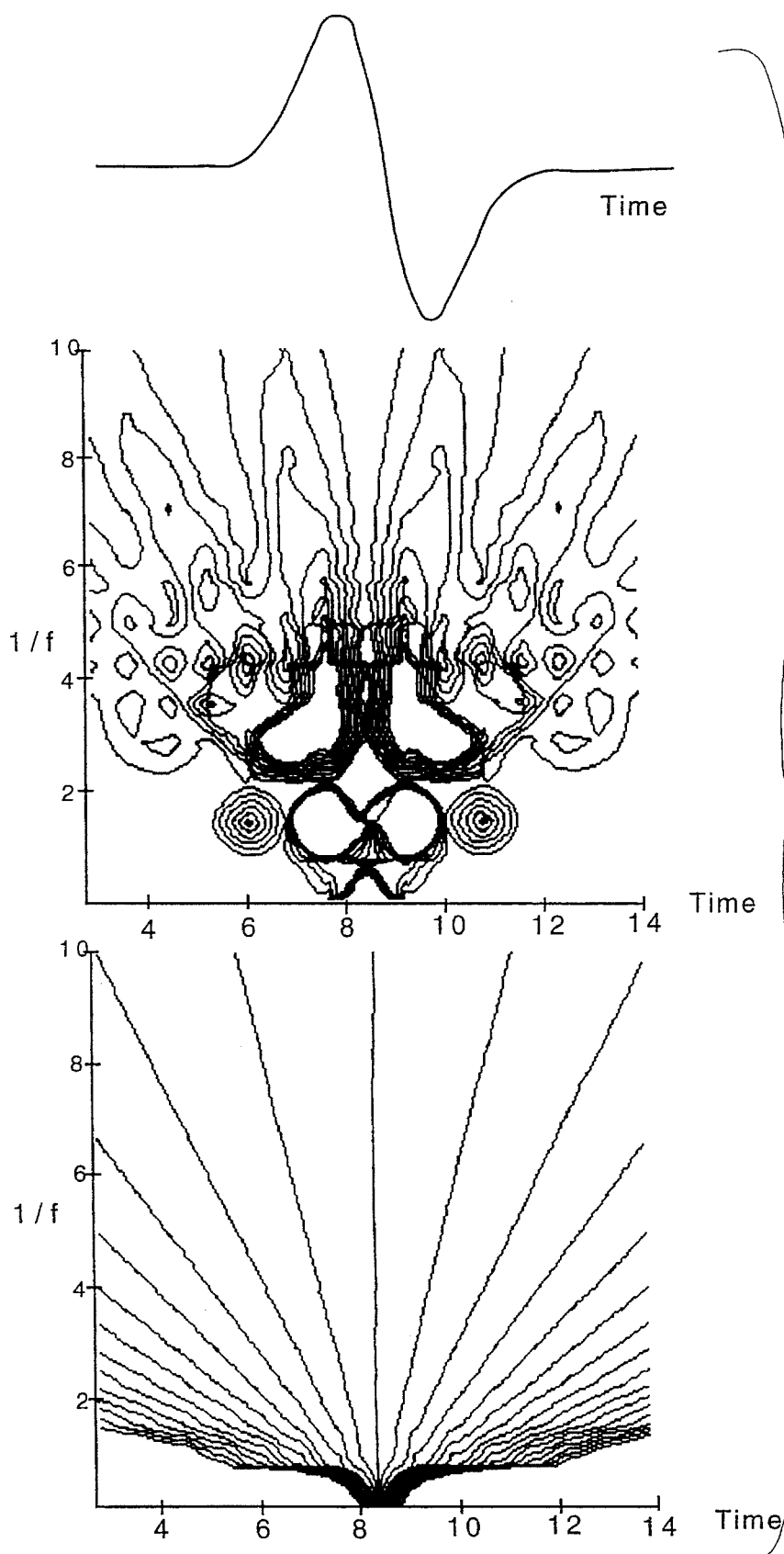
FIG. 23 is a representation of a signal, its amplitude modulus and its instantaneous phase. The abscissa is time. The ordinate (top) is amplitude; the ordinate (middle) is reciprocal frequency, showing contour plots of the amplitude modulus; the ordinate (bottom) is reciprocal frequency, showing lines of constant phase.

The WP signal of the signalling system of the present invention can be matched to the target with respect to the instantaneous frequency, instantaneous phase, instantaneous amplitude and instantaneous polarization of the impulse response of the target. FIG. 23 exhibits a monocycle WP and its decomposition into instantaneous energy and phase characteristics.

Figure 24A:
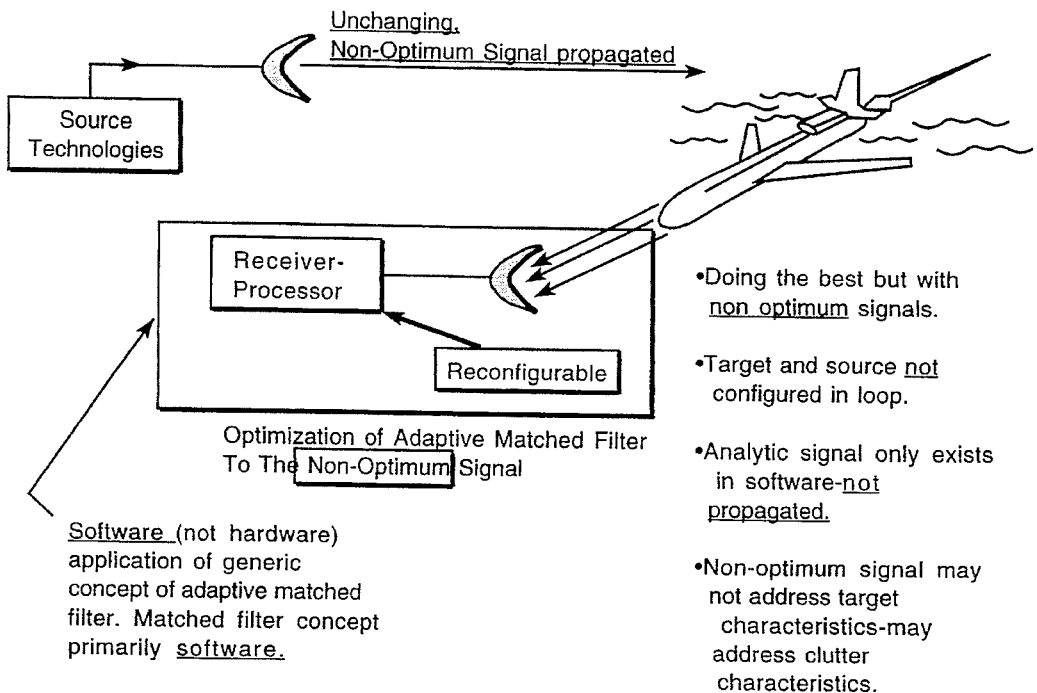
FIG. 24A is a representation of a prior art system in which an unchanging nonoptimum signal is propagated.

Comparisons of signalling systems of prior art with signalling systems of the present invention There are many examples of signalling systems of prior art using matched filtering (Moffatt and Mains, 1975; Van Blaricum and Mitra, 1978; Kennaugh, 1981; Kim et al, 1985; Rothwell et al, 1985; Chen et al, 1986; Kennaugh et al, 1986; Rothwell et al, 1987; Fok & Moffatt, 1987; Morgan, 1988). However, the embodiment of the matched filtering concept by signalling systems of prior art is a software and receiver expression (cf FIG. 1 and 24A). The signal of prior art is not modified to match the target (FIG. 24A). So the matched filtering of the receiver in signalling systems of prior art is on the basis of a signal echo return from target which is the response of an emitted signal may not optimally interact with the target, and, in some instances, may even more optimally interact with the clutter. The example of prior art exhibited in FIG. 24A indicates the lack of adaptive control between the source technologies and the receive technologies.

Figure 24B:
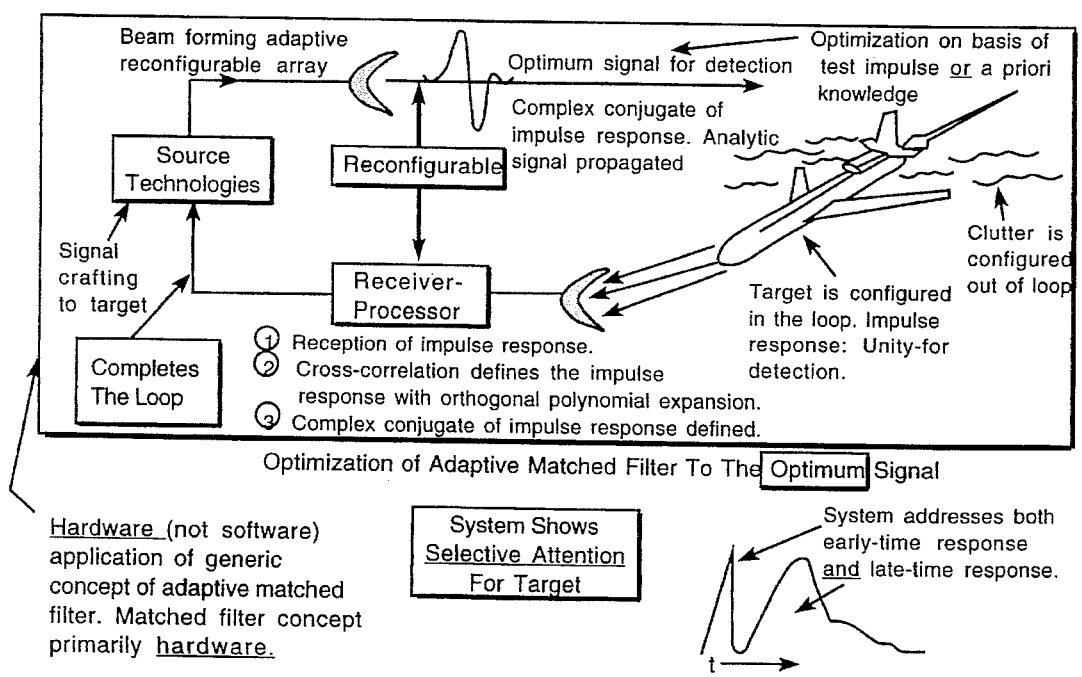
FIG. 24B is a representation of the present invention in which the source technologies are matched to the target.
Figure 25A:
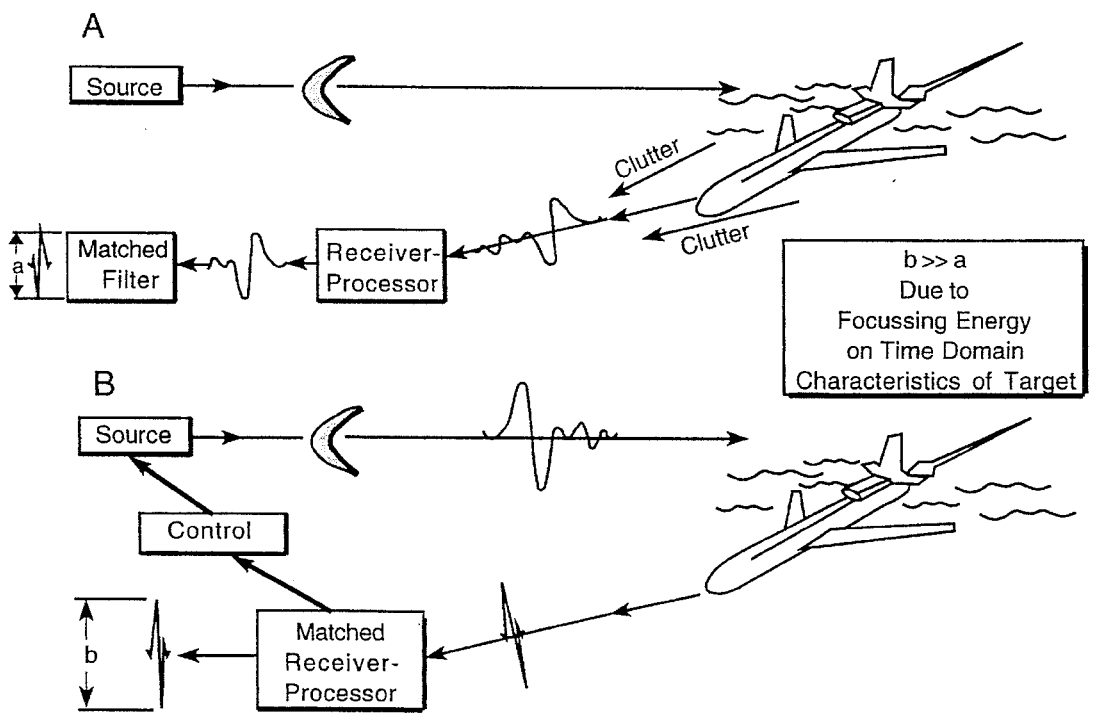
FIG. 25A is a representation of the two modes of functioning of the present invention: the imaging mode, in which a short duration, side bandwidth wave packet signal is used and the antenna emission is equivalent to a point source; and the detection mode, in which a wave packet signal is used and the antenna emission is a matched signal.
Figure 25B:
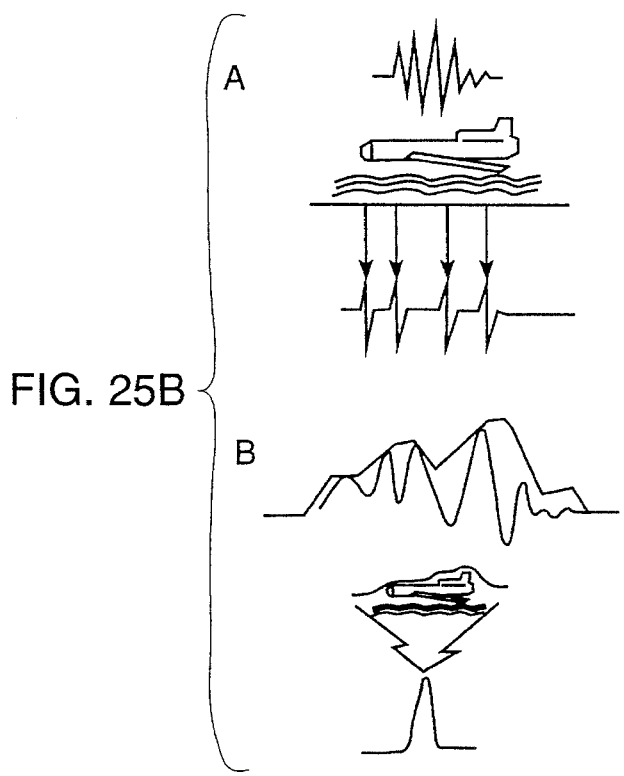
FIG. 25B is a representation of the two forms of signal return expected using the imaging mode and the detection modes.

In contrast, FIG. 24B exhibits a signalling system which is configured according to the present invention, and which exhibits a complete hardware and software embodiment of matched filtering, in which the source and receiver technologies are joined by adaptive control and the target response is configured within that control and transmission channel, and the clutter is adaptively configured out of the transmission channel inasmuch as it is possible to do so. Signalling systems of prior art and the present invention are contrasted in FIG. 25A. In the conventional, or prior art, signalling system, FIG. 25A(A), the antenna is used as a point source of radiation. In the signalling system of the present invention, FIG. 25A(B), the antenna is used as a matched source. A signalling system configured according to the present invention also has two modes of functioning: the I or imaging mode (FIG. 25B(A)) and the detection or D mode (FIG. 25B(B)).

Other comparisons with prior art are:

(1) Prior art refers to a time-bandwidth product. In contrast, with signalling systems of the present invention the range capability is a function of both the energy as well as the receiver gain and the target velocity detection is a function of the interpulse interval change. Thus there need be no reliance on Doppler (a frequency-dependent measure), but ate-of-change-of-range (an absolute time-dependent measure) determined by the interpulse interval change of a train of WPs. Ther e is thus no time-bandwidth product to address with signalling system of the present invention, but rather, a gain-bandwidth product, where the gain is the receiver gain.

(2) Prior art uses a time-frequency description, the ambiguity function, but the ambiguity function is used to address the range-Doppler plane. As stated in (1), the range-Doppler trade no longer is applicable for signalling systems of the present invention, so this interpretation of ambiguity function no longer applies for signalling systems of the present invention. The ambiguity function when used in the context of the present invention refers to the target's frequency and time scattering response, i.e., target identification.

(3) Prior art treats the target as a point target. In the case of signalling systems of the present invention, the target is not a point target but a complex scatterer composed of elementary scattering components. The crafting of the WP signal either interacts with all of these components (the I mode) or is matched to these complex frequency-time scattering components (the D mode). In prior art signal optimization means optimizing the signal to give the best range-Doppler—and there is the implicit assumption in prior art that the target scattering is either optimized or cannot be. In signalling systems of the present invention, the scattering from the target is optimized, then the range and rate-of-change-of range are separately optimized. Therefore, in the case of signalling systems of he present invention there is no ambiguity between obtaining range and rate-of-change-of-range. The ambiguity or trade of signalling systems of the present invention is that between resolution of target scattering components (target i.d.) and range, i.e., target characterization and target range.

The use of the concept of matched filtering used by signalling systems of prior art is different from that used by signalling systems of the present invention.

For example, Spafford (1968) and Stutt & Spafford (1968) describe processing methods for distinguishing signal from noise, i.e., an optimum filter design. However, the signal described is general and nonoptimum for target scattering and modifying the signal to match the target is not considered. Adaptive signal processing refers, in prior art, to a system that continually adjusts its parameters in the course of time to meet a certain performance criterion which is the maximization of the signal-to-interference ratio, but without signal modification.

The ambiguity function diagram is a general mathematical technique used to describe the target illuminating signal. Therefore, the ambiguity function diagram for the scattered return from a particular target is a valid description only with respect to the particular probing signal used. The target sensed by a signalling system of the present invention can also be described in ambiguity function form. The WP signal of a signalling system of the present invention can also be described as the ambiguity function scattering diagram which then defines the optimum signal waveform for the target (FIG. 13). The optimization practiced by prior art optimized the received echo signal-to-noise from targets probed with nonoptimum signals. That is, prior art attempts optimization of signal return from various specific targets under the circumstances of a general general signal. An object of signalling systems of the present invention is to both emit the optimum signal optimized to target and also optimize the signal-to-noise in the returned echo. Another object of signalling systems of the present invention is that both optimizations are in time-frequency space, not just time, and not just frequency space.

Mosca (1969) addressed the problem of detecting coherent pulse trains in the presence of interfering signals, i.e., noise and clutter. However this is quite a different problem from crafting signals to target as used in signalling systems of the present invention. No modification of the signal is recommended by Mosca. However, Mosca does identify the desired processor as the linear filter orthogonal (in time) to nonfluctuating clutter which achieves the maximum input-to-output signal-to-noise gain. This is also an object of signalling systems of the present invention, but it is required of such systems that the signal be modified to match the target's time-frequency response.

Rihaczek (1971) gives a general description of signal waveforms and described four classes of signals defined with respect to time-bandwidth product, ambiguity function, resolution cell size, ambiguities, and sidelobes. The classification is valid, but does not address the target's geometry or material composition. Moreover, the four types of signals described are general not matched-to-target. On the other hand, signalling systems of the present invention match signals to target. WP signals of the present invention do no readily fall within the four categories proposed by Rihaczek, namely: constant-carrier pulses, irregular or noiselike signals, FM signals, and repetitive signals. WP signals of the present invention are matched in carrier (or average) frequency, frequency bandwidth, temporal bandwidth, instantaneous frequency, phase, amplitude and polarization to the target. In most cases, signals of the present invention will not be constant carrier pulses, nor irregular or noiselike signals, nor FM signals. However, signals of the present invention will be repetitive—which is a general and not a distinguishing attribute from prior art. The class of targets described by Rihaczek are defined within specific range gates. That is, those signals provide a certain range resolution and a range rate resolution with the minimum values of signal bandwidth and duration established by these resolution requirements. Thus, the geometry/material aspects of the targets are not discriminated by these signals. However, signals of signalling systems of the present invention do discriminate target geometry/materials. Furthermore, Rihaczek does not distinguish between the qualitatively different types of target response, such as (i) early time (optical); (ii) resonance; and (iii) late time, responses, such responses being distinguished by signalling systems of the present invention.

Rihaczek (1971) and Rihaczek & Mitchell (1967) also addresses the classical range-Doppler trade-off, which is not applicable to signalling systems of the present invention. In the case of signalling systems of the present invention, the rate-of-change-of-range is detected by the interpulse interval change of the pulse train, and the range is detected separately by the duration interval between emission and return of the individual pulse in a train. Thus there is no range-Doppler trade constraint for system design in the case of signalling systems of the present invention. Furthermore, Rihaczek uses the general mathematical time-frequency technique to describe a range-Doppler detection capability for signal waveforms of prior art. In the case of signal waveforms of signalling systems of the present invention, the ambiguity diagram describes the autocorrelation of macro/micro emitted/received pulses and the power density spectrum of macro/micro emitted/received pulses. Thus when used in the context of signalling systems of the present invention, the general mathematical descriptive technique of the ambiguity function is used to describe different radiation-target attributes than in the context of prior art.

Wolf et al (1969) address the problem of synthesizing a waveform which has an associated ambiguity function in the time-frequency plane. However in the case of this prior art, (1) as discussed above, the time-frequency plane for these authors is the range-Doppler plane, which as noted above, is not the same as the target's time-frequency scattering matrix representation addressed by signalling systems of the present invention; (2) the authors do not address amplitude modulation but only phase modulation. Their reason for so doing is because "phase modulation may be generated easier than amplitude modulation, and since most radar systems operate in saturation for a significant portion of the time in order to maximum average power." Thus these authors do not address the time-frequency response of a target, but only the frequency response.

The same can be said for the study of Holtzman & Thorp (1969), who apply the ambiguity and define its surface in terms of probability of detection. However, in the case of signalling systems of the present invention, in the same situation addressed by Holtzmann & Thorp, the ambiguity surface characterizes the reflectance characteristics of target(s) and separately characterizes the range and rate-of-change of range which are no longer joined in a tradeoff relation. The output of the filter Holtzmann & Thorp describe is matched to the target's range and velocity. On the other hand, the signalling system of the present invention embodies a filter matched (1) in WP pulse characteristics to the scattering characteristics of the target in its pulse shape and material composition, (2) in energy and receiver gain to the target's range, and (3) in the WP pulse repetition rate to and detection of the rate-of-change-of-range to the target's velocity.

Blau (1967), Delong & Hofstetter (1967, 1970), Ares (1967), Rihaczek & Golden (1971), Kretschmer (1977), Hsiao (1976) and Mahapatra & Ramakrishna (1977) describe only pulse trains and the range-Doppler interpretation of the ambiguity function for point targets. Delong & Hofstetter (1969) and Acampora (1976) describe only amplitude modulated signal forms for the range-Doppler interpretation of the ambiguity function for point targets. Chadwick & Cooper (1974) describe pulse width and pulse spacing but only so that returns from clutter do not arrive at the same time as the return signal from the target. Therefore these authors address signal forms for the range-Doppler interpretation of the ambiguity function for point targets—an interpretation which does not apply in the case of signalling systems of the present invention.

Poelman (1976) describes the orthogonally polarized backscattered components of a target, but does not address the amplitude modulation of the signal needed to address the geometry/material of target. The acoustical study of van Trees (1965) addresses signal forms for the range-Doppler interpretation of the ambiguity function for point targets—an interpretation which does not apply in the case of signalling systems of the present invention.

A signalling system of prior art has been proposed by Gjessing (1978, 1986) which proposes to modify the emitted signal. However, the Gjessing proposal to adapt the radar illumination as well as the processing of the received signal to the target in an optimum manner addresses only the steady state continuous wave frequency characteristics of targets and medium. The Gjessing signalling system is this a frequency space system and addresses the steady state and not the transient state of the target/medium, whereas that of the present invention is a time-frequency space system and addresses both the steady stat and transient state of the target/medium.

A signalling system of prior art has been proposed by Chen (1981, 1982; Chen et al, 1981) which proposes to modify the emitted signal. However, the Chen proposal is to synthesize a waveform of an incident radar signal which excites the target in such a way that the return radar signal from the target contains only a single natural resonance mode of the target. The Chen signalling system is thus a frequency space system and addresses the steady state and not the transient state of the target/medium, whereas that of the present invention is a time-frequency space system and addresses both the steady state and transient sate of the target/medium.

Counter-clutter properties of a signalling system of the present invention

Figure 28:
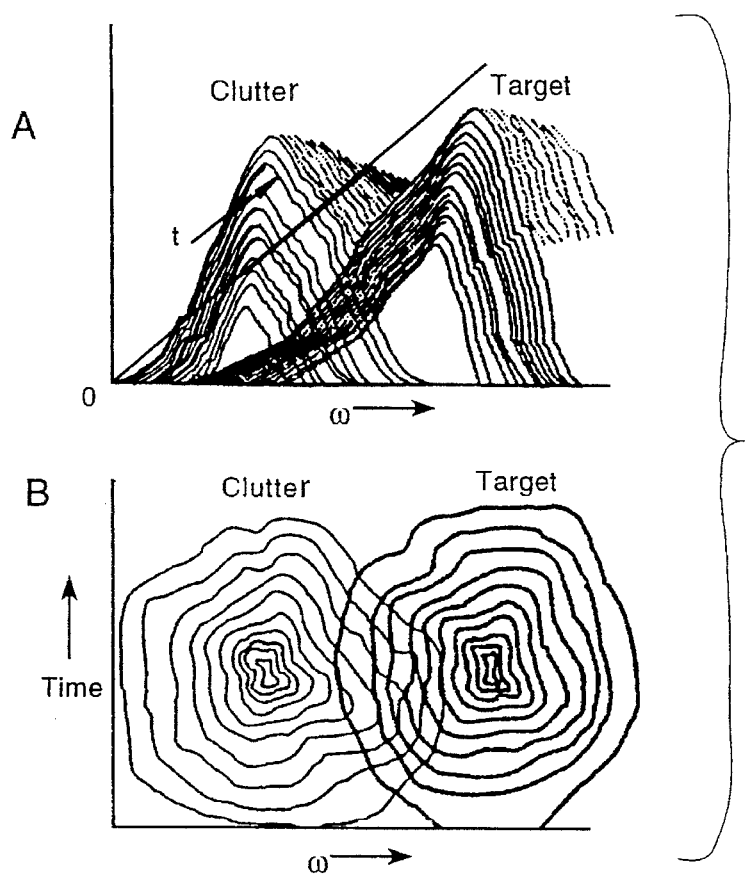
FIG. 28 is a representation of target and clutter in time-frequency space.

Signalling systems configured according to the present invention can exploit any orthogonality in the descriptions of the transfer characteristics, steady state or transient, of the target and media, to obtain maximum signal-to-noise. If the characteristics of the target and media are (relatively) orthogonal, then increases in signal-to-noise are obtained by matching the WP signal to the target in the D mode of functioning (FIG. 26). In many instances, a wavelet or time-frequency representation of the target reveals that the target occupies a different location in the time-frequency plane than the clutter (FIG. 28). The echo from both target and clutter. While the echo from both target and clutter using a signal of prior art could be two-dimensionally filtered (in time and frequency) to remove the clutter, less energy from the emitted signal interacted with the target, than with a matched WP signal of present invention. By using a WP signal of present invention more signal energy interacts with the target and greater signal-to-noise and target discrimination is obtained.

Media penetration using WP signals of present invention

In some instances (cf. Barrett, 1991) WP time-frequency-signals of the present invention will penetrate media impenetrable to continuous waves.

Figure 33:
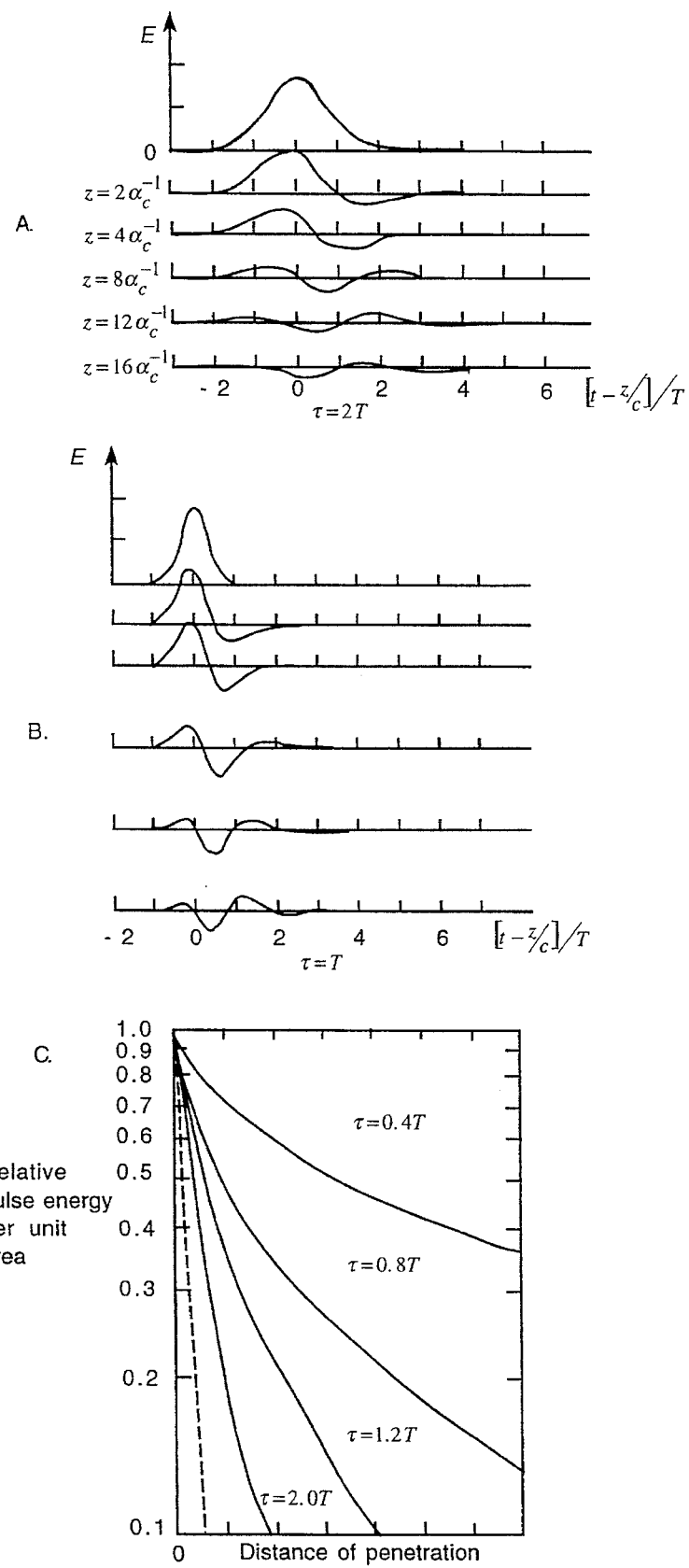
FIG. 33 Representation from calculations by Crisp (1970) showing deeper penetration through media when the wave packet is less than the relaxation time of the medium. (a) and (b): propagation of a Gaussian pulse of length t. The depth of penetration, z, is measured in Beer's law absorption lengths, $a^{-1}$. (c): variation of pulse energy per square centimeter with penetration distance into the absorber of Gaussian pulses of various pulse lengths t.

In one instance the media must possess a relaxation time greater than that of the WP duration, the WP must undergo a minimum of frequency dispersion, and the WP must be of sufficient intensity so as to interact with two distinct vibrational energy levels (an excited state and a ground state) of the medium. FIG. 33 exhibits calculated results demonstrating increased media penetration when the duration of the pulse, t, it less than that of the medium relaxation time, T. The classical relaxation shown in FIG. 33 is linear due to the neglect of system inertia, i.e., the system is assumed to commence relaxing immediately. This classical relation becomes nonlinear when a realistic two-level system with inertia is considered.

Because of the finite lifetime, T, of an excited dipole moment of the medium, the emission line of a dipole will have a width equal to 1/T. This is the homogeneous width, (homogeneous because it is the same for every similar dipole). However, generally the dipole is coupled to the environment, and this inhomogeneous lifetime (inhomogeneous because it can be different for every dipole) is T*, and the spectral inhomogeneous broadening is 1/T*. A "total" relaxation rate, $T^{-1}$, can then be defined as $T^{-1}=T^1+T^{*-1}$. The ratio of inhomogeneous to homogeneous broadening will determine whether a pulse will break up in the medium due to destructive overlapping of transitions causing dephasing in the WP pulse. If the medium's inhomogeneous broadening is not greater than homogeneous broadening, i.e., the homogeneous relaxation time is not greater than the inhomogeneous relaxation time, the WP pulse will not have greater success than continuous waves and will not penetrate the medium even if it is shorter in duration than the relaxation time of the medium. But if the medium's inhomogeneous broadening is greater than homogeneous broadening, i.e., the homogeneous relaxation time is greater than the inhomogeneous relaxation time, and provided that all the conditions mentioned above are met, the WP pulse will penetrate the medium, whereas continuous waves which combined together describe the WP pulse in frequency space, will not.

In another embodiment, the temporal length of the WP pulse, t, of the present invention is matched to the dispersive properties of the medium/media resulting in a propagating soliton.

In another embodiment, the temporal length of the Wp pulse, t, of the present invention is matched to any intensity-dependent nonlinearities in the medium/media resulting in another kind of propagating soliton.

In another embodiment, the polarization and the rate of change of polarization of the W P pulse of the present invention is matched to the polarization properties of the medium/media resulting in greater penetration.

In another embodiment, the Brillouin and Sommerfeld precursors (cf Barrett, 1991) elicited in the medium by the fast rise and fall times of the WP pulse of the present invention will penetrate the medium.

Applications areas of the present invention

Figure 32A:
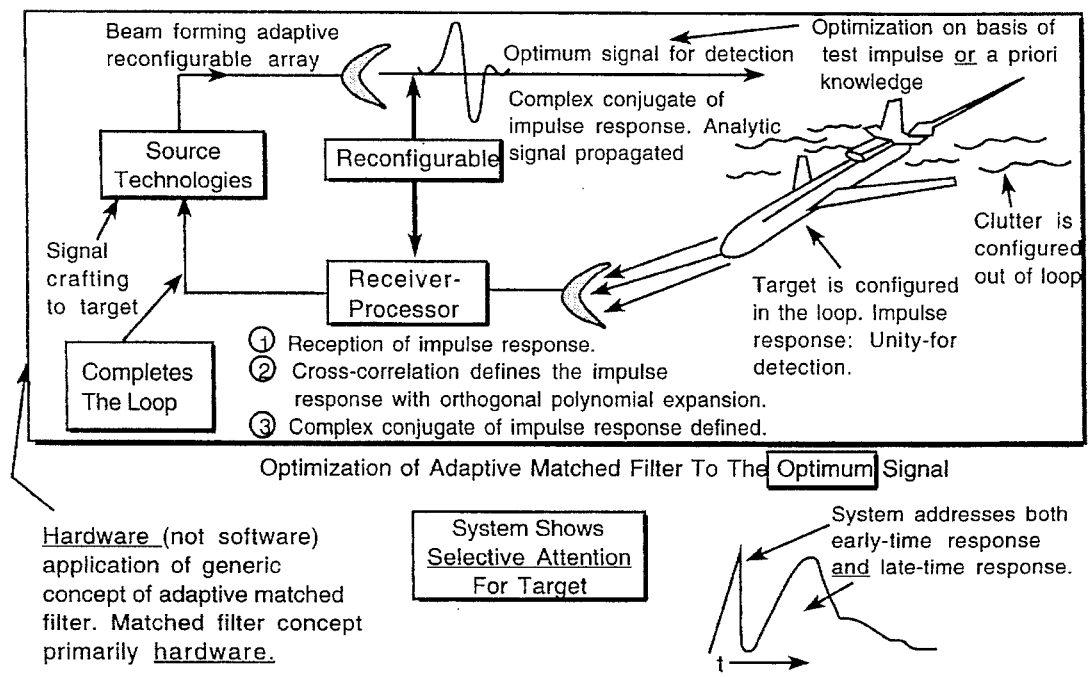
FIG. 32A counter-clutter, counter-multipath, counter-Raman scattering, counter-ionospheric scattering.
Figure 32B:
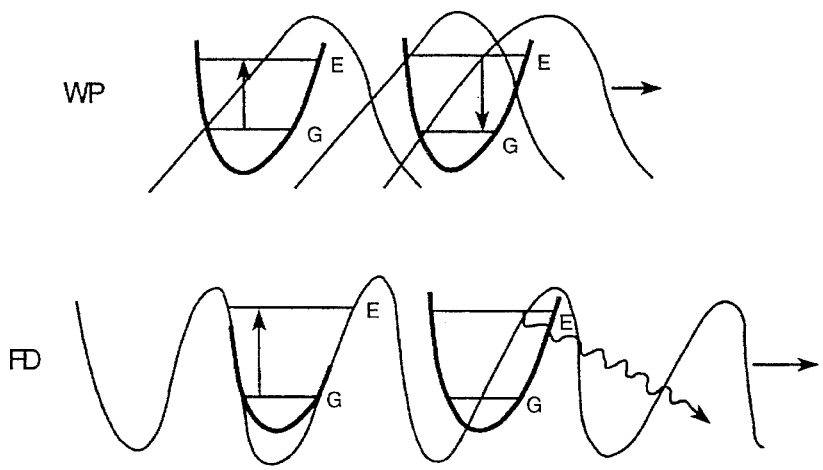
FIG. 32B foliage penetration (FOPEN); weatherpen (WEATHERPEN); ground penetration (GROUNDPEN) and ice penetration (ICEPEN). In the case of a WP of the present invention (upper) the leading edge of the envelope of the WP excites the molecular complex of the medium to an excited vibrational state; the trailing edge of the envelope is passing before the relaxation time from that excited state resulting in reemission back to the pulse. Homogeneous broadening is assumed to be greater than inhomogeneous broadening in the medium. In the case of a continuous wave signal of prior which is longer in duration than the relaxation time of the molecular complex of the medium, the medium relaxes from the excited state and the energy from the signal is absorbed.
Figure 32C:
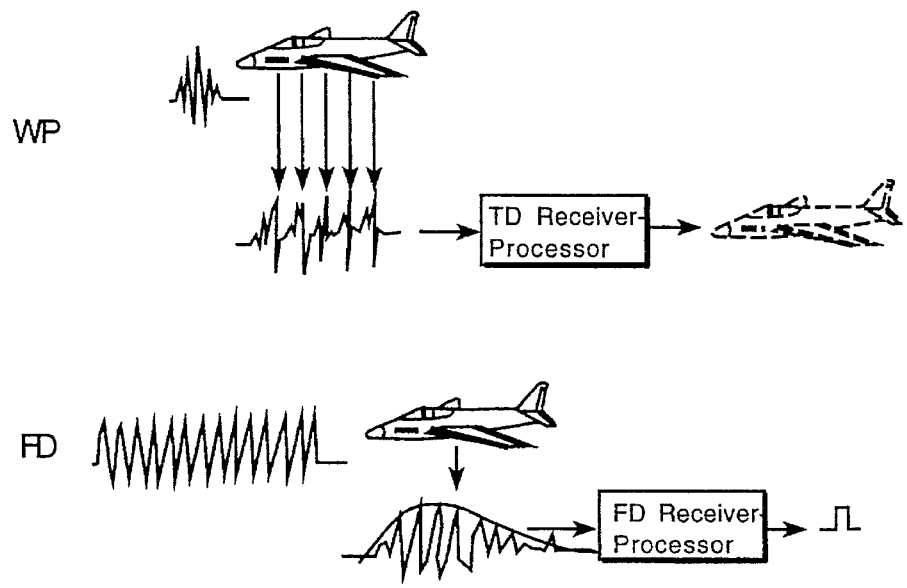
FIG. 32C higher range resolution; sensing of higher order target diffractions and target elementary scatterers; target imaging on the basis of an informational rich return from target.
Figure 32D:
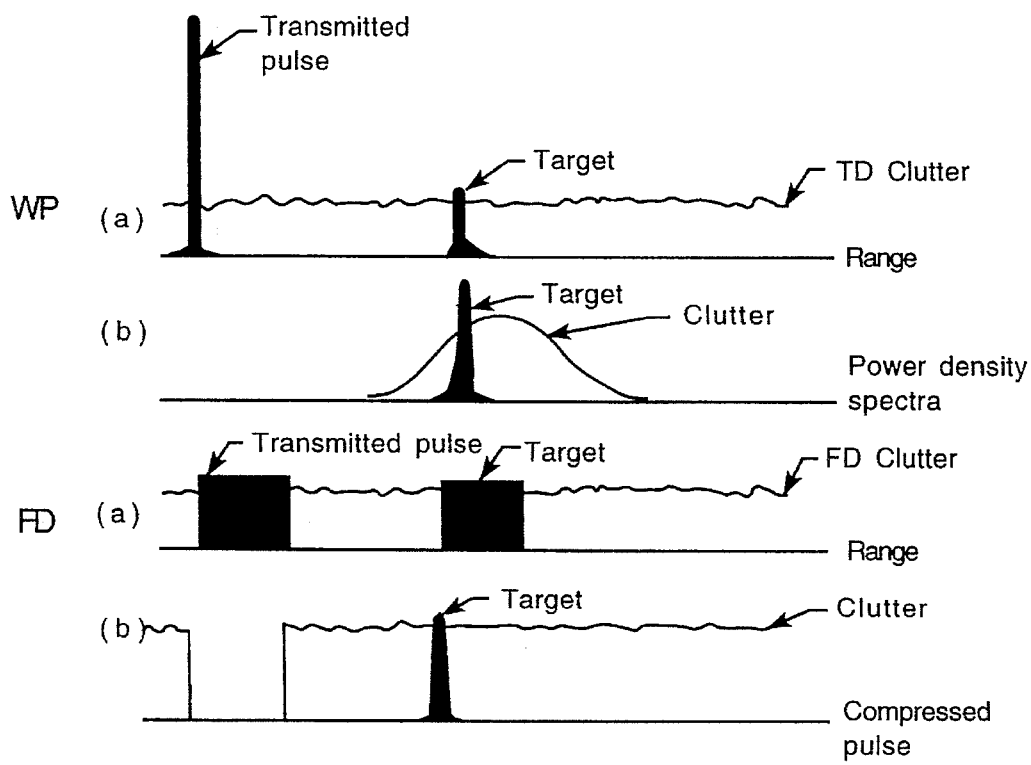
FIG. 32D long range surveillance.
Figure 32E:
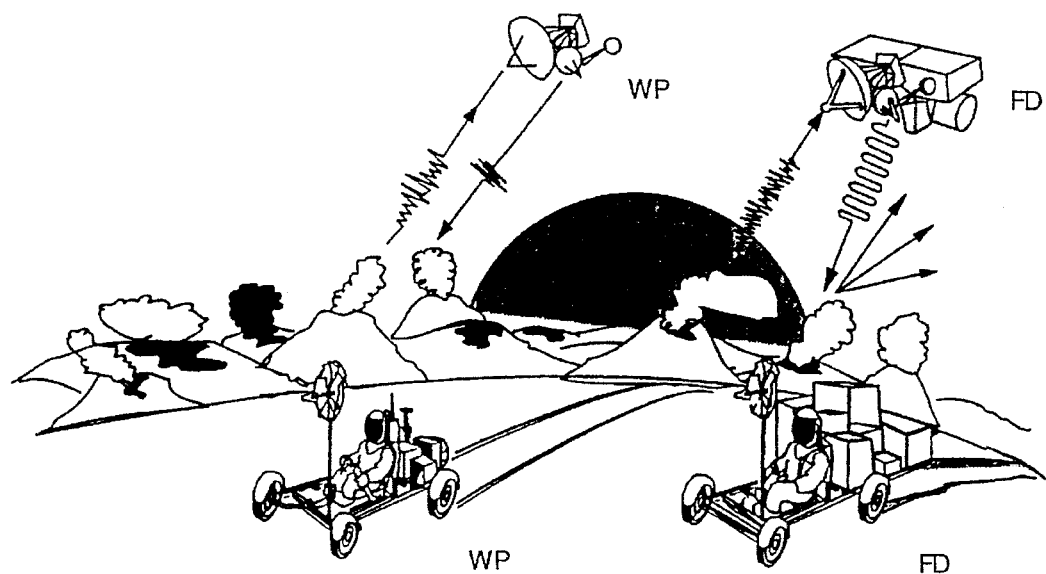
FIG. 32E space-based surveillance, planetary rover.

FIG. 32A exhibits five applications areas of time-frequency WP signalling systems of the present invention and contrasts the capabilities of these systems with those of frequency domain (FD) signalling systems of prior art. The five areas are further exhibited in FIGS. 32B–E.

Figure 32H:
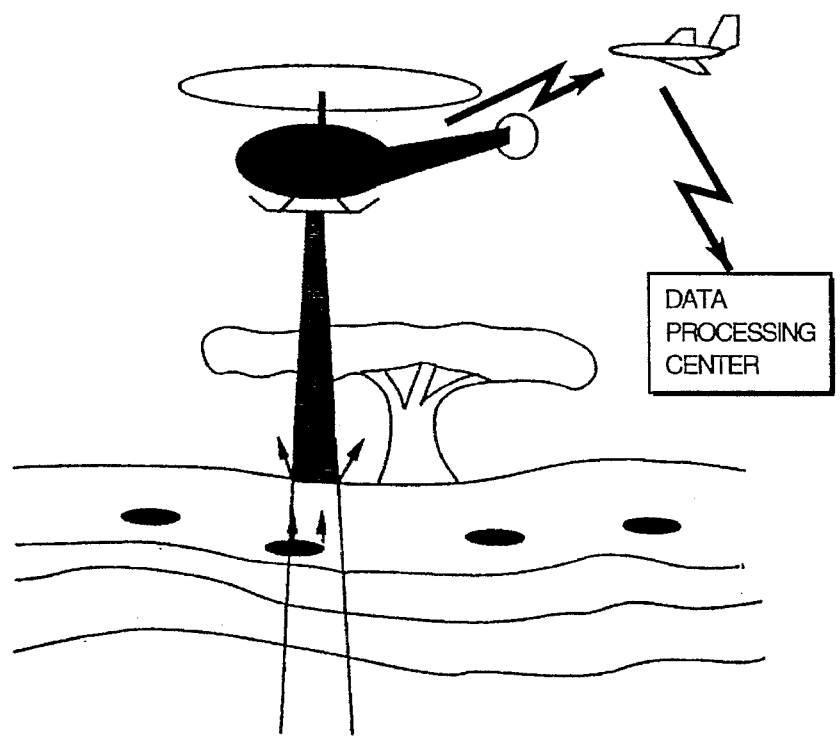
FIG. 32 are representative applications of the present invention.
FIG. 32F communication links.
FIG. 32G Sea-skimming missile detection.

Additional applications exhibited are: ground-probing sensor-radar (FIG. 32G); anti-ship missile sensor-radar (FIG. 32H); communications links (FIG. 32I).

Applications areas at optical, IR and RF frequencies as well as in sonar include:

Ultra-high resolution sensor-radar;
Satellite media/atmosphere penetrating surveillance sensor-radar and communications;
Ground probing sensor-radar;
Anti-ship missile defense;
Low probability of intercept (covert) surveillance and communications;
Low probability of exploitation if intercepted (secure) surveillance and communications;
Communications links: local area networks; satellite-to-satellite; air-to-ground; air-to-air; ground-to-air; ship-to-ship; ship-to-shore; data transfer links;
Identification: Fried or Foe interrogating and identifying sensor-radar;
Ultra-spread spectrum communications and surveillance systems;
Foliage-penetrating sensor-radar;
Foliage-detecting and characterization sensor-radar;
Ice-penetrating sensor-radar;
Space-based surveillance sensor-radar;
Airborne surveillance sensor-radar;
Ultrahigh resolution/light weight planetary vehicle;
Long/Medium/Short range ultrahigh resolution sensor-radar;
Aircraft landing system;
Ship sensor-radar;
Ship docking system;
Imaging sensor-radar;
Atmosphere/Ionosphere/Weather penetrating sensor/radar;
Jammers and interferers.

Interference and jamming properties of the present invention

A signalling system of the present invention is a more effective interference and jamming system than prior art. Due to the matching of WP pulsed signal energy to the target in terms of both the target's time and frequency characteristics, the matched WP approach of the present invention interacts maximum signal energy with the time-frequency window response characteristics of all the subsystems of a target receiver.

The time-frequency characteristics of a representative receiver is exhibited in FIG. 34. A WP pulse crafted according to the method of the present invention possesses time-frequency characteristics and distribution of energy so that maximum interaction occurs with any receiver components. Prior art, neglecting the temporal characteristics of the target interacts nonoptimally with the target.

RF performance prediction of the signalling system of the present invention

The system performance of radars of prior art for transmitting constant wavelength or FM signals can be contrasted with that of WP radars of the present invention designed for transmitting ultrast/ultrashort packets or pulses.

There are two major observations concerning WP radar of the present invention performance prediction:

(1) Concerning those capabilities, e.g., ranging and detection, which can be performed by both FD and WP systems: as the radar range equation is identical for both types of systems for zero receiver gain, then the presence of ay receiver-processor gain gives a WP system a clear advantage over FD systems. Receiver-processor gain is expected in most instances.

(2) There are also capabilities which only WP systems possess, e.g., imaging on the basis of one return echo (due to the arrival, separated in time, of the scattering from individual scattering elements of the target), as well as an information-rich characterization of the target based on accessible primary, secondary and higher-order diffraction components, together with Rayleigh, resonance and optical components. For these WP-only capabilities, there is a clear superiority over the FD systems of prior art.

The following table gives similarities and differences:

TABLE 1

| Comparison of FD and WP system capabilities. | |
|---|---|
| FD System | WP System |
| Range resolution capability | High range resolution capability |
| Detection of target | Identification of target |
| Detection of target characteristics | Identification of multiple target characteristics (ergodicity) |
| Doppler | Rate of change of range |
| No capability (single frequency) | One return echo imaging capability |
| Threshold Detection | Power Spectral Analysis |
| Local Oscillator | Global analytic signal sequence |
| Signal envelope detection | Signal envelope and fine structure detection |
| Harmonic frequency analysis | Instantaneous frequency analysis |
| Heterodyne receiver | Homodyne receiver |
| Global frequency decomposition | Local and instantaneous (wavelet) representation |
| Total transmitted energy | Total transmitted energy and receiver gain |
| No capability | Receiver gain |

TABLE 1-continued
Comparison of FD and WP system capabilities.

| FD System | WP System |
|---|---|
| Receiver aperture | Receiver aperture and antenna balance |
| Receiver FD noise | Receiver TD noise |
| Global Time Event | Local Time Event |
| Return signal shape not preserved | Return signal shape preserved |
| Signal repetition and integration over time improves signal to noise | Signal repetition and integration over time and power density spectral analysis (sampling rate) over a wider frequency range improves signal to noise. |

The general requirements for a WP radar system of the present invention are:

1. Pulse power source (cf. Didenko and Yushkov, 1984; Meleshko, 1987): sufficient energy to satisfy minimum range requirements, but with fast rise-times fall-times (low psec range) and of sufficiently short duration (psec.s to nsec.s) to address targets of interest. Sufficient repetition rate to satisfy signal averaging requirements and target speed detection (kHz range) by interpulse interval change. Reliability and longevity is important for a fieldable system.
2. Receiver: a time domain receiver is required with receiver gain either obtained by real time methods or by a GHz sampling rate.
3. Matched emit and receive antennas: wideband, nondispersive resonant, or wideband nonresonant.
4. Beam forming capability, timed array.
5. Advanced parallel processing capability.

The limiting factors in time domain radar performance depend on:

(i) The total energy interacting with the target which is determined by: (a) the total energy in the pulse duration, $\Delta t$, which, itself is limited by the smallest resolvable, possible or desired, elementary scatterer on the target, i.e., high energy individual WP signals emitters; (b) arrays of WP emitters; (c) WP signals emitted as trains of pulses; (4) combinations of (1)–(3); and (5) signal averaging.

(ii) The ratio, K, of the target's largest dimension, a, to the elementary scatterer, $a_{min}$, aforementioned.

Figure 29:
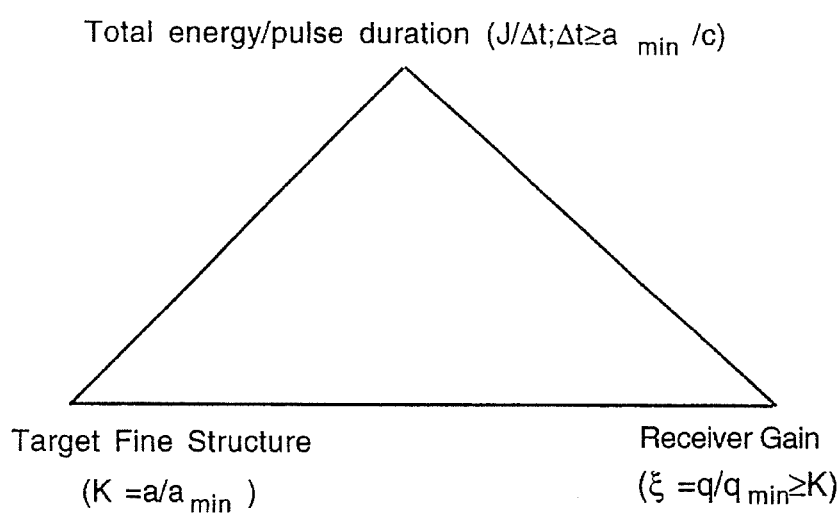
FIG. 29 is a representation of the mutual relations in the limiting factors on performance of the present invention. Given a target of maximum length, a, and desired minimum length to be resolved, $a_{min}$, then pulse duration, $\Delta t$, must be $\Delta t \geq a_{min}/c$; and the receiver minimum sampling interval, $q_{min}$, must be $\xi = q/q_{min} \leq K$, where $K = a/a_{min}$. Performance is limited by four factors: (1) Top—range is commensurate with energy (J) emitted, but with the following provisos; (2) Left—the target must be a "target of opportunity", that is, there must both exist a minimum structure, $a_{min}$, available on the target, and there must also be the desire on the part of the radar operator to detect that minimum structure; (3) Top—given the designation of $a_{min}$, the pulse duration, $\Delta t$, can be defined according to the condition $\Delta t \geq a_{min}/c$.; (4) Right—again, given the designation of $a_{min}$, the receiver gain required can be specified according to the condition $\xi = q/q_{min} \leq K = a/a_{min}$. Thus performance of the present invention cannot be predicted without designation of target fine structure and the pulse energy is relevant within the context of pulse duration set by the designated minimum fine structural length.

(iii) The receiver gain, $\xi$, which must be less than or equal to K, and is a function of the receiver sampling rate. These relations are shown in FIG. 29.

Practical example of a time domain radar system and analysis.

Figure 31:
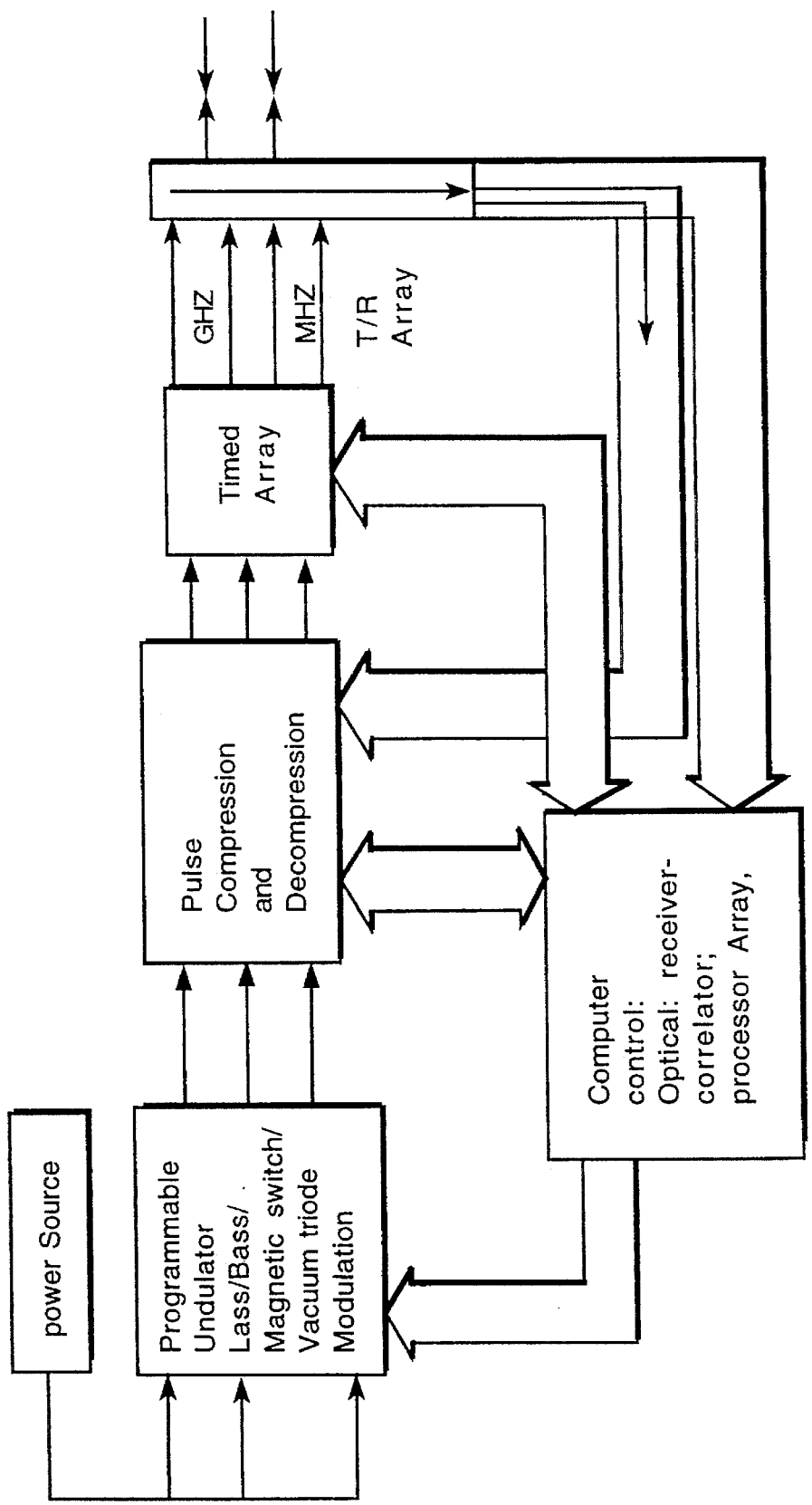
FIG. 31 is a representation of some embodiments of the present invention. The present invention is based on three generic technology areas: (1) source technologies; (2) receiver-processor technologies; and (3) antenna and array technologies.

Below is listed a very general schematic for a practical WP radar system (FIG. 31). The component parts of any design will, of course, be chosen with the specific intended mission in mind.

In some embodiments, the choice of source technologies includes:

(1) Diode laser array or other laser.
(2) Light-activated semiconductor switches (LASS), with or without compressed pulse amplifications. These switches are generally silicon based.
(3) Commutative nonlinear magnetic switches.
(4) Vacuum triodes.
(5) Avalanche semiconductor diodes.
(6) Laser diodes.
(7) Spark gap generators.

For launch technologies, the choice includes:

(1) Timed array: Rotman lens, Lunneberg lens.
(2) Antennas: large current antennas: loop or magnetic coil; wideband TEM mode horn; instantaneous wideband antennas; nonresonant antennas.
(3) Beam forming control: optical electronic.
(4) T/R switching.

For receiver technologies, the choice includes:

(1) Sample-and-hold oscilloscopes.
(2) Electronic sample-and-hold sliding correlators.
(3) Opto-electronic acquisition and a-d conversion.
(4) Optical continuous acquisition and correlation.
(5) Josephson junction technology receivers.

In the case of processing, the choice is among a variety of analog parallel processors. One of the major advantages of WP radars is their ability to obtain a large amount of target data, some of which will be aspect dependent. This means that handling this large data input and assigning aspect-dependent responses, as well as optical, resonance and late-time responses, to a single target will require considerable computational capabilities.

Figure 38:
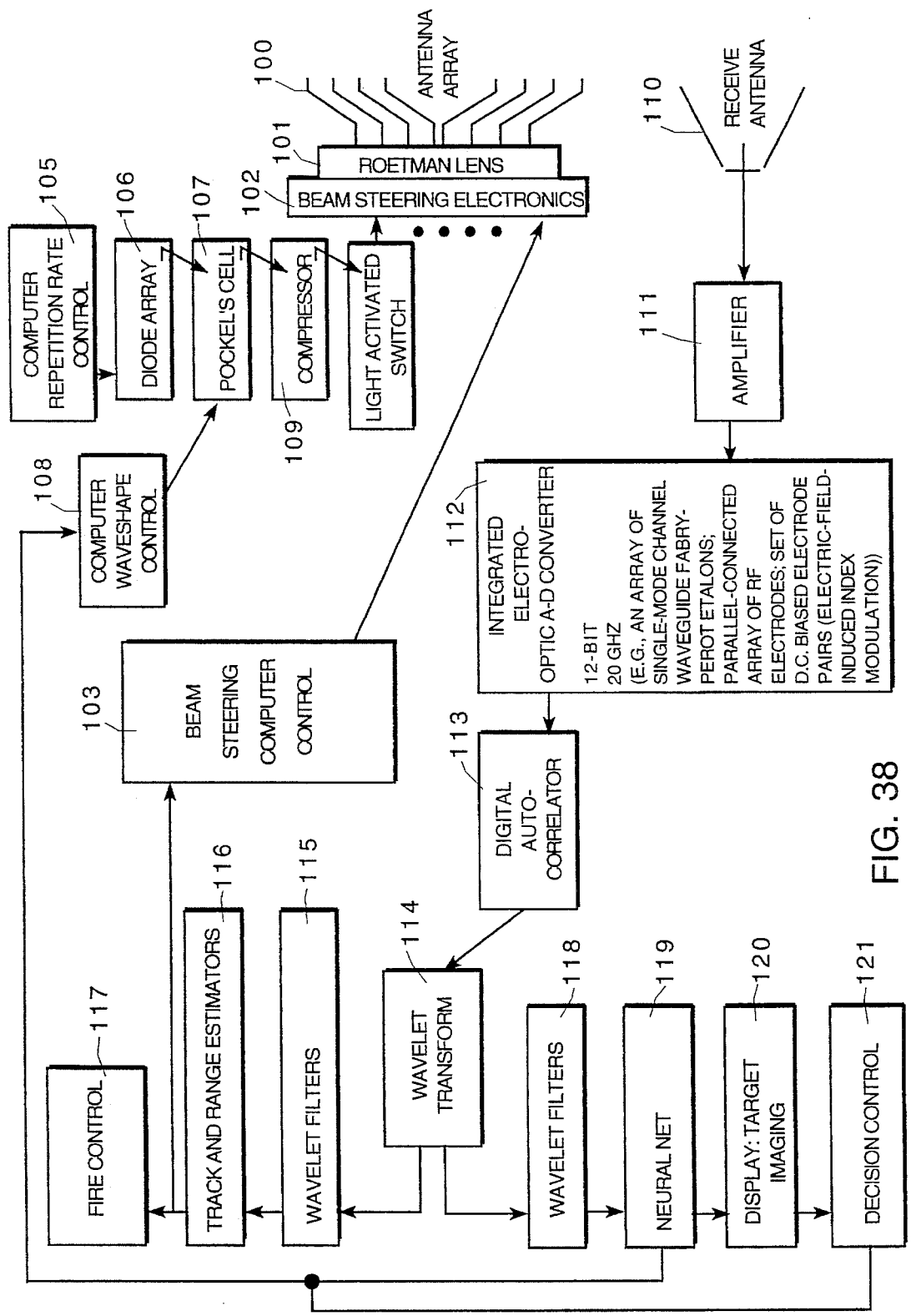
FIG. 38 is a block diagram of an ultrashort pulse-time-frequency radar/sensor incorporating the invention.

Referring to FIG. 38, a transmit antenna array 100 is coupled by Roetman lens 101 to beam steering circuit 102, which is controlled by beam steering computer control circuit 103. Wave (WP) packet transmission repetition rates are controlled by computer repetition rate control circuit 105 via diode array 106 and Pockel's cell 107, which also receives a wave shape control signal input from the computer wave shape control circuit 108. The Pockel's cell circuit outputs signals via compressor 109 to control light activated switch 111. The emitted time-frequency wave packets can be crafted to match the medium in which the wave packet is launched, and the target. The initial search wave packets can be matched loosely to one or more designated classes of media-target.

Return echoes are received by antenna 110, amplified in amplifier 111, converted to digital in A to D converter 112 for processing by autocorrelator 113 and supplied to wavelet transform circuit 114. A first wavelet filter 115 outputs its signal to track and estimator range circuits 116, which provide fire control signal to fire control circuit 117 to launch a rocket, for example, as well as a steering signal to beam steering computer control to thereby control beam steering computer control 102.

A second wavelet filter circuit 118 outputs the signal to a neural net 119, which outputs a signal to the computer wave shape control circuit 109 to cause transmission of time-frequency wave packets which are the complex conjugate of the impulse response of the combined media and the target. The neural net 119 provides signals for the target imaging display 120 and decision control circuit 121.

TABLE OF COMPONENTS

| Subcomponent | Possible Choice |
|---|---|
| Pulse Power Source With Pulse Train Capability. | Light-Activated Semiconductor Switches; E-Beam-Activated Semiconductor Switches; Semiconductor Switches; Spark-Gap/ Airbreakdown/Plasma Switch; Compressed Pulse; Free Electron Laser; Commutative Magnetic |

TABLE OF COMPONENTS -continued

| Subcomponent | Possible Choice |
|---|---|
| | Switch; Vacuum Triode; Vacuum Electronic Device; Vacuum Tube Devices; Laser Diodes; Semiconductor Diodes; Relativistic Devices; High Current Accelerators; Cyclotron Resonance Masers; Relativistic Magnetrons; Relativistic Klystrons; Energy-Resonator-Accumulators; Non-Relativistic Magnetron; Non-Relativistic Klystron; Non-Relativistic M-Type Devices; Non-Relativistic O-Type Devices; Multiresonator Klystrons; Traveling Wave Tubes; Backward Wave Tubes; Silcon-Controlled Rectifiers; Magnetic Pulse Compressors; etc. |
| Power Supplies. | Solid-State Batteries; Liquid-State Batteries; etc. |
| Pulse Power Source Drivers. | Laser; Diode Laser; Diode Laser Strip Array; etc. |
| Modulators. | Pockels Cell; Photorefractive Device; Piezoelectric Device; etc. |
| Compressors. | Optical Fiber; Optical Grating; Magnetic Compressors; etc. |
| Computer Controls. | Digital; Analog; etc. |
| Antennas. | TEM Horn; Inverse Conformal Bicone; End-Loaded Bicone; Baseline-Folded Dipole; E-Plane Sectional Horn; Nonresonant Antennas; etc. |
| Transmit/Receive Switches | Electronic; Opto-electronic; etc. |
| Receivers. | Homodyne; Electronic; Electro-optical; Optical; Superconducting; RF Electrodes; Channeled Waveguides; Track and Range Estimators; etc. |
| Beam Forming Capability. | Lunneberg Lens; Roetman Lens; Time Array; Fiber-Optic Cross-Bar Switch; Electro-Optical Array; etc. |
| A–D Converters. | Electro-optical; Optical; Optical Fiber; Josephson Junction; Superconducting; Flash A–D Converters; Sample-And-Hold Oscilloscope Devices; etc. |
| Correlators. | Optical; Electro-Optical; Analog; Digital; Sliding Correlators; Surface-Acoustic-Wave Devices; Bragg Devices, etc. |
| Advanced Parallel Processing Capabilities. | Neural Net; Cellular Automata; Parallel Processor; Associative Processor; Digital; Analog; etc. |

While preferred embodiments of the invention have been shown and described, it will be appreciated that numerous further embodiments, adaptations and modifications of the invention will be apparent to those skilled in the art.

REFERENCES

Acampora, A. S., High power radar implementation of coherent waveforms. *IEEE Trans. on Aerospace & Electronic Systems* AES-12, 444–450, 1976.

Ares, M., Optimum burst waveforms for detection of targets in uniform range-extended clutter. *IEEE Trans. on Aerospace & Electronic Systems* AES-3, 138–141, 1967.

Arneodo A, Graddeau G, Holschneider M: Wavelet transform and multifractals. *Phys Rev Lett.*, 61:2281–2284, 1988.

Auslander L, Tolimieri R: Radar ambiguity functions and group theory. *SIAM J Mat Anal* 16: 577–601, 1985.

Barrett, T. W., The information content of an electromagnetic field with relevance to sensory processing of information. *TIT J. Life Sci.*, 1, 129–135, 1971.

Barrett, T. W., Conservation of information. *Acustica*, 27, 44–47, 1972.

Barrett, T. W., On vibrating strings and information theory. *J. Sound & Vibration* 20, 407–412, 1972.

Barrett, T. W., The definition precedence of signal parameters: sequential versus simultaneous information. *Acustica*, 25, 90– 93, 1972.

Barrett, T. W., The conceptual basis of two information theories—a reply to some criticisms. *J Sound & Vibration* 25, 637– 642, 1972.

Barrett, T. W., Structural information theory. *J. Acoust. Soc. Am.*, 54, 1092–1098, 1973.

Barrett, T. W., Analytical information theory. *Acustica* 129, 65–67, 1973.

Barrett, T. W., Analog to digital conversion of information: a structural model of the basic functional unit of the central nervous system. *TIT J. Life Sci.*, 4, 59–66, 1974.

Barrett, T. W., Nonlinear analysis and structural information theory: a comparison of mathematical and physical derivations. *Acustica* 33, 149–165, 1975.

Barrett, T. W., Structural information theory based on electronic configurations. *TIT J. Life Sci.*, 5, 29–42, 1975.

Barrett, T. W., On linearizing nonlinear systems. *J. Sound & Vibration* 39,1 265–268, 1975.

Barrett, T. W., Linearity in secular systems: four parameter superposition. *J. Sound & Vibration* 41, 259–261, 1975.

Barrett, T. W., Information measurement—I. On maximum entropy conditions applied elementary signals. *Acustica* 35, 79–85, 1976.

Barrett, T. W., Information measurement—II. On minimum conditions of energy order applied to elementary signals. *Acustica* 36, 282–286, 1977.

Barrett, T. W., Structural information theory. *Acustica* 36, 271–281, 1977.

Barrett, T. W., Quantum statistical foundations for structural information theory. pp. 391–409 in V. Lanshmikantham (ed) *Nonlinear Systems and Applications—an International Conference*, Academic, New York, 1977.

Barrett, T. W., The identification of nonlinear molecular systems by spectroscopic methods. *Applied Physics* 15, 213–218, 1978.

Barrett, T. W., Energy transfer and propagation and the dielectrics of materials: transient versus steady state effects., pp. 1–19 in B. Noel (ed) *Ultra-Wideband Radar: Proceedings of the First Los Alamos Symposium*, CRC Press, 1991.

Blau, W., Synthesis of ambiguity functions for prescribed responses. IEEE Trans on *Aerospace & Electronic Systems* AES-3, 656–663, 1967.

Born, M. & Wolf, E., *Principals of Optics*, 4th edition, Pergamon, N.Y., 1970.

Chadwick, R. B. & Cooper, G. R., A clutter reduction technique for random signal radars. *IEEE Trans. on Aerospace & Electronic Systems* AES-10, 156–160, 1974.

Chang, C. S., Jeng, M. C., Rhee, J. J., Lee, C. H., Rosen, A. and Davis, H., Direct DC to RF conversion by picosecond optoelectronic switching. *IEEE MTT-S Digest*, 540–541, 1984.

Chen, J-M., Radar waveform synthesis method—a new radar detection scheme. *IEEE Trans. on Antennas and Propagation* AP-29, 553–566, 1981.

Chem, K-M., and Westmoreland, D., Radar waveform synthesis for exciting single-mode backscatters from a sphere ad application for target discrimination. *Radio Science*, 17, 574–588, 1982.

Chen, K-M., Nyquist, D. P., Rothwell, E. J., Webb, L. L. and Drachman, B., Radar target discrimination by convolution of radar return with extinction-pulses and single-mode extraction signals. *IEEE Trans. in Antennas and Propagation*, AP-34, 896–904, 1986.

Chen, K-M., Nyquist, D. P., Westmoreland, D., Chuang, C-I. and Drachman, B., Radar waveform synthesis for target discrimination. *IEEE Antennas and Propagation Society*, Los Angeles, Calif., June 16–19, 1981.

Chui, C. K., *An Introduction to Wavelets*, Academic, New York, 1992a.

Chui, C. K., (ed), *Wavelets: A Tutorial in Theory & Applications*, Academic, New York, 1992b.

Cohen, L., Time-frequency distributions—a review. *Proc. IEEE* 77, pp. 941–981, 1989.

Combes, J. M., Grossman, A. & Tchamitchian, Ph. (eds) *Wavelets: Time-Frequency Methods and Phase Space*, 2nd edition, Springer, N.Y., 1990.

Crisp, M. D., Propagation of small-area pulses of coherent light through a resonant medium. *Phys. Rev.*, A1, 1604–1611, 1970.

Cronson, H. M., Picosecond-pulse sequential waveform generation. *IEEE Trans. on Microwave Theory and Technique*, MTT- 23, 1048–1049, 1975.

Cummins, H. Z. & Pike, E. R. (eds) *Photon correlation and light beating spectroscopy*, Plenum, N.Y., 1974.

Daubechies I: Orthonormal bases of compactly supported wavelets. *Comm on Pure and Applied Mathematics* 41: 910–995, 1988.

Daubechies, I., The wavelet transform: time-frequency localization and signal analysis. *IEEE Trans. Information Theory*, 36, pp. 961–1005, 1990.

Daubechies, I: *Ten Lectures on Wavelets*, Society for Industrial & Applied Mathematics, Philadelphia, 1992.

Delong, D. F. & Hofstetter, E. M., On the design of optimum radar waveforms for clutter rejection. *IEEE Trans. on Information Theory* IT-13, 454–463, 1967.

Delong, D. F. & Hofstetter, E. M., The design of clutter-resistant radar waveforms with limited dynamic range. *IEEE Trans. on Information Theory* IT-15, 376–385, 1969.

Delong, D. F. & Hofstetter, E. M., Optimum radar signal-filter pairs in a cluttered environment. *IEEE Trans. on Information Theory* IT-16, 89–90, 1970.

Didenko, A. N. & Yushkov, Yu. G. *Moschchnye SVCh-Impul'sy Nanosekundno Dlitel'nosti (Powerful Nanosecond SHF Pulses)* Ehnergoatomizdat, Moscow, 1984.

Flandrin P, Rioul, O: Affine smoothing of the Wigner-Ville distribution. *IEEE Int Conf on Acoust Speech & Signal Proc* 2455– 2486, 1990.

Fok, F. Y. S. and Moffatt, D. L., The K-pulse and E-pulse, *IEEE Trans. Antennas & Propag.*, AP-35, 1325–1326, 1987.

Gabor, D. Theory of communication. *J. Inst. Electr. Engrs*, 93, 429–457, 1946.

Gjessing, D. T., *Remote surveillance by electromagnetic waves for air-water-land*, Ann Arbor Science, Ann Arbor, Mich., 1978.

Gjessing, D. T., *Target adaptive matched illumination radar: principles and applications*, Peter Peregrinus Ltd, London, 1986.

Grossman, A., Morlet, J. & Paul, T., Transforms associated to square integrable group representations, Part 1: General results. *J. Math. Phys.*, 26, pp. 2473–2479, 1985.

Holtzman J. C. & Thorp, J. S., Optimum signals for radar. *IEEE Trans. on Aerospace & Electronic Systems* AES-5, 898–905, 1969.

Hsiao, J. K., MTI optimization in a multiple-clutter environment. *IEEE Trans. on Aerospace & Electronic Systems* AES-12, 401–405, 1976.

Jay, F. (ed) *IEEE Standard Dictionary of Electrical and Electronics Terms*, IEEE, New York, 1988.

Kennaugh, E. M., The K-Pulse concept, *IEEE Tans. Antennas & Propag.*, AP-29, 327–331, 1981.

Kennaugh, E. M., Moffatt, D. L. and Wang, N., The K-pulse and response waveforms for nonuniform transmission lines, *IEEE Trans. Antennas & Propag.*, AP-34, 78–83, 1986.

Kim, H. T., Wang, N. & Moffatt, D. L., K-pulse for a thin circular loop, *IEEE Trans. Antennas & Propag.*, AP-33, 1403–1407, 1985.

Kretschmer, F. F., Correlation effects of MTI filters. *IEEE Trans. on Aerospace & Electronic Systems* AES- 13, 321–322, 1977.

Lee, Y. W., *Statistical Theory of Communication*, Wiley, N.Y., 1960.

Loubriel, G. M. and Zutavern, F. J. State-of-the-art review of photoconductive semiconductor switches for ultrawindband radar, *OE LASE '92, SPIE*, Conference 1631, 1631-28.

Mahapatra, P. R. & Ramakrishna, S., Compact AM signals for maximum clutter rejection. *IEEE Trans. on Aerospace & Electronic Systems* AES-13, 414–418, 1977.

Mallat SG: *Multiresolution representation and wavelets*. Ph.D. thesis, University of Pennsylvania, August, 1988.

Mallet SG: A Theory of multiresolution signal decomposition: the wavelet representation. IEEE Trans Pattern Analysis and Machine Intelligence 11: 674–693, 1989.

Mathur, V. K., Chang, C. S., Cao, W-L., Rhee, M. J. and Lee, C. H., Multikilovolt picosecond optoelectronic switching in CdS0.5Se0.5, *IEEE J. Quantum Electronics*, QE-18, 205–209, 1982.

Meleshko, E. A., *Nanosekundnaya Ehlektronika V Ehksperimental'noj Fizike (Nanosecond Electronics in Experimental Physics)* Ehnergoatomizdat, Moscow, 1987.

Meyer, Y., (ed) *Wavelets and Applications*, Springer, N.Y., 1992.

Minkoff, J., *Signals, Noise & Active Sensors*, Wiley, 1992.

Mitchell, R. L. & Rihaczek, A. W., Clutter suppression properties of wighted pulse trains. *IEEE Trans. on Aerospace & Electronic Systems* AES-4, 822–828, 1968.

Moffatt, D. L. & Mains, R. K., Detection and discrimination of radar targets, *IEEE Trans. Antennas & Propag.*, AP-23, 358–367, 1975.

Morgan, M. A., Scatterer discrimination based upon natural resonance annihilation, *J. Electromagnetic Waves & Applications*, 2, 481–502, 1988.

Mosca, E., A nonadaptive processing of radar pulse trains for clutter rejection. *IEEE Trans. on Aerospace & Electronic Systems* AES-5, 951–958, 1969.

Naparst, H., Dense target signal processing. *IEEE Trans. on Information Theory*, 37, 317–327, 1991.

Papoulis, A., *The Fourier Integral and its Applications*, McGraw-Hill, New York, 1962.

Papoulis, A., *Probability, Random Variables, and Stochastic Processes*, McGraw-Hill, New York, 1965.

Parker, S. P., (ed), McGraw-Hill Dictionary of Scientific and Technical Terms,McGraw-Hill, New York, 1989.

Poelman, A. J., Cross correlation of orthogonally polarized backscatter components. *IEEE Trans. on Aerospace & Electronic Systems AES*-12, 674–681, 1976.

Proud, J. M. and Norman, S. L., High-frequency waveform generation using optoelectronic switching in silicon, *IEEE Trans. on Microwave Theory and Techniques*, MTT-26, 137–140, 1978.

Rihaczek, A. W. Radar waveform selection—a simplified approach. *IEEE Trans. on Aerospace & Electronic Systems* AES-7, 1078–1086, 1971.

Rihaczek, A. W. & Golden, R. M., Clutter performance of coherent pulse trains for targets with range acceleration. *IEEE Trans. on Aerospace & Electronic Systems* AES-7, 1093–1099, 1971.

Rihaczek, A. W. & Mitchell, R. L., Radar waveforms for suppression of extended clutter. *IEEE Trans. on Aerospace & Electronic Systems* AES-3, 1967, 510–517, 1967.

Rothwell, E. J., Chen, K-M. and Nyquist, D., Extraction of the natural frequencies of a radar target from a measured response using E-pulse techniques. *IEEE Trans. on Antennas and Propagation* AP- 35, 715–720, 1987.

Rothwell, E. J., Chen, K-M., Nyquist, D. P. and Sun, W., Frequency domain E-pulse synthesis and target discrimination. *IEEE Trans. on Antennas and Propagation*, AP-35, 426–434, 1987.

Rothwell, E., Nyquist, D. P., Chen, K-M. & Drachman, B., Radar target discrimination using the extinction-pulse technique, *IEEE Trans. Antennas & Propag.*, AP-33, 929–937, 1985.

Ruskai, M. B., Beylkin, G., Coifman, R., Daubechies, I., Mallat, S., Meyer, Y & Raphael, L., (eds) *Wavelets & Their Applications*, Jones & Bartlett, Boston, 1992.

Schetzen, M., *The Volterra and Wiener theories of nonlinear systems*, Robert E. Krieger Publishing Co., Malibar, Fla., 1989.

Spafford, L. J., Optimum radar signal processing in clutter. *IEEE Trans. on Information Theory*, IT-14, 734–743, 1968.

Sprang G: Wavelets and dilation equations: a brief introduction. *SIAM Rev.* 31: 614–627, 1989.

Stutt, C. A. & Spafford, L. J., A "best" mismatched filter response for radar clutter discrimination. *IEEE Trans. on Information Theory*, IT-14, 280–287, 1968.

Tseng, F-I. and Cheng, D. K., Antenna pattern response to arbitrary time signals. *Canadian J. Physics*, 42, 1358–1368, 1964.

Tikhonov, A. N. and Goncharsky, A. V. (eds) *Ill-Posed Problems in the Natural Sciences*, MIR, Moscow, 1987.

Van Blaricum, M. L. and Mitra, R., Problems associated with Prony's method for processing transient data, *IEEE Trans. Antennas & Propag.*, AP-26, 174–182, 1978.

Van Trees, H. L., Optimum signal design and processing for reverbe ration-limited environments. *IEEE Trans. on Military Electronics*, MIL-9, 212–229, 1965.

Wiener, N. *Nonlinear problems in random theory*, MIT Press, 1958.

Wolf, J. D., Le, G. M. & Suyo, C. E., Radar waveform synthesis by means-square optimization techniques. *IEEE Trans. on Aerospace & Electronic Systems* AES-5, 611–619, 1969.

Woodward, P. M., *Probability and Information Theory with Applications to Radar*, McGraw-Hill, New York, 1955.

Wornell GW: A Karhunen-Loève-like expansion for 1/f processes via wavelets. *IEEE Trans on Info. Theory* 36: 859–860, 1990.

What is claimed is:

1. A signalling system for detecting targets in a given medium, comprising:

means for generating and transmitting in said given medium a time-frequency wave packet which is the complex (phase) conjugate of the impulse response of the combined medium and target, and means for solving the wave equation for transmissions through said medium, reflectance from said target and transmission back through said medium.

2. The signalling system defined in claim 1 including means for matching said wave packet signal to both said medium and said target for maximum propagation through said medium and reflectance from said target, said wave packet match to said medium and said target being with respect to both time and frequency response characteristics.

3. The signalling system defined in claim 1 including receiver means for receiving echoes of wave packets reflected from said targets in said medium, time and frequency space matched filter means for preserving the instantaneous time and frequency response characteristics of return signal echoes from said target.

4. The signalling system defined in claim 3 wherein said receiver means includes a TD receiver processor.

5. The signaling system defined in claim 3 wherein said receiver means is a Homodyne.

6. The signalling system defined in claim 3 wherein said receiver means includes means for detecting range to said target by detecting the rate of change of energy in returned echo wave packets.

7. The signalling system defined in claim 3 wherein said receiver means includes an independent antenna system.

8. The signalling system defined in claim 3, said receiver including means for processing target data for target recognition purposes.

9. The signalling system defined in claim 3, said receiver including neural net means for processing target data target imaging and display.

10. A signalling method for detecting targets in a given medium, comprising:

generating and transmitting in said given medium a time-frequency wave packet which is the complex (phase) conjugate of the impulse response of the combined medium and target, and solving the wave equation for transmissions through said medium, reflectance from said target and transmission back through said medium.

11. The signalling method defined in claim 10 including matching said wave packet signal to both said medium and said target for maximum propagation through said medium and reflectance from said target, said wave packet match to said medium and said target being with respect to both time and frequency response characteristics.

12. The signalling method defined in claim 10 including receiver means for receiving echoes of wave packets reflected from said target in said medium, time and frequency space matched filtering for preserving the instantaneous time and frequency response characteristics of return signal echoes from said target.

13. Signalling system in time-frequency space for detecting a target in the presence of clutter and for penetrating media, comprising:

transmitter antenna means, receiver and processor means, said transmitter antenna means having means for generating and launching into a medium containing said target an energy pulse (wave packet) having a predetermined duration and frequency characteristic, and which energy pulse matches one of the following:

1) the time-frequency reflection characteristics of said target but not said clutter, or 2) the penetration time-frequency dielectric window of said medium, or 3) the time-frequency characteristics of the window of said receiver.

14. The search apparatus defined in claim 4 wherein said means for generating is an RF generator, includes:

a light energy activated switch, the RF energy of which follows the light energy, means to modulate the light energy and compress the light to said predetermined pulse duration, a linear semiconductor switch, and means for applying the modulated light energy to said semiconductor switch.

15. A time-frequency space signalling method for and launching into a medium containing a target wave packets having a predetermined duration and frequency characteristic, and in which the wave packets match at east one of the following:

1) the time-frequency reflection characteristics of said target but not said clutter, or 2) the penetration time-frequency dielectric window of said medium, or 3) the time-frequency characteristics of the window of said receiver.

16. A method of analyzing wave packet transmissive solid media, comprising generating and launching a time frequency wave packet into said solid media and causing said wave packet to match the penetration time-frequency dielectric window of said solid media.

17. The method defined in claim 16 including receiving wave packet reflection echoes from said media and adjusting the time-frequency characteristics of receiving of wave packet reflections.

18. A method of enhancing the radar cross-section of a target when using an impulse radar system, said method comprising the steps of:

transmitting a pilot impulse radar pulse at a target, said pilot impulse radar pulse comprising a pulse of duration shorter than the target length and generated by an impulse radar system, receiving a return pulse from the target, which return pulse provides information indicative of scattering centers on the target, and wherein the return pulse is used as a calibration signal, processing the calibration signal corresponding to the return pulse to form a phase conjugated transmit pulse, and transmitting the phase conjugated transmit pulse at the target, processing a target return signal derived from the transmitted phase conjugated pulse, and wherein the target return signal derived from the transmitted phase conjugated pulse has an enhanced radar cross-section of the target since the waveform of the transmitted phase conjugated pulse is matched to the characteristics of the target.

19. The method defined in claim 18 wherein said phase conjugated pulse has rise and fall times in the pico-second range.

20. An impulse radar system comprising:

a transmitter for transmitting a pilot impulse radar pulse at a target, which pilot pulse comprises a pulse of a duration shorter than the target length, a receiver for receiving a return impulse radar pulse from the target, which return pulse provides information indicative of scattering centers on the target, which return pulse provides a calibration signal, and processing means coupled to the transmitter and receiver for processing the calibration signal corresponding to the return impulse radar pulse to form a phase conjugate impulse radar pulse, wherein the transmitter is adapted to transmit the phase conjugate pulse at the target, and wherein the receiver is adapted to process a target return signal derived from the transmitted phase conjugate pulse, and wherein the target return signal derived from the transmitted phase conjugated pulse enhances the radar cross-section of the target since the waveform of the transmitted phase conjugated pulse is matched to the characteristics of the target.

21. The system of claim 20, wherein said phase conjugated pulse has rise and fall times on the pico-second range.

22. An impulse radar system comprising:

a transmitter for transmitting impulse radar pulses at a target, wherein said transmitter comprises means for generating a search pulse having a duration shorter than the target length, a receiver for receiving return pulses from the target, which return pulses provide information indicative of scattering centers on the target, and processing means coupled to the transmitter and receiver for processing the return pulses and for adaptively adjusting the phase of the transmitted pulses that are transmitted at the target in response to the return pulses in such a manner as to cause the radar cross-section contributed by the backward traveling wave on the target to be made to add in phase in the received direction, and wherein the transmitter transmits the pulses having adaptively adjusted phases at the target, and wherein the receiver sums the spectral components comprising return pulses derived from the transmitted pulses having adjusted phases to increase the radar cross-section of the target.

\* \* \* \* \*